US012512589B2

(12) United States Patent
Xing et al.

(10) Patent No.: US 12,512,589 B2
(45) Date of Patent: Dec. 30, 2025

(54) LIQUID CRYSTAL PHASE SHIFTER AND LIQUID CRYSTAL ANTENNA

(71) Applicant: Chengdu Tianma Micro-Electronics Co., Ltd., Chengdu (CN)

(72) Inventors: Yifan Xing, Chengdu (CN); Zhenyu Jia, Chengdu (CN); Baiquan Lin, Chengdu (CN); Kerui Xi, Chengdu (CN); Xiaonan Han, Chengdu (CN); Qingsan Zhu, Chengdu (CN); Ping Su, Chengdu (CN); Yifan Bao, Chengdu (CN); Zuocai Yang, Chengdu (CN); Yi Wang, Chengdu (CN)

(73) Assignee: Chengdu Tianma Micro-Electronics Co., Ltd., Chengdu (CN)

( * ) Notice: Subject to any disclaimer, the term of this patent is extended or adjusted under 35 U.S.C. 154(b) by 125 days.

(21) Appl. No.: 18/135,940

(22) Filed: Apr. 18, 2023

(65) Prior Publication Data

US 2024/0250425 A1 Jul. 25, 2024

(30) Foreign Application Priority Data

Jan. 19, 2023 (CN) ......................... 202310081804.8

(51) Int. Cl.
*H01Q 3/44* (2006.01)

(52) U.S. Cl.
CPC .................................... *H01Q 3/44* (2013.01)

(58) Field of Classification Search
CPC ........ H01Q 3/44; H01Q 3/36; G02F 1/13306; G02F 1/134309; G02F 1/292; H01P 1/02; H01P 1/18; H01P 1/165; H01P 3/36
See application file for complete search history.

(56) References Cited

U.S. PATENT DOCUMENTS

| | | | | |
|---|---|---|---|---|
| 2004/0119557 A1* | 6/2004 | Barnes | H01P 5/085 | 333/260 |
| 2011/0001749 A1* | 1/2011 | Min | G09G 3/3688 | 345/98 |
| 2014/0069696 A1* | 3/2014 | Rothkopf | H05K 3/361 | 156/60 |

(Continued)

FOREIGN PATENT DOCUMENTS

| | | |
|---|---|---|
| CN | 101308266 A | 11/2008 |
| CN | 108321503 A | 7/2018 |

(Continued)

*Primary Examiner* — Dimary S Lopez Cruz
*Assistant Examiner* — Anna N Hamadyk
(74) *Attorney, Agent, or Firm* — Anova Law Group, PLLC

(57) ABSTRACT

A liquid crystal phase shifter and a liquid crystal antenna are provided. The liquid crystal phase shifter includes a first substrate and a second substrate oppositely disposed; a liquid crystal layer disposed between the first substrate and the second substrate; a radio frequency connector; and a driving chip. A side of the second substrate adjacent to the first substrate includes a first conductive layer connected to a constant potential; a side of the first substrate adjacent to the second substrate includes a second conductive layer including a transmission electrode; the first substrate includes a first area bonded with a circuit board; and the radio frequency connector and the driving chip are both disposed in the first area and transmit signals through the circuit board.

20 Claims, 48 Drawing Sheets

(56) References Cited

U.S. PATENT DOCUMENTS

| | | | | |
|---|---|---|---|---|
| 2019/0064609 | A1* | 2/2019 | Haziza ................. | H01Q 21/065 |
| 2021/0328355 | A1* | 10/2021 | Xi .......................... | H01Q 5/357 |
| 2022/0013902 | A1* | 1/2022 | Bueno-Baques ........ | H01Q 3/22 |

FOREIGN PATENT DOCUMENTS

| | | | | |
|---|---|---|---|---|
| WO | 2019137159 | A1 | | 7/2019 |
| WO | WO-2020250951 | A1 | * | 12/2020 |

* cited by examiner

LIQUID CRYSTAL PHASE SHIFTER AND LIQUID CRYSTAL ANTENNA

CROSS-REFERENCE TO RELATED APPLICATION

This application claims the priority of Chinese Patent Application No. 202310081804.8, filed on Jan. 19, 2023, the content of which is incorporated by reference in its entirety.

TECHNICAL FIELD

The present disclosure generally relates to the field of wireless communication technologies and, more particularly, relates to a liquid crystal phase shifter and a liquid crystal antenna.

BACKGROUND

Liquid crystal phase shifter is a programmable optical phase control array using liquid crystal as the electro-optic material. When a periodic voltage is applied to the electrodes of the liquid crystal phase shifter, due to the electro-optical characteristics of the liquid crystal, the liquid crystal in the electrode area will form a periodic phase distribution. The periodic distribution of the phase modulates the phase of the light waves transmitted in the array to realize scanning, focusing, beam splitting, or the function of correcting phase defects.

Liquid crystal antenna is a new type of array antenna based on the liquid crystal phase shifter, which is widely used in satellite receiving antenna, vehicle radar, base station antenna and other fields. The liquid crystal phase shifter is the core component of the liquid crystal antenna. A liquid crystal phase shifter and a ground layer form an electric field to control the deflection of the liquid crystal molecules, realizing the control of the equivalent dielectric constant of the liquid crystal, and then realizing the adjustment of the phase of the electromagnetic wave. Liquid crystal antennas have broad application prospects in satellite receiving antennas, vehicle radars, 5G base station antennas and other fields.

The existing liquid crystal phase shifter needs to be fed with radio frequency signals through the radio frequency connector, and the liquid crystal needs a bias signal of low-frequency AC to drive at the same time, and the liquid crystal phase shifter array needs to be given liquid crystal driving signals through a circuit board. In the related technologies, steps are disposed on both sides of a glass substrate, one step is used for bonding circuit boards, and the other step is used for welding or bonding radio frequency (RF) connectors. Such a configuration increases the area of the frame, and the RF connector has a large step area. However, the welding mechanical strength between the glass substrate and the RF connector is insufficient.

Therefore, there is an urgent need to provide a liquid crystal phase shifter and a liquid crystal antenna capable of reducing the frame area. The present disclosed liquid crystal phase shifters and liquid crystal antennas are direct to solve one or more problems set forth above and other problems in the arts.

SUMMARY

One aspect of the present disclosure provides a liquid crystal phase shifter. The liquid crystal phase shifter includes a first substrate and a second substrate oppositely disposed; a liquid crystal layer disposed between the first substrate and the second substrate; a radio frequency connector; and a driving chip. A side of the second substrate adjacent to the first substrate includes a first conductive layer connected to a constant potential; a side of the first substrate adjacent to the second substrate includes a second conductive layer including a transmission electrode; the first substrate includes a first area bonded with a circuit board; and the radio frequency connector and the driving chip are both disposed in the first area and transmit signals through the circuit board.

Another aspect of the present disclosure provides a liquid crystal antenna. The liquid crystal antenna includes a liquid crystal phase shifter. The liquid crystal phase shifter includes a first substrate and a second substrate oppositely disposed; a liquid crystal layer disposed between the first substrate and the second substrate; a radio frequency connector; and a driving chip. A side of the second substrate adjacent to the first substrate includes a first conductive layer connected to a constant potential; a side of the first substrate adjacent to the second substrate includes a second conductive layer including a transmission electrode; the first substrate includes a first area bonded with a circuit board; and the radio frequency connector and the driving chip are both disposed in the first area and transmit signals through the circuit board. The liquid crystal antenna also includes a radiator disposed on a side of the second substrate away from the first substrate. The first conductive layer includes a coupling port, and an orthographic projection of the radiator on a plane where the first substrate is located, an orthographic projection of the coupling port on the plane where the first substrate is located, and an orthographic projection of the transmission electrode on the plane where the first substrate is located at least partially overlap.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings may also be obtained from these drawings without creative effort.

DETAILED DESCRIPTION

Various exemplary embodiments of the present disclosure will now be described in detail with reference to the accompanying drawings. It should be noted that the relative arrangements of components and steps, numerical expressions and numerical values set forth in these embodiments do not limit the scope of the present disclosure unless specifically stated otherwise.

The following description of at least one exemplary embodiment is merely illustrative in nature and in no way taken as limiting the disclosure, its application or uses.

Techniques, methods and devices known to those of ordinary skill in the relevant art may not be discussed in detail, but where appropriate, such techniques, methods and devices should be considered part of the description.

In all examples shown and discussed herein, any specific values should be construed as exemplary only, and not as limitations. Therefore, other instances of the exemplary embodiment may have different values.

It should be noted that like numerals and letters denote like items in the following figures, therefore, once an item is defined in one figure, it does not require further discussion in subsequent figures.

Figure 1:
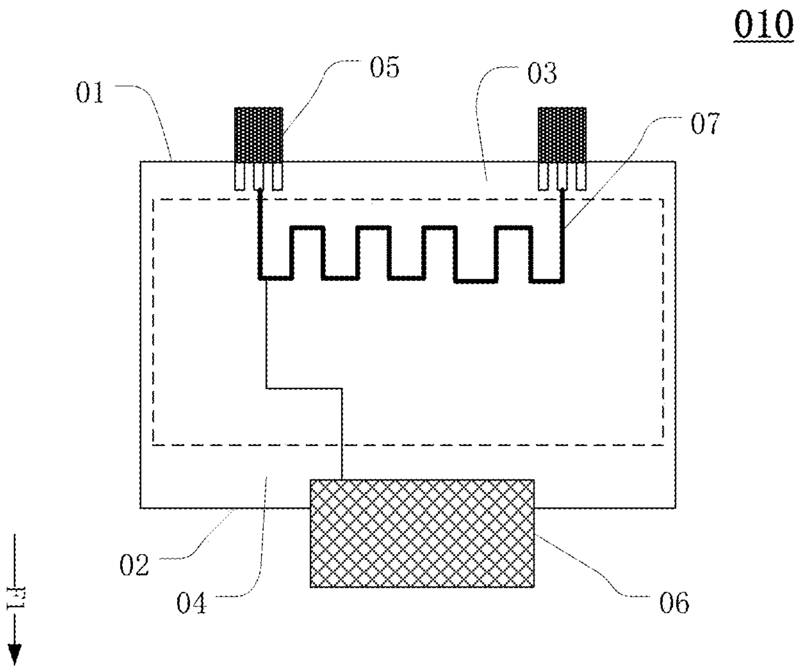
FIG. 1 (Prior Art)
FIG. 1 illustrates a top view of a liquid crystal phase shifter.
Figure 2:
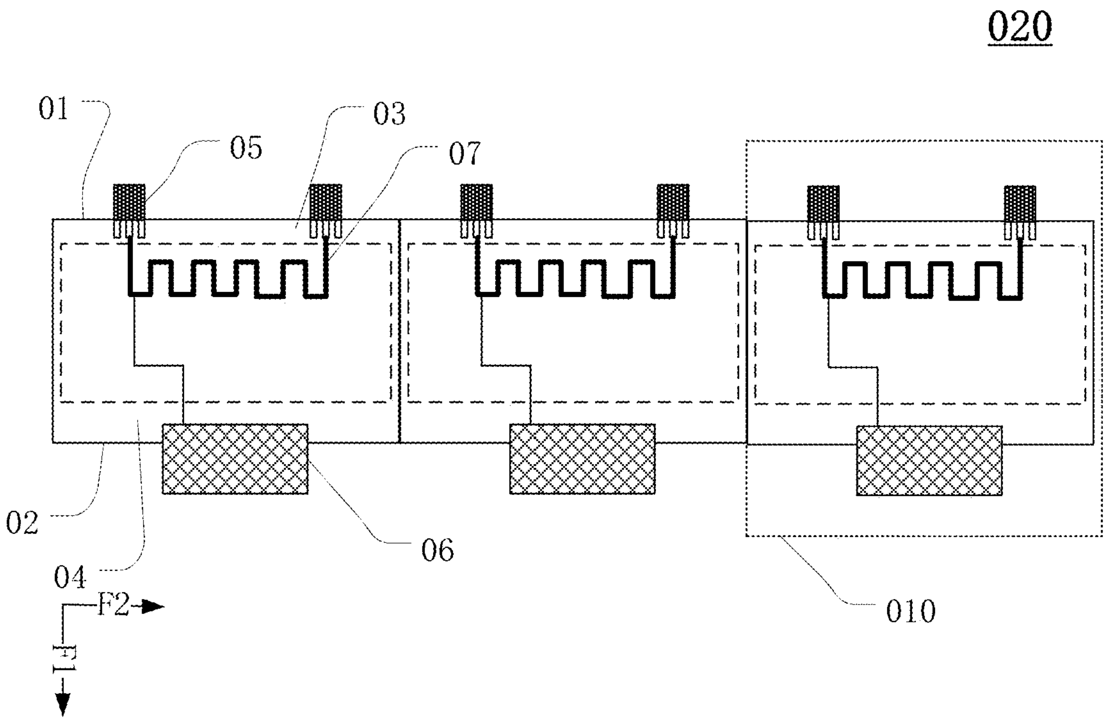
FIG. 2 (Prior Art)
FIG. 2 illustrates a top view of a liquid crystal phase shifter group.

Liquid crystal phase shifters have the problems of large frame area, the liquid crystal phase shifters can only be spliced in a linear array, the radio frequency connector has a large step area, but the welding mechanical strength of the substrate and the radio frequency connector is insufficient, and the wiring is difficult. FIG. 1 is the schematic diagram of the plane structure of a kind of liquid crystal phase shifter, and FIG. 2 is the schematic diagram of the plane structure of a liquid crystal phase shifter group. As shown in FIG. 1, the liquid crystal phase shifter 010 includes a first side 01 and a second side 02 opposite to each other along the vertical direction F1, a radio frequency connector 05 is bonded on the first side 01 of the first frame 03, and a circuit board 06 is bonded on the second side 02 of the second frame 04. The liquid crystal phase shifter 010 also includes a microstrip line 07. FIG. 1 is only to clearly illustrate the positional relationship between the radio frequency connector 05, the circuit board 06 and the microstrip line 07, and other structures in the liquid crystal phase shifter 010 are not shown. As shown in FIG. 1, in the liquid crystal phase shifter 010, the first frame 03 needs to be reserved on the first side 01 to install the radio frequency connector 05, and the second frame 04 needs to be reserved on the second side 02 to set the circuit board 06. Therefore, the overall frame area of the liquid crystal phase shifter 010 is relatively large. Further, referring to FIG. 1, the circuit board 06 needs to transmit the bias signal to the microstrip line 07, and the radio frequency connector 05 needs to transmit the bias signal to the microstrip line 07. Because the circuit board 06 is located on the opposite side of the radio frequency connector 05, the signal lines crossing the circuit board 06 and the microstrip line 07 are relatively long, which increases the difficulty of the design of the signal lines. Referring to FIG. 2, because the radio frequency connector 05 is arranged on the first side 01, and the circuit board 06 is arranged on the second side 02, when a plurality of liquid crystal phase shifters 010 are spliced, they can only be spliced in a row in the horizontal direction F2 to form a liquid crystal phase shifter group 020, but cannot be spliced in the vertical direction F1, which limits its use.

Figure 3:
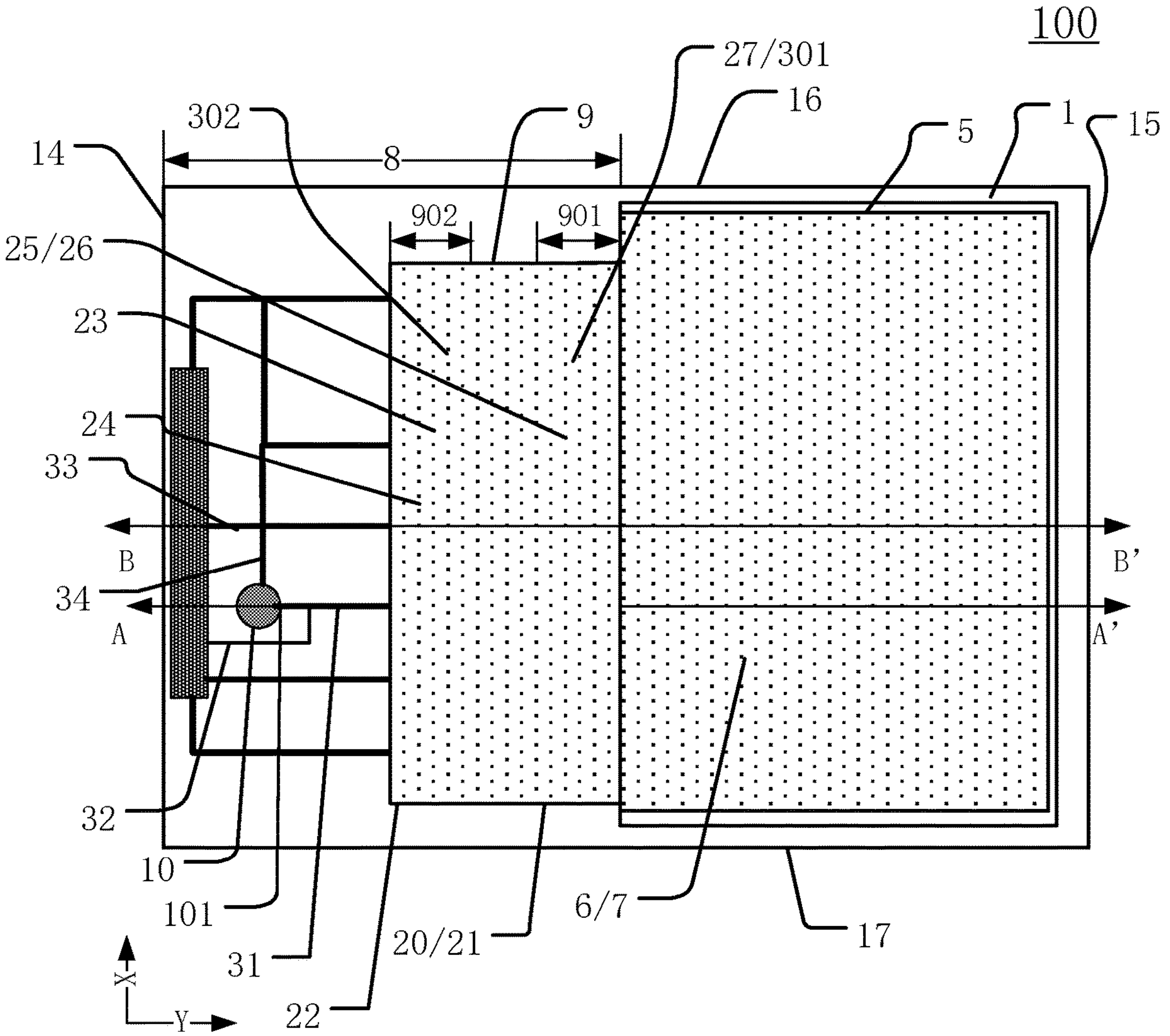
FIG. 3 illustrates a top view of an exemplary liquid crystal phase shifter according to various disclosed embodiments of the present disclosure.
Figure 4:
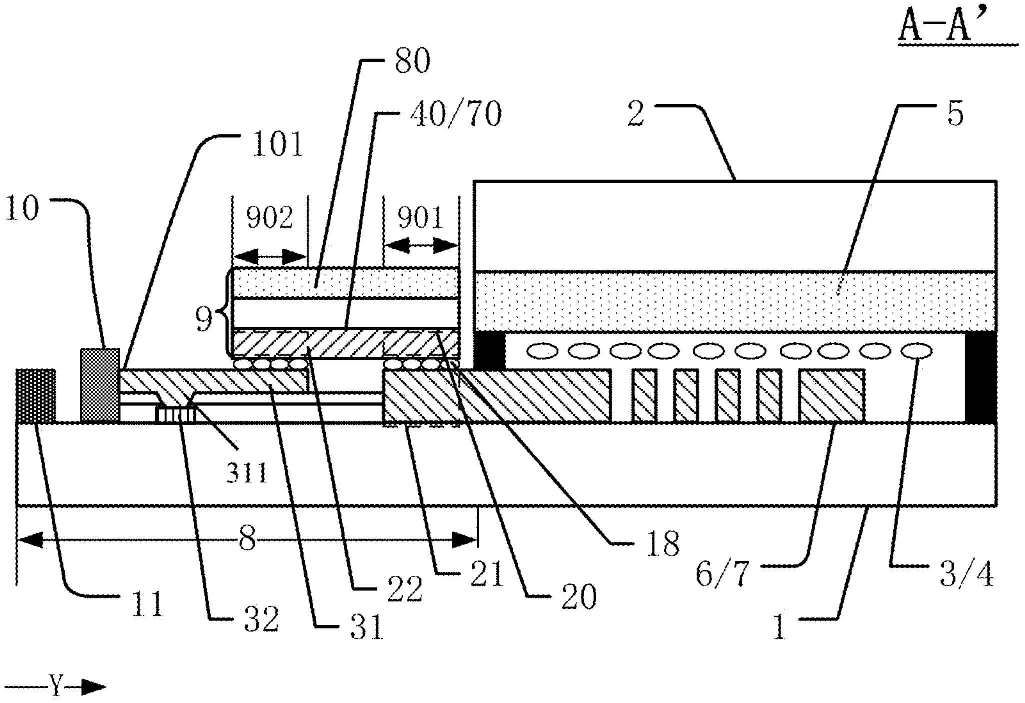
FIG. 4 illustrates an A-A'-sectional view in FIG. 3.
Figure 5:
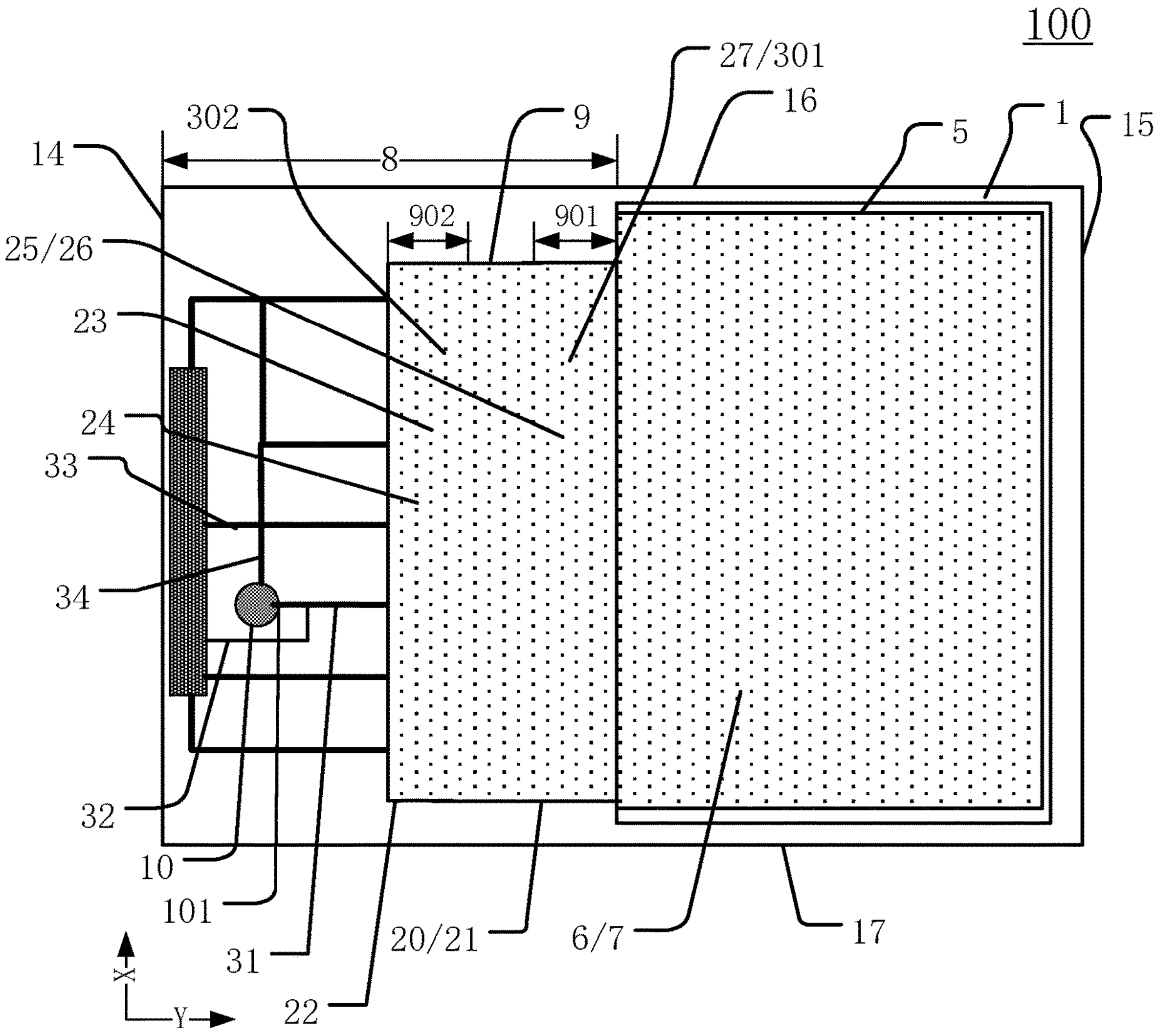
FIG. 5 illustrates a top view of another exemplary liquid crystal phase shifter according to various disclosed embodiments of the present disclosure.
Figure 6:
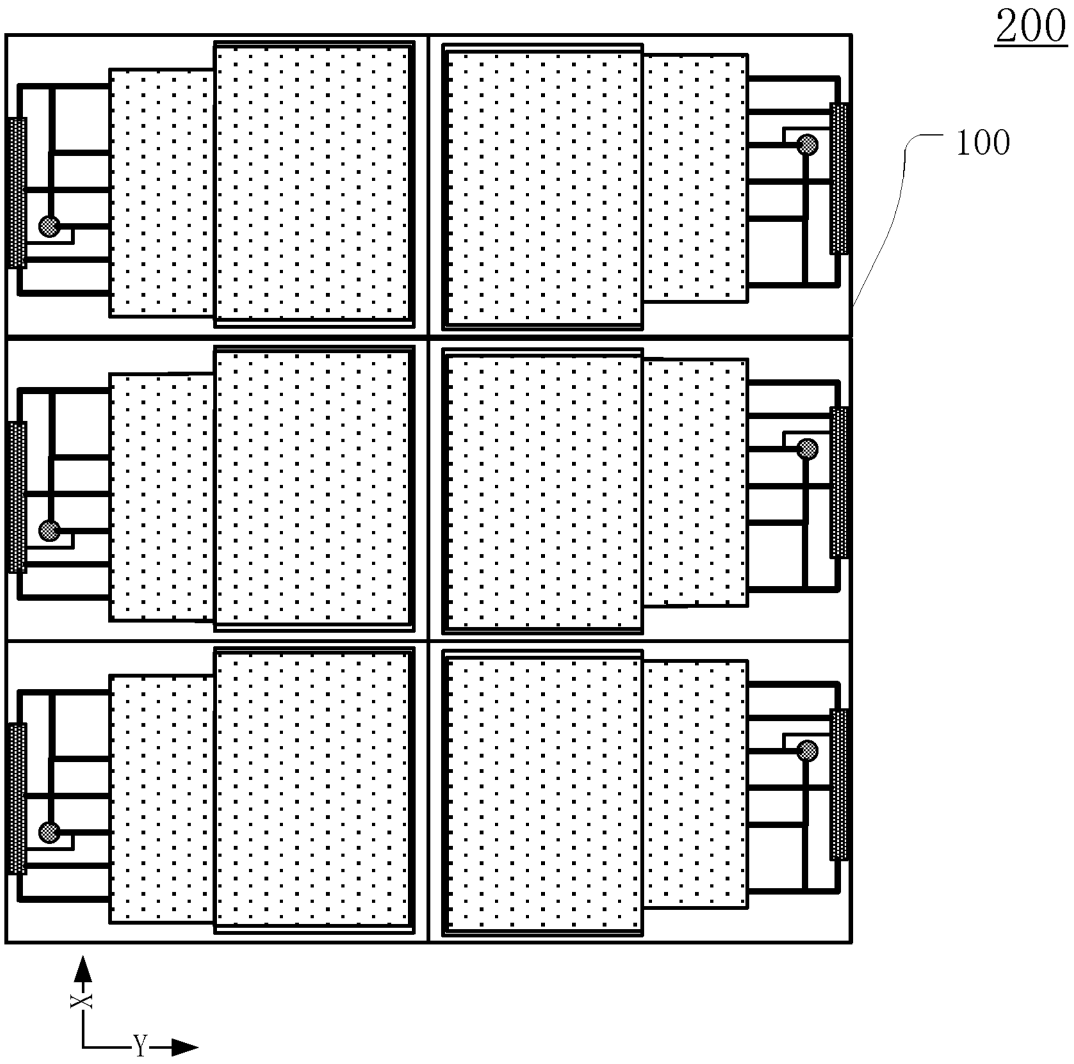
FIG. 6 illustrates a top view of an exemplary liquid crystal phase shifter group according to various disclosed embodiments of the present disclosure.

The present disclosure provides a liquid crystal phase shifter and a liquid crystal antenna to solve the above problems. FIG. 3 is a schematic top view of an exemplary liquid crystal phase shifter according to various disclosed embodiments of the present disclosure. FIG. 4 is an A-A'-sectional view in FIG. 3. FIG. 5 is a schematic top view of another exemplary liquid crystal phase shifter according to various disclosed embodiments of the present disclosure, and FIG. 6 is a top view of an exemplary liquid crystal phase shifter group according to various disclosed embodiments of the present disclosure.

As shown in FIGS. 3-6, in one embodiment, a liquid crystal phase shifter 100 may include a first substrate 1 and a second substrate 2 oppositely arranged, and a liquid crystal layer 3 located between the first substrate 1 and the second substrate 2. A side of the second substrate 2 adjacent to the first substrate 1 may include a first conductive layer 5, and the first conductive layer 5 may be connected to a constant potential. A side of the first substrate 1 adjacent to the second substrate 2 may include a second conductive layer 6, and the second conductive layer 6 may include a transmission electrode 7. The first substrate 1 may include a first area 8, and the first area 8 may be bonded with a circuit board 9. The liquid crystal phase shifter 100 may also include a radio frequency connector 10 and a driving chip 11, and the radio frequency connector 10 and the driving chip 11 may be both disposed in the second area 8. The radio frequency connector 10 and the driving chip 11 may transmit signals through the circuit board 9.

Specifically, the liquid crystal phase shifter 100 of this embodiment may include the first substrate 1 and the second substrate 2 that may be arranged opposite to each other, and the liquid crystal layer 3 located between the first substrate 1 and the second substrate 2. The liquid crystal layer 3 may include liquid crystal molecules 4. Referring to FIG. 4, a frame sealant 13 may also be disposed between the first substrate 1 and the second substrate 2 such that a sealed space may be formed between the first substrate 1 and the second substrate 2 to accommodate the liquid crystal molecules 4 between the first substrate 1 and the second substrate 2. It should be noted that the first substrate 1, the second substrate 2 and the liquid crystal layer 3 in this embodiment may form a liquid crystal cell, and the specific process of forming the liquid crystal cell may be set by those skilled in the art according to the actual situation and is not limited here. For example, the frame sealant 13 may be coated on the first substrate 1, and then the liquid crystal may be dispersed through the liquid crystal injection technology, and finally the first substrate 1 and the second substrate 2 may aligned and attached according to the alignment marks on the first substrate 1 and the second substrate 2, and the frame sealant may be cured 13 to allow the first substrate 1 and the second substrate 2 to stick together stably, and the liquid crystal cell may be obtained. The materials of the first substrate 1 and the second substrate 2 may also be set by those skilled in the art according to the actual situation. Exemplarily, the first substrate 1 and the second substrate 2 may be any hard material in glass or ceramics, or they may also be any flexible material in polyimide and silicon nitride. Because the above materials will not absorb radio frequency signals, for example, the insertion loss in the microwave frequency band may be small, it may be beneficial to reduce signal insertion loss and the loss of the signal during the transmission process may be significantly reduced. The first substrate 1 and the second substrate 2 are not filled with patterns in the figures of this embodiment, which is not limited here.

In one embodiment, the side of the second substrate 2 adjacent to the first substrate 1 may include the first conductive layer 5. The first conductive layer 5 may be on the entire surface, and the first conductive layer 5 may be connected to a constant potential, for example, it may be grounded. The side of the first substrate 1 adjacent to the second substrate 2 may include the second conductive layer 6, and the second conductive layer 6 may include a transmission electrode 7. In one embodiment, the transmission electrode 7 may be a microstrip line. In this embodiment, the materials of the first conductive layer 5 and the second conductive layer 6 may not be specifically limited, they may only need to be able to conduct electricity, for example, they may be made of metal conductive materials such as copper, etc.

It can be understood that the specific number, distribution and material of the transmission electrode 7 on the side of the first substrate 1 facing the second substrate 2 may be set by those skilled in the art according to the actual situation, and no specific limitation is made here. The figure of this embodiment only shows a wiring structure of one transmission electrode 7 as an example, including but not limited to this, and other layout structures may also be used, which are not limited in this embodiment. For example, the transmission electrode 7 may be zigzag-shaped (as shown in FIG. 3) or spiral-shaped (referring to FIG. 5) or other structures.

The first substrate 1 may include the first area 8, and the circuit board 9 may be bonded in the first area 8. The first area 8 may also include the radio frequency connector 10 and the driving chip 11. The radio frequency connector 10 may be connected to the transmission electrode 7 through the circuit board 9 to transmit radio frequency signals, while the radio frequency connector 10 may also provide a constant potential to the first conductive layer 5 through the circuit board 9. The driving chip 11 may transmit a bias signal to the transmission electrode 7 through the circuit board 9, and at the same time, the driving chip 11 may transmit the constant potential to the first conductive layer 5 through the circuit board 9. The bias signal of the transmission electrode 7 and the constant potential of the first conductive layer 5 may form an electric field that may control the deflection of the liquid crystal molecules 4 in the liquid crystal layer 3. At the same time, the radio frequency signal may be transmitted between the transmission electrode 7 and the first conductive layer 5 with an oscillating mode. Because of the deflection of the liquid crystal molecules 4, the dielectric constant of the liquid crystal layer 3 may be changed, and the radio frequency signal may realize the phase shift in the liquid crystal layer 3, achieving the effect of changing the phase of the microwave.

It can be understood that the first area 8 in the present disclosure may be a stepped area, and the schematic diagram of this embodiment only shows the situation that the first area 8 is a stepped area. In FIG. 3, the width of the first area 8 is in the second direction Y is for illustrative purposes only and is not intended to limit the actual product.

In one embodiment, as shown in FIG. 3, the liquid crystal phase shifter 100 may include an input terminal and an output terminal. One end of the transmission electrode 7 may be electrically connected to the input terminal (the first input soldering pad 22), and another end of the transmission electrode 7 may be electrically connected to the output terminal (the fourth output soldering pad 301).

The liquid crystal phase shifter 100 of the present disclosure may include a first edge 14 and a second edge 15 that are oppositely disposed along the second direction Y, and a third edge 16 and a fourth edge 17 that are oppositely disposed along the first direction X. When the circuit board 9 is bonded in the first area 8 (on the side adjacent to the first edge 14), the radio frequency connector 10 and the driving chip 11 in the first area 8 may transmit signals through the circuit board 9. Thus, the radio frequency connector 10 and the driving chip 11 may be disposed at the same side of the liquid crystal phase shifter 100. Compared with the configuration that the radio frequency connector and the driver chip are arranged on both sides of the liquid crystal phase shifter, the present disclosure may reduce the area of the frame in the liquid crystal phase shifter 100. In the related art, the radio frequency connector and the driving chip are arranged on both sides of the liquid crystal phase shifter, the layout difficulty of the signal wiring connecting the driving chip and the microstrip line is increased. In the present disclosure, because the driving chip 11 and the radio frequency connector 10 may all be electrically connected to the transmission electrode 7 through the circuit board 9. Thus, there may be no need to arrange wiring in the liquid crystal cell, which may reduce the difficulty of wiring in the liquid crystal cell. Further, referring to FIG. 3 and FIG. 6, because the driving chip 11 and the radio frequency connector 10 may be only disposed in the first area 8, the second edge 15, the third edge 16 and the fourth edge 17 may all be spliced. In the first direction X, the third edge 16 of one liquid crystal phase shifter 100 and the fourth edge 17 of another liquid crystal phase shifter 100 may be spliced, thus the linear splicing may be realized in the first direction X. In the second direction Y, the second edge 15 of one liquid crystal phase shifter 100 and the first edge 14 of another liquid crystal phase shifter 100 may be spliced, and thus the linear splicing may be realized in the second direction Y to form a liquid crystal phase shifter group 200. In another embodiment, in the second direction Y, the second edge 15 of one liquid crystal phase shifter 100 and the second edge 15 of another liquid crystal phase shifter 100 may be spliced (not shown in the figure) such that the linear splicing may be realized in the second direction Y to form the liquid crystal phase shifter group 200. Thus, the splicing practicability of the liquid crystal phase shifters 100 may be enhanced.

Figure 7:
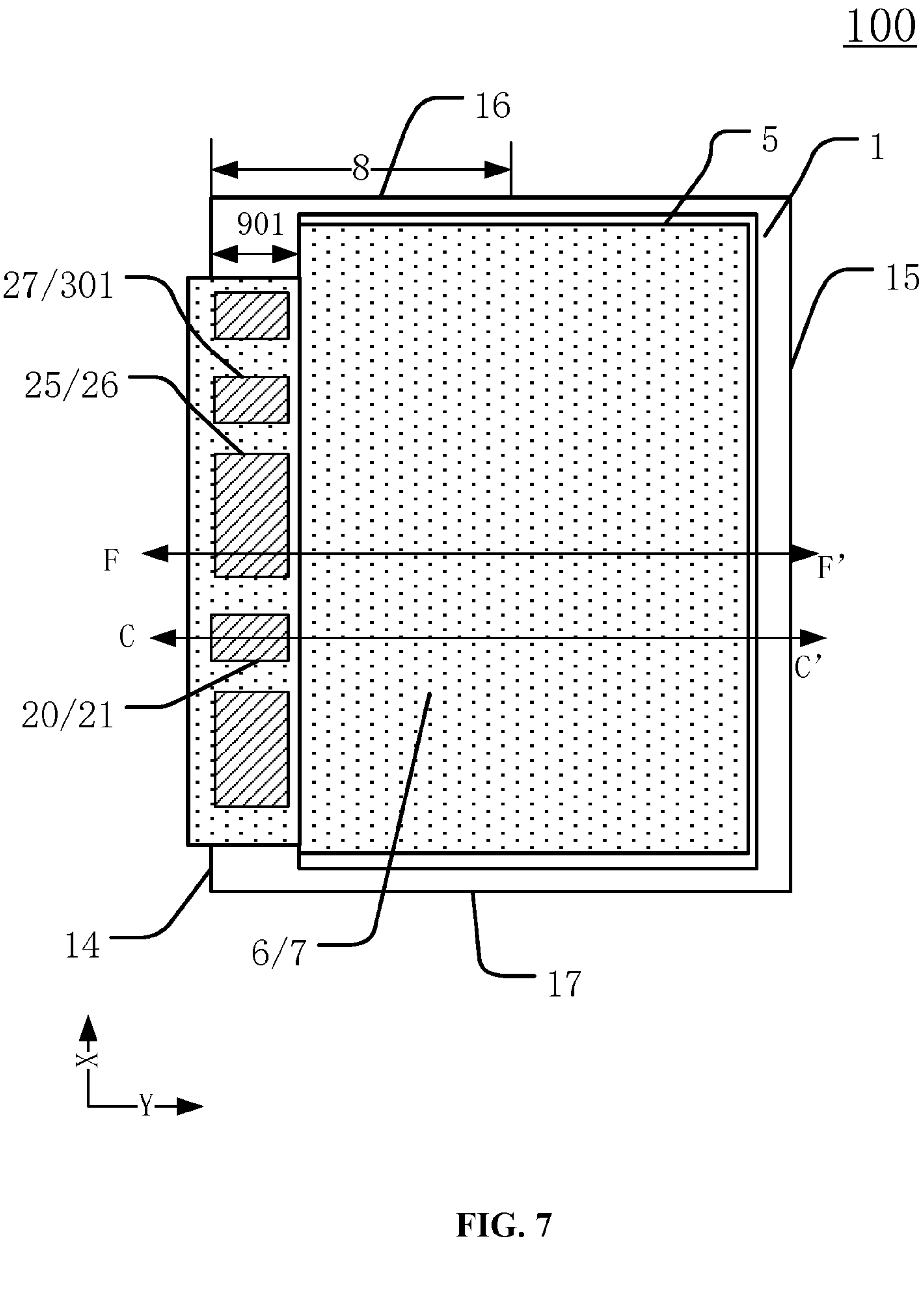
FIG. 7 illustrates a front view of an exemplary liquid crystal phase shifter according to various disclosed embodiments of the present disclosure.
Figure 8:
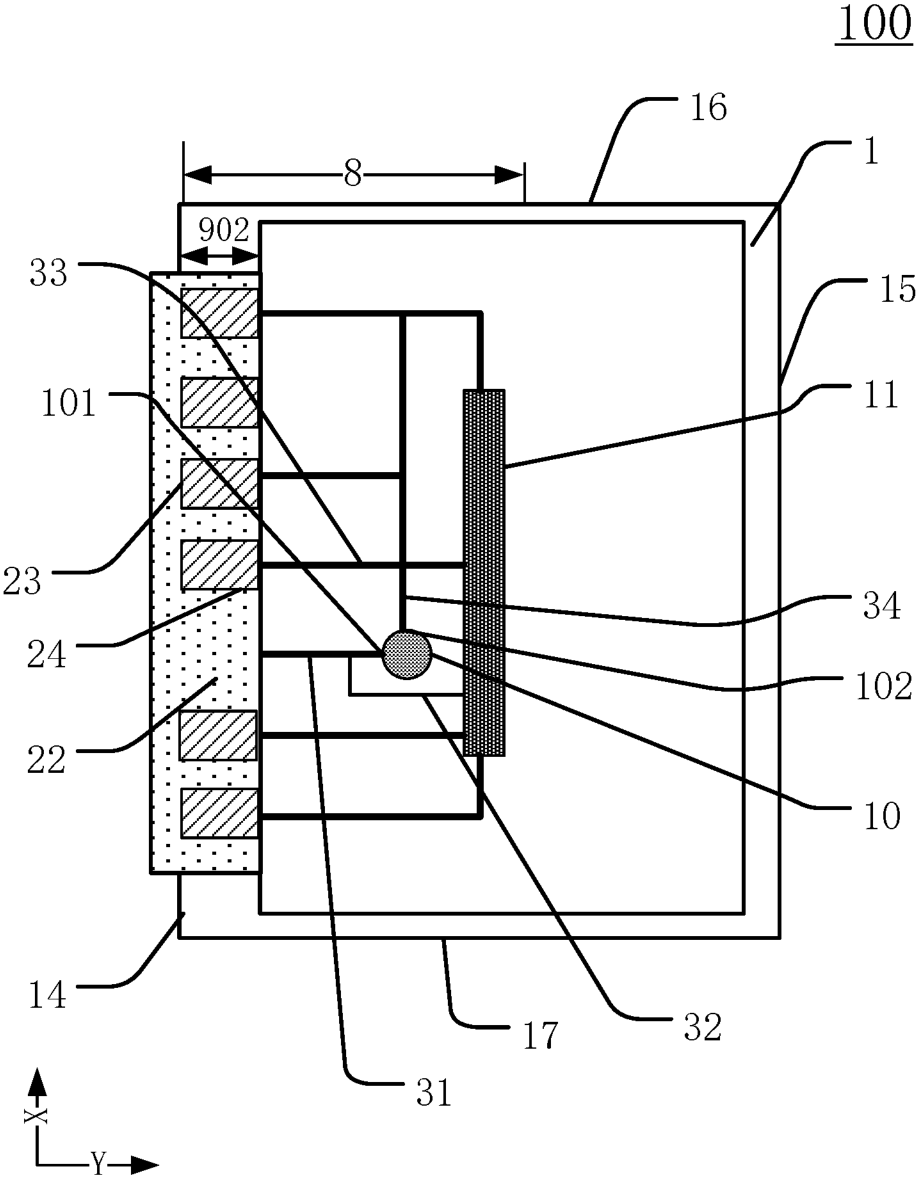
FIG. 8 illustrates a back view of an exemplary liquid crystal phase shifter according to various disclosed embodiments of the present disclosure.
Figure 9:
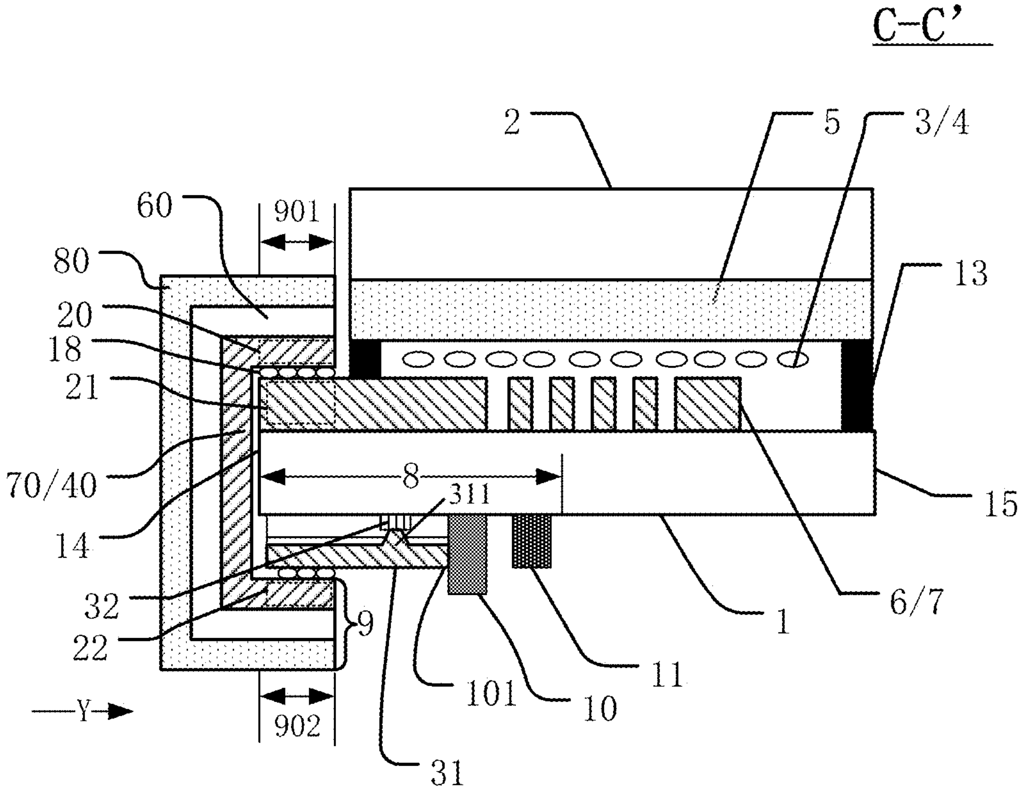
FIG. 9 illustrates a C-C'-sectional view in FIG. 8.

FIG. 7 is a front view of an exemplary liquid crystal phase shifter provided by the present disclosure. FIG. 8 is a back view of an exemplary liquid crystal phase shifter provided by the present disclosure. FIG. 9 is a C-C'-sectional view in FIG. 7. As shown in FIGS. 7-9, in some embodiments, the first substrate 1 may further include a first edge 14. The circuit board 9 may be bent to the side of the first substrate 1 away from the second substrate 2 along the first edge 14, and the radio frequency connector 10 and the driving chip 11 may be disposed on the side of the first substrate 1 away from the second substrate 2.

In one embodiment, the circuit board 9 may be a flexible circuit board 9, and the flexible circuit board 9 may be made of polyimide or polyester film as a base material and may have flexibility. Further, it may also have the characteristics of high wiring density, light weight, and small thickness. The circuit board 9 may be bent to the side of the first substrate 1 away from the second substrate 2 along the first edge 14, and the radio frequency connector 10 and the driving chip 11 may be located on the side of the first substrate 1 away from the second substrate 2 such that the area of the frame in the front of the liquid crystal phase shifter 100 may be further reduced.

It should be noted that the first area 8 in this embodiment may include the stepped area where the circuit board 9 is bonded, and may also include a portion of the first substrate 1 away from the second substrate 2.

The front side of the liquid crystal phase shifter 100 (i.e., the side of the first substrate 1 adjacent to the second substrate 2) may only need to reserve a step area to bond the circuit board 9. The flexible circuit board 9 may be bent to the back side of the first substrate 1, for example, may be bent to the side of the first substrate 1 away from the second substrate 2. By arranging the driving chip 11 and the radio frequency connector 10 on the back side of the liquid crystal phase shifter 100 (a side of the first substrate 1 away from the side of the second substrate 2), a narrow frame of the liquid crystal phase shifter 100 may be realized.

The driving chip 11 and the radio frequency connector 10 in this embodiment may be disposed on the side of the first substrate 1 away from the second substrate 2, and may be electrically connected to the transmission electrode 7 through the circuit board 9, wiring may not need to be disposed in the liquid crystal cell, and the difficulty of wiring in the liquid crystal cell may be reduced. Further, referring to FIG. 7, because the driving chip 11 and the radio frequency connector 10 may be arranged on the side of the first substrate 1 away from the second substrate 2, the second edge 15, the third edge 16 and the fourth edge 17 may be spliced. In the first direction X, the third edge 16 of one liquid crystal phase shifter 100 and the fourth edge 17 of another liquid crystal phase shifter 100 may be spliced, and a linear splicing may be achieved in the first direction X. In the second direction Y, the second edge 15 of one liquid crystal phase shifter 100 and the first edge 14 of another liquid crystal phase shifter 100 may be spliced, and a linear splicing may be realized in the second direction Y. In some embodiments, in the second direction Y, the second edge 15 of one liquid crystal phase shifter 100 and the second edge 15 of the other liquid crystal phase shifter 100 may be spliced and the linear splicing may be realized in the second direction Y. Thus, the splicing practicality of the liquid crystal phase shifter 100 may be improved.

In some embodiments, referring to FIG. 3 and FIG. 4, the radio frequency connector 10 and the driving chip 11 may be disposed on a side of the first substrate 1 adjacent to the second substrate 2.

In this embodiment, the radio frequency connector 10 and the driving chip 11 may be disposed on the side of the first substrate 1 adjacent to the second substrate 2. In this configuration, the area of the first substrate 1 may be set to be larger than the area of the second substrate 2, for example, the first substrate 1 may be enlarged, and the first area 8 may be reserved on one side of the first substrate 1, and the radio frequency connector 10 and the driving chip 11 may be disposed on the side of the first substrate 1 adjacent to the second substrate 2.

Such a configuration may also solve the problems existing in the related art, and realize the narrow frame of the liquid crystal phase shifter 100. At the same time, the driving chip 11 and the radio frequency connector 10 may be disposed on the side of the first substrate 1 adjacent to the second substrate 2, and may be electrically connected to the transmission electrode 7 through the circuit board. Thus, there may be no need to arrange wiring in the liquid crystal cell, and the difficulty of wiring in the liquid crystal cell may be reduced. Moreover, splicing may be realized in both the first direction X and the second direction Y. Thus, the splicing practicability of the liquid phase shifter 100 may be improved.

In some embodiments, referring to FIG. 3, FIG. 4, FIG. 7, FIG. 8 and FIG. 9, the circuit board 9 may include a first end 901 and a second end 902. The first end 901 of the circuit board 9 may be bonded with the first area 8. The first end 901 of the circuit board 9 may include a first output soldering pad 20. The first output soldering pad 20 may be electrically connected to the first bonding soldering pad 21 in the first area 8. The first bonding soldering pad 21 may be electrically connected to one end of the transmission electrode 7. The second end 902 of the circuit board 9 may include a first input soldering pad 22. The radio frequency connector 10 may include a radio frequency input terminal 101. The first input soldering pad 22 may be electrically connected to the radio frequency input terminal 101 and the driving chip 11, respectively.

The first end 901 of the circuit board 9 may include the first output soldering pad 20. The first output soldering pad 20 may be electrically connected to the first bonding soldering pad 21 in the first area 8, and the first bonding soldering pad 21 may be electrically connected to one end of the transmission electrode 7. In one embodiment, they may be electrically connected through conductive particles. In some embodiments, the transmission electrode 7 and the first bonding soldering pad 21 may be made of a same metal in a same layer and by a same process. In some embodiments, the transmission electrode 7 and the first bonding soldering pad 21 may be an integrated structure. If the transmission electrode 7 and the first bonding soldering pad 21 are arranged on different film layers, the overall film thickness of the liquid crystal phase shifter may be increased. When the transmission electrode 7 and the first bonding soldering pad 21 are integrated, the overall film thickness of the liquid crystal phase shifter 100 may not be increased, and the complexity of the process for forming the first bonding soldering pad 21 and the transmission electrode 7 may be reduced.

It should be noted that the connection line between the first input soldering pad 22 and the first output soldering pad 20 is not shown in FIG. 3, FIG. 7 and FIG. 8. The first input soldering pad 22 and the first output soldering pad 20 may have a one-to-one electrical connection, and may be used to transmit electrical signals. The connection lines for the electrical connection between the first input soldering pad 22 and the first output soldering pad 20 will be described in detail below.

The second end 902 of the circuit board 9 may include a first input soldering pad 22, and the first input soldering pad 22 may be electrically connected to the radio frequency input terminal 101 of the radio frequency connector 10 and the soldering pad of the driving chip 11, respectively. In one embodiment, metal wiring may be disposed on the first substrate 1, one end of the metal wiring may be electrically connected to the first input soldering pad 22 through conductive particles, and the other end may be respectively connected to the radio frequency input terminal 101 of the radio frequency connector 10 and the soldering pad of the driving chip 11. The radio frequency signal provided by the radio frequency connector 10 and the bias signal provided by the driving pad may be transmitted to the transmission electrode 7 through the first input soldering pad 22 at the same time. Because the frequency of the radio frequency signal may be different from the frequency of the bias signal, the signals may be transmitted to the transmission electrode 7 through the first output soldering pad 20 at the same time. The radio frequency signal and the bias signal may be transmitted through only one first input soldering pad 22, there may be no need to set two pads to electrically connect the radio frequency signal to the transmission electrode 7 and electrically connect the bias signal to the transmission electrode 7. Accordingly, the difficulty of wiring may be reduced.

In some embodiments, referring to FIG. 3, FIG. 4, FIG. 5, FIG. 7, FIG. 8, and FIG. 9. The first substrate 1 may include the first connection line 31 and the second connection line 32. The first connection line 31 and the second connection line 32 may be located in different layers. One end of the first connection line 31 may be electrically connected to the radio frequency input terminal 101 of the radio frequency connector 10, and the other end of the first connection line 31 may be electrically connected to the first input soldering pad 22. One end of the second connection line 32 may be electrically connected to the driving chip 11, and the other end of the second connection line 32 may be electrically connected to the first connection line 31.

Specifically, in FIG. 4, the first connection line 31 and the second connection line 32 may be included on the side of the first substrate 1 adjacent to the second substrate 2 and, in FIG. 9, the first connection line 31 and the second connection line 32 may be included on the side of the first substate 1 away from the second substrate 2. In a direction perpendicular to the plane where the second substrate 2 is located, an insulation layer may be disposed between the first connection line 31 and the second connection line 32. The insulation layer is not filled and labeled in the figures. The first connection line 31 and the second connection line 32 may be distributed in different layers, which may avoid unnecessary winding when the first connection line 31 and the second connection line 32 are arranged on the same layer, as well as the crosstalk with other signals. In FIG. 8, different line thicknesses are used to distinguish the first connection line 31 and the second connection line 32. The line thickness is not used as the thickness of the connection line in the actual product, but only as the thickness to distinct the first connection line 31 and the second connecting line 32. As can be seen from FIG. 3, FIG. 5 and FIG. 8, one end of the first connection line 31 may be electrically connected to the radio frequency input terminal 101 of the radio frequency connector 10, and the other end of the first connection line 31 may be electrically connected to the first input soldering pad 22. Thus, the radio frequency signal output by the radio frequency input terminal 101 of the radio frequency connector 10 may be transmitted to the first input soldering pad 22 through the first connection line 31. Because the first input soldering pad 22 may be electrically connected to the first bonding soldering pad 21, the first bonding soldering pad 21 may be electrically connected to the transmission electrode 7, the radio frequency signal may be transmitted to the first input soldering pad 22, the first output soldering pad 20, and the first bonding soldering pad 21 through the first connection line 31 to reach the transmission electrode 7, the radio frequency signal may be oscillated and transmitted between the transmission electrode 7, the liquid crystal layer 3 and the first conductive layer 5 to realize a phase change. At the same time, one end of the second connection line 32 may be electrically connected to the driving chip 11, and the other end may be electrically connected to the first connection line 31, the bias signal provided by the driving chip 11 may be transmitted to the first connection line 31 through the second connection line 32, and then transmitted to the first input soldering pad 22 and the first output soldering pad 20, the first bonding soldering pad 21 and may reach the transmission electrode 7 through the first connection line 31. The bias signal and the constant potential of the first conductive layer 5 may form an electric field that controls the deflection of the liquid crystal molecules 4, and the dielectric constant of the liquid crystal layer 3 may be changed.

It can be understood that the first input soldering pad 22 may be electrically connected to the first output soldering pad 20 to ensure that the first input soldering pad 22 may be able to transmit the radio frequency signal and the bias signal to the first output soldering pad 20.

It should be noted that the first connection line 31 may be directly electrically connected to the first input soldering pad 22, and the first connection line 31 may not only transmit the radio frequency signal, but also transmit the bias signal. The frequency of the bias signal may be generally low, and the coupling connection may be able to transmit the radio frequency signal, but not transmit the bias signal. Thus, the first connection line 31 may be directly electrically connected to the first input soldering pad 22. In addition, the coupling-feedback connection may increase coupling loss. The configuration that the first connection line 31 is directly electrically connected to the radio frequency input terminal 101 of the radio frequency connector 10 may reduce the coupling power consumption.

In one embodiment, one end of the first connection line 31 may be electrically connected to the radio frequency input terminal 101 of the radio frequency connector 10, the other end of the first connection line 31 may be electrically connected to the first input soldering pad 22, one end of the second connection line 32 may be electrically connected to the driving chip 11, and the other end of the second connection line may be electrically connected the first connection line 31, thereby realizing the input of the radio frequency signal and the bias signal through the first input soldering pad 22 of the circuit board 9, and at the same time, reducing the wiring difficulty. Further, the first connection line 31 may be electrically connected to the radio frequency input terminal 101 of the radio frequency connector 10, the coupling loss caused by the coupling-feedback power may be reduced.

In some embodiments, referring to FIG. 4 and FIG. 9, the second connection line 32 may be connected to the first connection line 31 through a via hole 311.

Specifically, in FIG. 4, the second connection line 32 may be located on the side of the first substrate 1 adjacent to the second substrate 2, and the first connection line 31 may be located on the side of the second connection line 32 away from the first substrate 1, and an insulation layer may be disposed between the first connection line 31 and the second connection line 32. The first connection line 31 and the second connection line 32 may be connected through a via hole 311. In FIG. 9, the first connection line 31 may be located on the side of the second connection line 32 away from the first substrate 1, an insulation layer may be disposed between the first connection line 31 and the second connection line 32, and the first connection line 31 and the second connecting line 32 may be connected through a via hole 311.

The first connecting connection line 31 and the second connection line 32 may be distributed in different layers, which may avoid unnecessary winding and crosstalk with other signal wires if the first connection line 31 and the second connection line 32 are distributed on the same layer. The connection between the second connection line 32 and the first connection line 31 may be realized through the via hole 311, thereby reducing winding.

Figure 10:
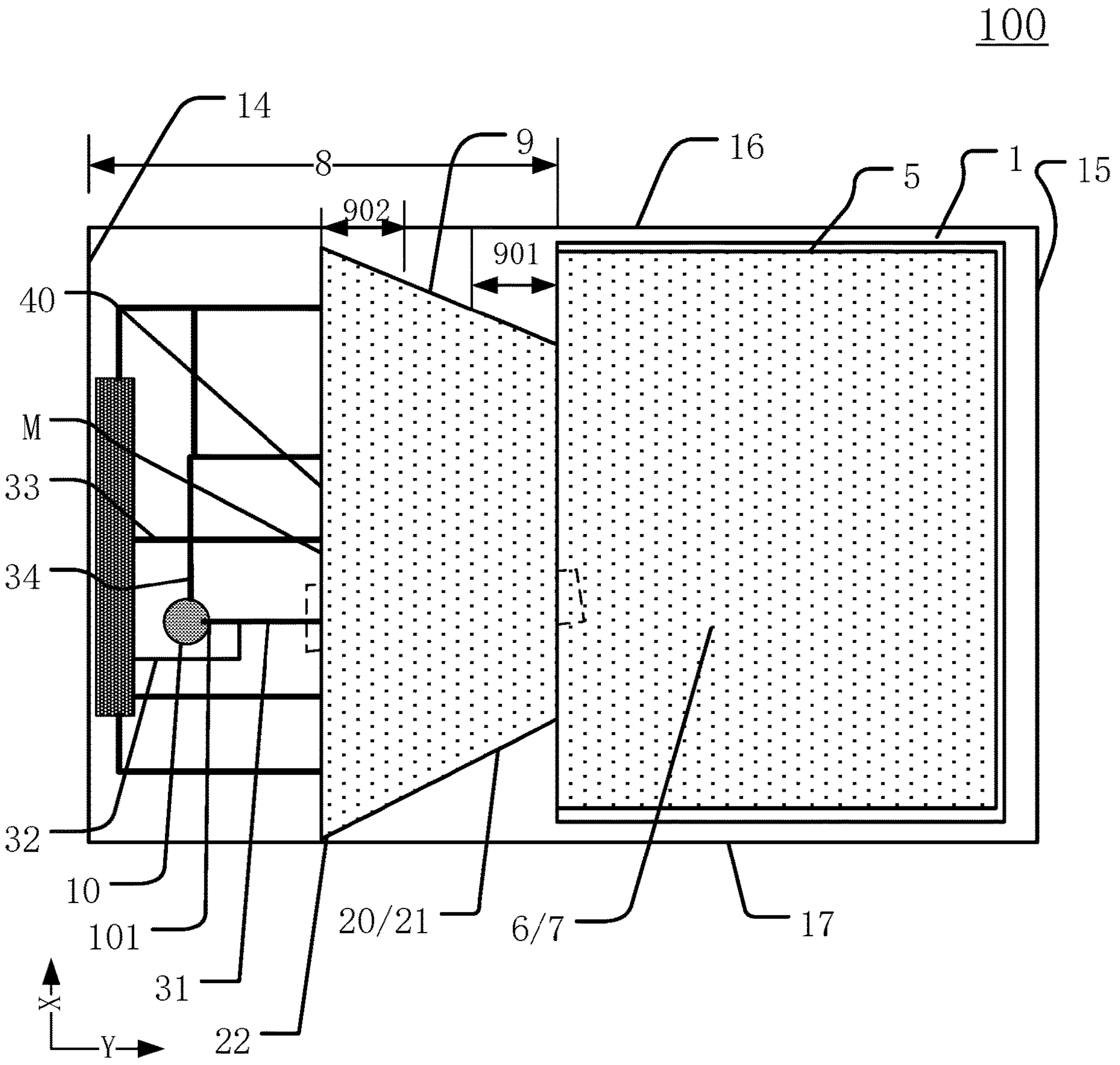
FIG. 10 illustrates a top view of another exemplary liquid crystal phase shifter according to various disclosed embodiments of the present disclosure.
Figure 11:
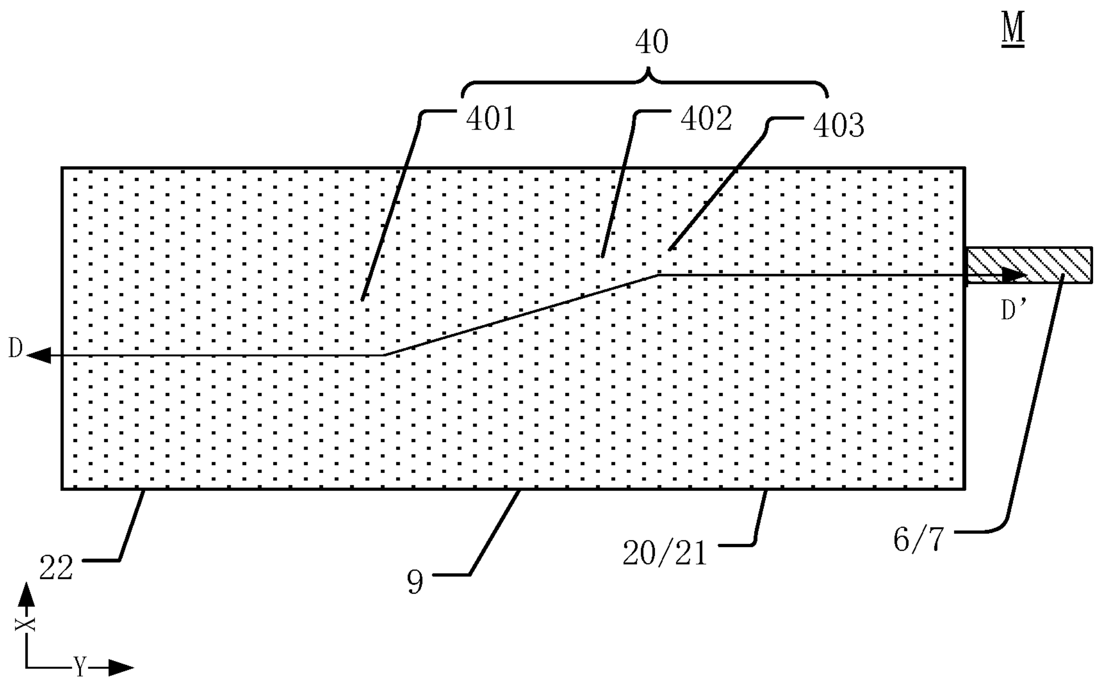
FIG. 11 illustrates a partially zoomed-in view of an M-region in FIG. 10.
Figure 12:
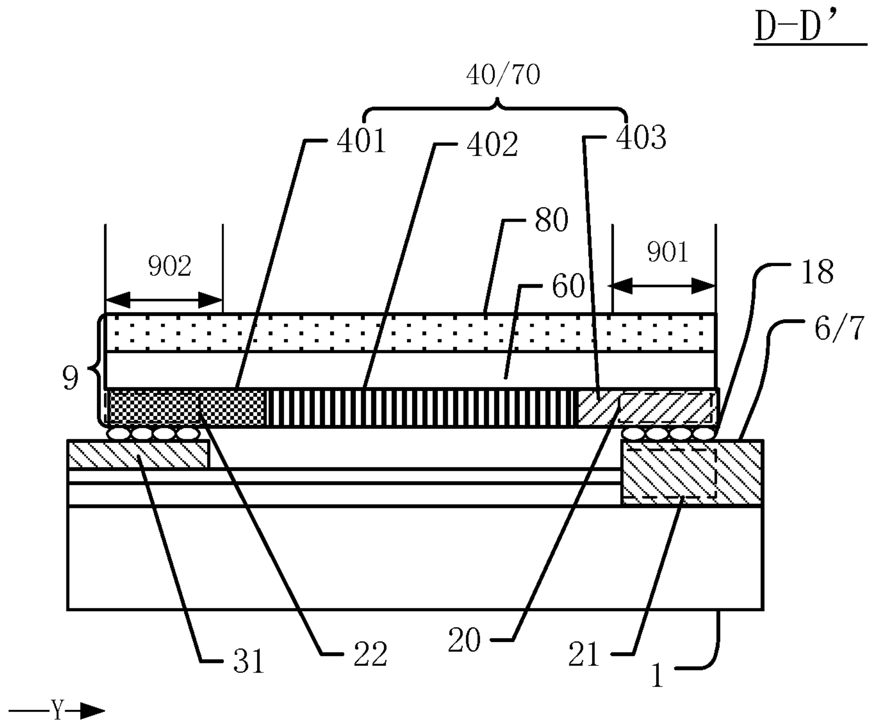
FIG. 12 illustrates a D-D'-sectional view in FIG. 10.

FIG. 10 is a schematic top view of another exemplary liquid crystal phase shifter according to various disclosed embodiments, FIG. 11 is a partially enlarged view of the area M in FIG. 10, and FIG. 12 is a D-D'-sectional view in FIG. 11. As shown in FIGS. 10-12, in some embodiments, the circuit board may include a third connection line 40. The third connection line 40 may include a first line subsegment 401, a second line subsegment 402 and a third line subsegment. The first line subsegment 401 may include a first input soldering pad 22, and the third line subsegment 403 may include a first output soldering pad 20. The impedance of the output terminal of the first line subsegment 401 may be Z1, the impedance of the second line subsegment 402 may be Z2, and the impedance of the third line subsegment 403 may be Z3. The third line subsegment 403 may be a ¼ wavelength transmission line, and $$Z2 = \frac{Z1^2}{Z3}.$$

In this embodiment, only the configuration that the radio frequency connector 10 and the driving chip 11 are located on the side of the first substrate 1 adjacent to the second substrate 2 is used as an example for schematic illustration. The wiring of the third connection line 40 in FIG. 7 and FIG. 8 may be referred to FIG. 10 to FIG. 12, there are no examples in the drawings, details will not be repeated here.

It can be understood that, in the direction perpendicular to the plane where the first substrate 1 is located, the portion of the first line subsegment 401 that overlaps and is electrically connected to the first connection line 31 may be the first input soldering pad 22, and the portion of the third line subsegment 403 overlapping and electrically connected to the first bonding soldering pad 21 may be the first output soldering pad 20. The first bonding soldering pad 21 may be made of the same material and process as the transmission electrode 7 of the second conductive layer 6. In some embodiment, the first bonding soldering pad 21 and the transmission electrode 7 of the second conductive layer 6 may be an integrated structure.

It should be noted that, on the one hand, the impedance of the material of the first input soldering pad 22 may be relatively low, while the impedance of the material of the first output soldering pad 20 may be relatively high, resulting in a mismatch of impedance caused by that the first input soldering pad 22 and the first output soldering pad 20 have different materials. On the other hand, as shown in FIG. 10, to realize the miniaturization of the circuit board 9 and thus the miniaturization of the liquid crystal phase shifter 100, the width of the first output soldering pad 20 in the first direction X may be smaller than the width of the first input soldering pad 22 in the first direction X. Thus, if the first line subsegment 401 and the second line subsegment 402 are directly electrically connected, the impedance Z1 of the output end of the first line subsegment 401 may not match the input impedance Z3 of the third line subsegment 403. The output end of the first sub-segment 401 may be referred to the end of the first line subsegment 401 adjacent to the third line subsegment 403, and the input end of the third line subsegment 403 may be referred to the end of the third line subsegment 403 adjacent to the first line subsegment 401. If the impedance Z1 of the output terminal of the first line subsegment 401 does not match the impedance Z3 of the input end of the third line subsegment 403, a return loss may occur. To realize the impedance matching of the first line subsegment 401 and the third line subsegment 403, that is, Z1=Z3, in one embodiment, a second line subsegment 402 (characteristic impedance section) may be disposed between the first line subsegment 401 and the third line subsegment 403 for impedance matching. Impedance matching may be referred to a suitable matching method between the signal source or transmission line and the load. In one embodiment, the material of the second line subsegment 402 may be different from the material of the first line subsegment 401 and the third line subsegment 403, for example, different substances may be doped to change the impedance.

The impedance of the first line subsegment 401 may be Z1, and the impedance of the third line subsegment 403 may be Z3. According to the impedance formula, $$Z1 = Z2\frac{Z3 + jZ1\tan\beta 1}{Z1 + jZ3\tan\beta 1},$$

j is an imaginary number unit, $j^2=-1$, and β1 is the phase of the radio frequency signal. From this impedance formula, it can be known that there may be a number of parameters many influencing the impedance. Thus, the second line subsegment 402 in the present disclosure may be a ¼ wavelength transmission line, then $$\beta 1 = (2n+1)\frac{\pi}{2}.$$

Thus, tan β1=0, and the impedance formula may be $$Z1 = Z2\frac{Z3}{Z1}.$$

Accordingly, $$Z2 = \frac{Z1^2}{Z3}.$$

In the present disclosure, the second line subsegment 402 may be a ¼ wavelength transmission line. By adjusting $$Z2 = \frac{Z1^2}{Z3},$$

the impedance Z1 of the output end of the first line subsegment 401 may be matched with the impedance Z3 of the input end of the third line subsegment 403 to avoid the return loss.

In some embodiments, referring to FIGS. 10-12, the first line subsegment 401 may be made of copper, silver, gold, a combination of copper and silver, or a combination of copper and gold; and the third line subsegment 403 may be a laminated structure of indium tin oxide, silicon nitride and copper.

The impedance of the first line subsegment 401 may be smaller than the impedance of the third line subsegment 403. One of the reasons may be that the materials are different. The material of the first line subsegment 401 may include copper, or the material of the first line subsegment 401 may include silver, or gold, a combination of copper and silver, or a combination of copper and gold. Copper, silver, and gold are materials with relatively small impedance. The third line subsegment 403 may a laminated structure made of indium tin oxide, silicon nitride, and copper. The impedance of the third line subsegment 403 formed by such a laminated structure may be relatively high. If the first line subsegment 401 and the third line subsegment 403 are directly electrically connected, the impedance of the output end of the first line subsegment 401 and the impendence of the input end of the third line subsegment 403 may not match, resulting in the return loss. As can be seen from the above, the present disclosure disposes the second line subsegment 402 between the first line subsegment 401 and the third line subsegment 403, the second sub-line 402 may be an impedance matching segment, and the second line subsegment 402 may be a ¼ wavelength transmission line. By adjusting $$Z2 = \frac{Z1^2}{Z3},$$

the impedance Z1 at the output end of the first line subsegment 401 may be matched with the impedance Z3 of the input end of the third line subsegment 403 to avoid the return loss.

Figure 13:
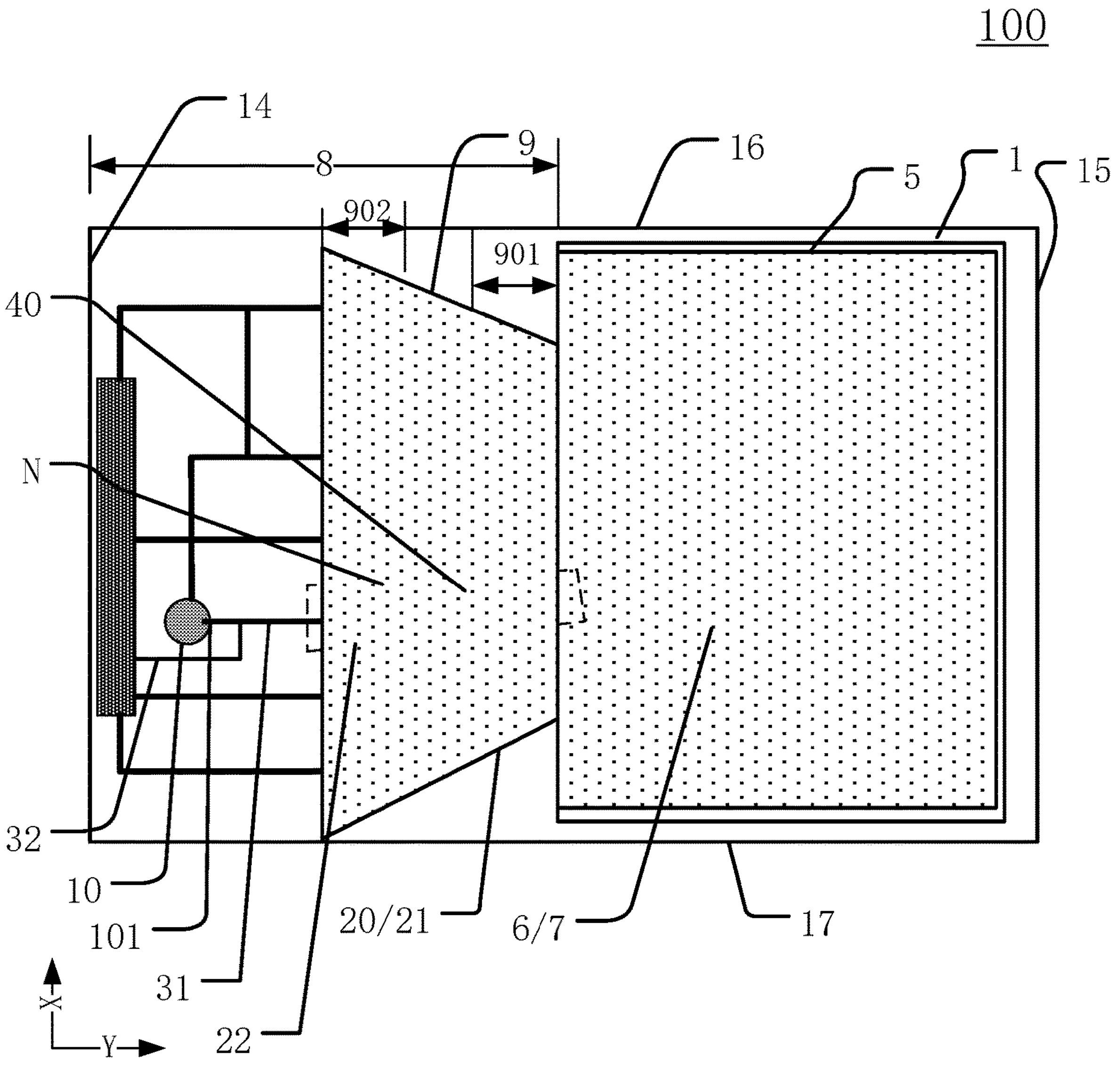
FIG. 13 illustrates a top view of another exemplary liquid crystal phase shifter according to various disclosed embodiments of the present disclosure.
Figure 14:
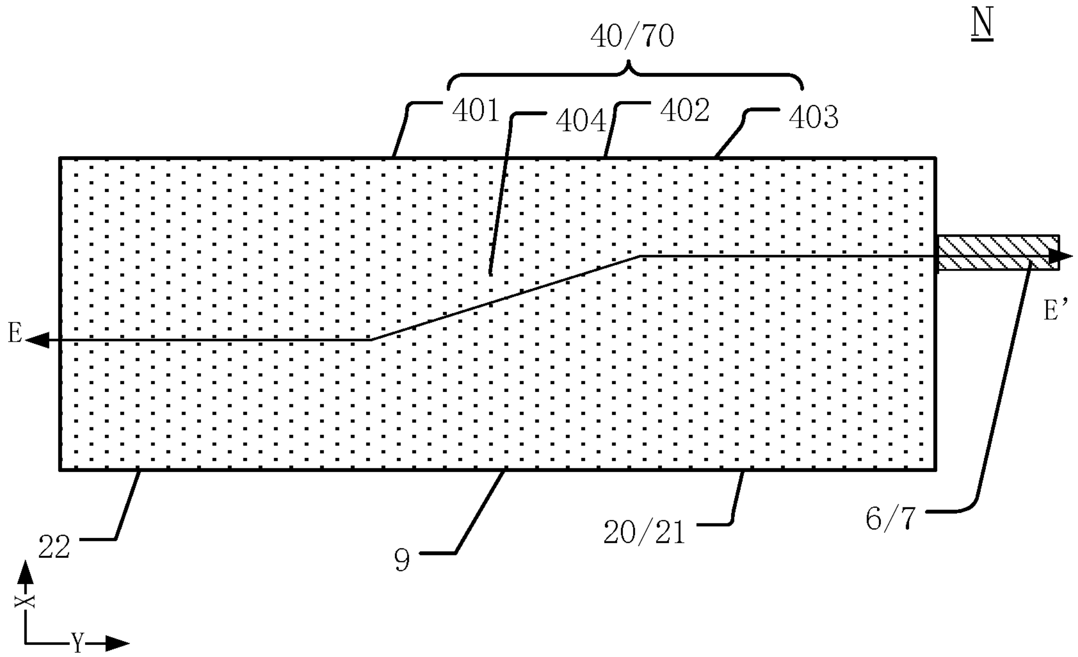
FIG. 14 illustrates a partially zoomed-in view of an N-region in FIG. 13.
Figure 15:
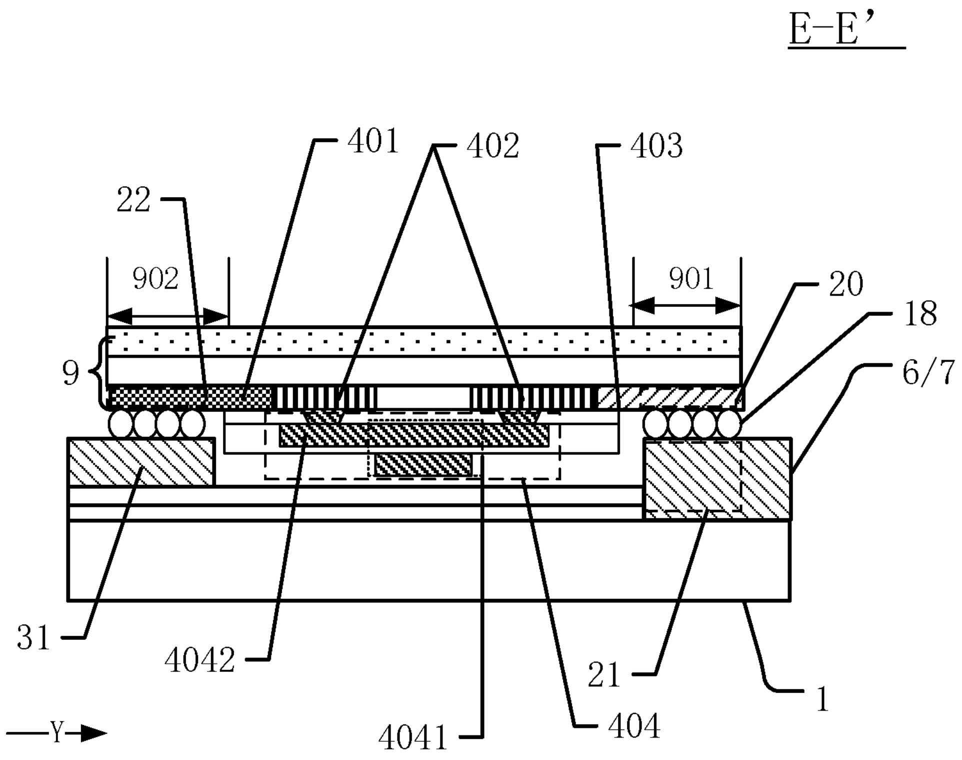
FIG. 15 illustrates an E-E'-sectional view in FIG. 14.

FIG. 13 is a schematic plan view of another exemplary liquid crystal phase shifter according to various disclosed embodiments of the present disclosure, FIG. 14 is a partially enlarged view of an N area in FIG. 13, and FIG. 15 is an E-E'-sectional view in FIG. 14. As shown in FIGS. 13-15, in the first direction X, the width of the first line subsegment 401 may be greater than the width of the second line subsegment 402, the width of the second line subsegment 403 may be greater than the width of the third line subsegment 403. The first direction X may intersect the extending direction of the first line subsegment 401. The second line subsegment 402 may be connected with a load structure 404 in series.

Specifically, the width of the first line subsegment 401 in the first direction X, the width of the second line subsegment 402 in the first direction X, and the width of the third line subsegment 403 in the first direction X may be decreased in sequence; and the second line subsegment 402 may be connected with the load structure 404 in series. In one embodiment, the second line subsegment 402 may include two sub-sections, and the load structure 404 may be connected in series between the two sub-sections. The load structure 404 may be distributed in a layer different from the second line subsegment 402. As shown in FIG. 15, the load structure 404 may be located on the side of the second line subsegment 402 adjacent to the first substrate 1, and an insulation layer may also be disposed between the load structure 404 and the second line subsegment 402. The insulation layer does not have the pattern filling in the figure. The load structure 404 may be connected in series with the two sub-sections of the second line subsegment 402 through via holes.

In one embodiment, the total impedance of the load structure 404 and the second line subsegment 402 may be Z2; and the load structure 404 may also be a ¼ wavelength transmission line. Thus, by adjusting the total impedance Z2 of the load structure 404 and the second sub-line section 402, $$Z2 = \frac{Z1^2}{Z3},$$

the impedance Z1 of the output end of the first line subsegment 401 may match the impedance Z3 of the input end of the third line subsegment 403, and the return loss may be avoided.

In some embodiments, referring to FIG. 15, the load structure 404 may include a resistor 4042 and/or a capacitor 4041.

In FIG. 15, the load structure 404 including a resistor 4042 and a capacitor 4041 is taken as an example for the schematic illustration. In some embodiments, the load structure 404 may include only the resistor 4042, or the load structure 404 may only include the capacitor 4041, which is not illustrated in the drawings.

In FIG. 15, the load structure 404 may be located on the side of the second line subsegment 402 adjacent to the first substrate 1, and the load structure 404 may be distributed in two metal layers: a first metal layer adjacent to the second line subsegment 402 and a second metal layer away from the second line subsegment 402. In the direction perpendicular to the plane where the first substrate 1 is located, the overlapped portions of the first metal layer and the second metal layer may constitute a capacitor 4041, and the two branches of the first metal layer and the second line subsegment 402 may be electrically connected through via holes. The portion of the first metal layer that does not overlap with the second metal layer may be the resistor 4042, and the capacitor 4041 and the resistor 4042 may be connected in series. The load structure 404 in this embodiment is only a possible implementation and is not specifically limited. The total impedance of the load structure 404 and the second line subsegment 402 may be Z2, and the load structure 404 may also be a ¼ wavelength transmission line, thus by adjusting the total impedance Z2 of the load structure 404 and the second line subsegment 402, $$Z2 = \frac{Z1^2}{Z3},$$

the impedance Z1 of the output end of the first line subsegment 401 may match with the impedance Z3 of the input end of the third line subsegment 403; and the return loss may be avoided.

Figure 16:
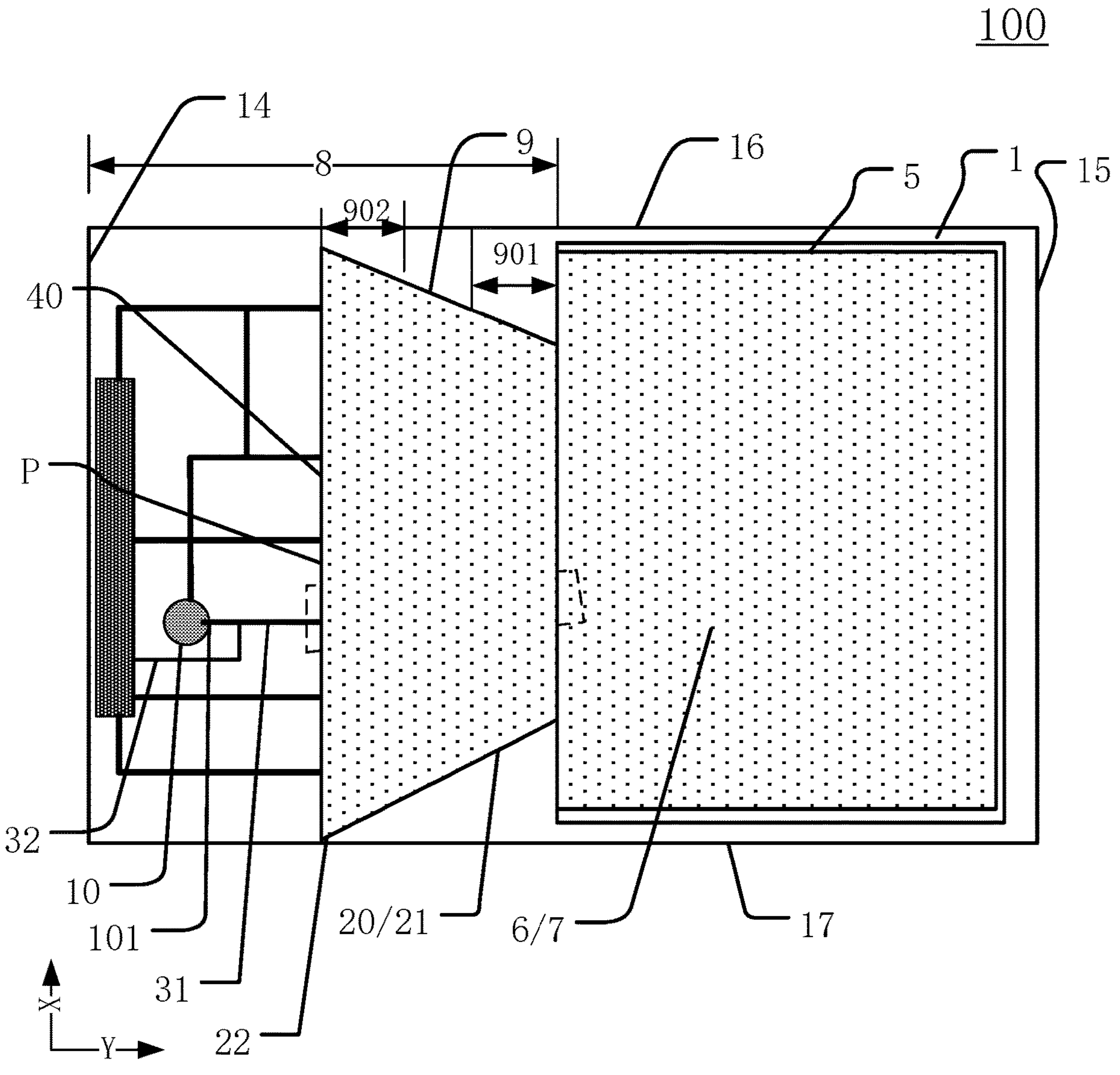
FIG. 16 illustrates a top view of another exemplary liquid crystal phase shifter according to various disclosed embodiments of the present disclosure.
Figure 17:
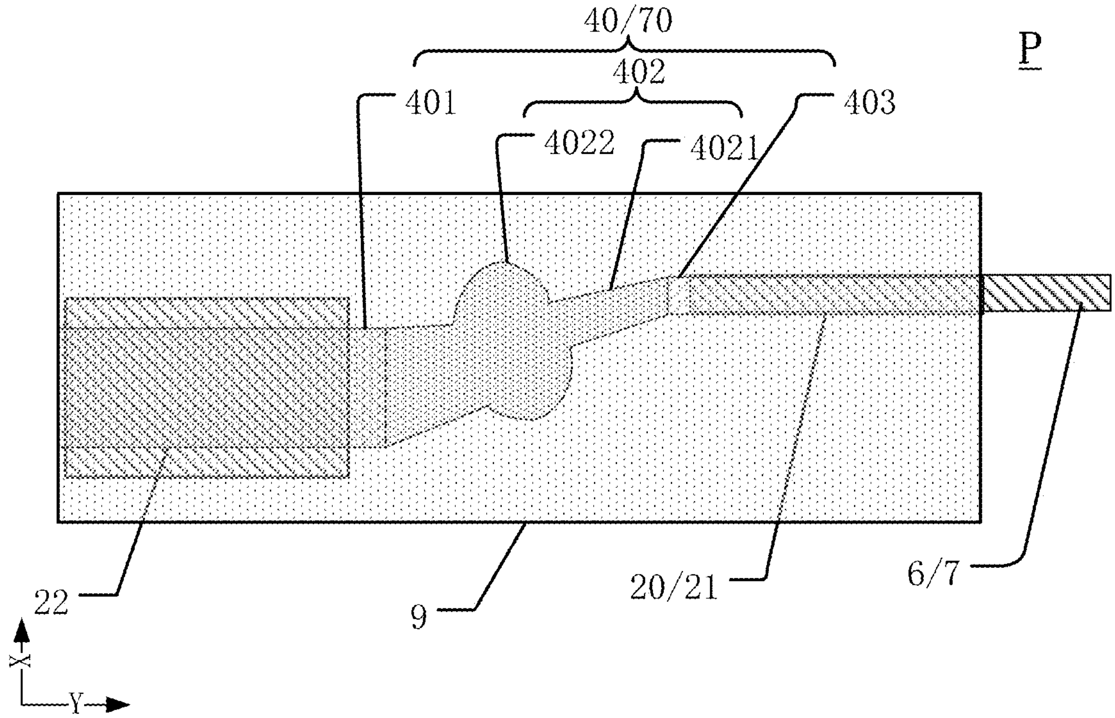
FIG. 17 illustrates a partially zoomed-in view of a P-Region in FIG. 16.

FIG. 16 is a schematic top view of another exemplary liquid crystal phase shifter according to various disclosed embodiments of the present disclosure, and FIG. 17 is a partially enlarged view of a P area in FIG. 16. As shown in FIGS. 16-17, in the first direction X, the width of the first line subsegment 401 may be greater than the width of the second line subsegment 402, and the width of the second line subsegment 402 may be greater than the width of the third line subsegment 403. The first direction X may intersect the extending direction of the first line subsegment 401. The second line subsegment 402 may at least include a buffer segment 4021 and a transition segment 4022. In the first direction X, the width of the transition segment 4022 may be greater than the width of the buffer segment 4021.

Specifically, the width of the first line subsegment 401 in the first direction X, the width of the second line subsegment 402 in the first direction X, and the width of the third line subsegment 403 in the first direction X may be decreased sequentially. FIG. 16 only uses the configuration that the outer edge of the transition segment 4022 is arc-shaped as an example, the outer edge of the transition segment 4022 may also be rectangular, which is not specifically limited here.

In one embodiment, the transition segment 4022 may be located in the middle of the buffer segment 4021. In other embodiments, the transition segment 4022 may also be located at the end connected with the first line subsegment 401, or the transition segment 4022 may also be located at the end connected with the third sub-line 403.

In one embodiment, the width of the transition segment 4022 along the first direction X may be greater than the width of the buffer segment 4021 along the first direction X. Thus, the impedance Z2 of the second line subsegment 402 may be adjusted to satisfy $$Z2 = \frac{Z1^2}{Z3},$$

the impedance Z1 of the output end of the first line subsegment 401 may match the impedance Z3 of the input end of the third line subsegment 403, and the return loss may be avoided.

In some embodiments, referring to FIG. 3 to FIG. 9, the radio frequency connector 10 may provide a radio frequency signal, and the driving chip 11 may provide a bias signal, and the frequency of the radio frequency signal may be higher than the frequency of the bias signal.

Specifically, the frequency of the radio frequency signal provided by the radio frequency connector 10 may be usually much larger than the frequency of the bias signal provided by the driving chip 11. The radio frequency signal and the bias signal may have different frequencies and may not affect each other, thus they may pass through the wiring on the flexible circuit board 9 at the same time. The radio frequency signal and the bias signal may be transmitted to the transmission electrode 7 to simplify the difficulty of wiring in the liquid crystal cell.

Figure 18:
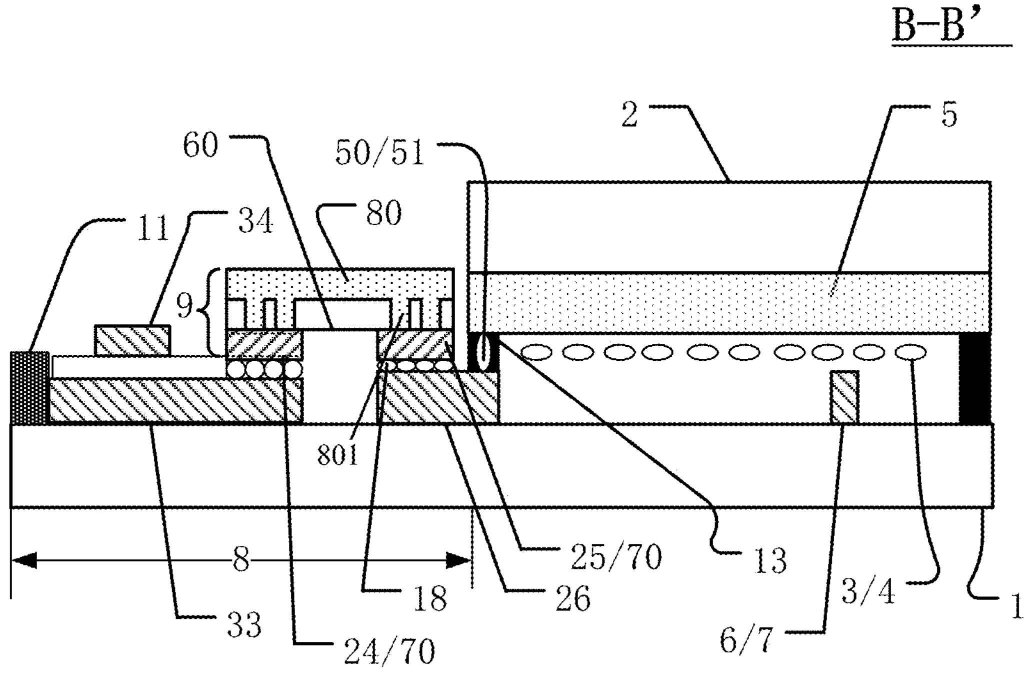
FIG. 18 illustrates a B-B'-sectional view in FIG. 3.
Figure 19:
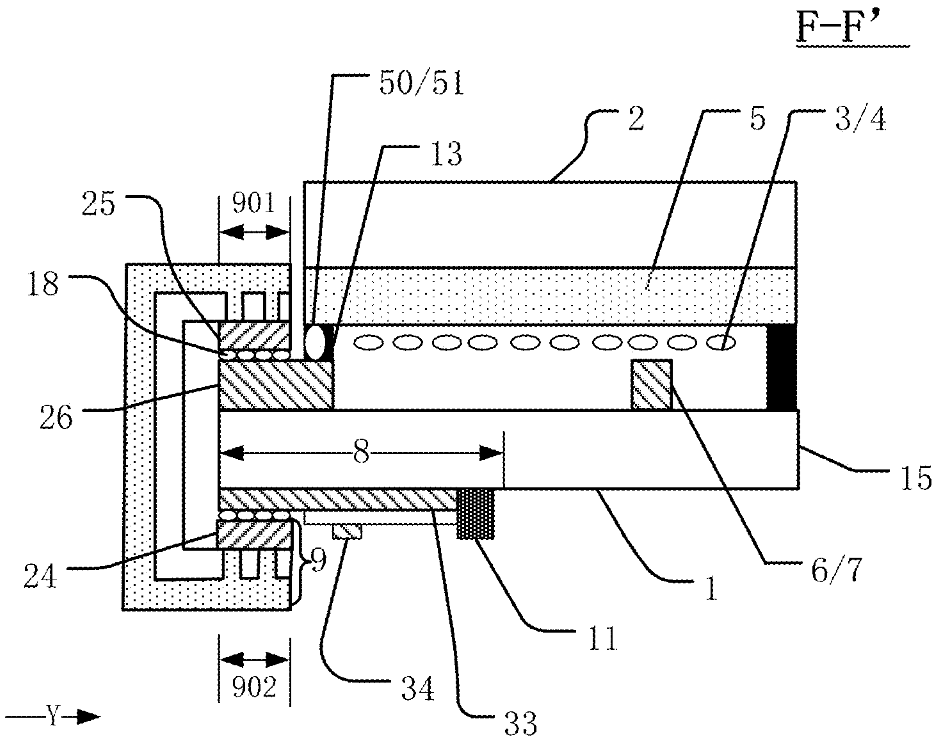
FIG. 19 illustrates an F-F'-sectional view in FIG. 7.

FIG. 18 is a B-B'-sectional view in FIG. 3, and FIG. 19 is an F-F'-sectional view in FIG. 7, and as shown in FIGS. 18-19 and referring to FIG. 7 and FIG. 8, in some embodiments, the radio frequency connector 10 may also include a ground terminal 102; the second end 902 of the circuit board 9 may also include a second input soldering pad 23 and a third input soldering pad 24. The ground terminal 102 and the second input soldering pad 23 may be electrically connected, and the ground signal of the driving chip 11 may be input to the third input soldering pad 24. The first end 901 of the circuit board 9 may also include the second output soldering pad 25. The second input soldering pad 23 and the third input soldering pad 24 may all be electrically connected to the second output soldering pad 25. The second output soldering pad 25 may be electrically connected to the second bonding soldering pad 26 in the first region 8, and the second bonding soldering pad 26 may be electrically connected to the first conductive layer 5.

Specifically, the first conductive layer 5 may need to be connected to a constant potential. Both the radio frequency connector 10 and the driving chip 11 may provide the first conductive layer 5 with a constant potential.

In some 1 embodiments, the second bonding soldering pad 26 and the transmission electrode 7 may be disposed on a same layer and may be made of a same material, and there may be no need to additionally provide a metal layer on the first substrate 1, which may facilitate thinning of the liquid crystal phase shifter 100.

In one embodiment, the second end 902 of the circuit board 9 may include the second input soldering pad 23 and the third input soldering pad 24. The ground terminal 102 of the radio frequency connector 10 may be electrically connected to the second input soldering pad 23, and the radio frequency ground signal may be transmitted to the second input soldering pad 23. The ground signal of the driving chip 11 may be input to the third input soldering pad 24, and the bias ground signal may be transmitted to the third input soldering pad 24. The first end 901 of the circuit board 9 may also include a second output soldering pad 25. The second input soldering pad 23 and the third input soldering pad 24 may all be electrically connected to the second output soldering pad 25, and the second output soldering pad 25 may be electrically connected to the second bonding soldering pad 26 in the first region 8. The second bonding soldering pad 26 may be electrically connected to the first conductive layer 5. The second output soldering pad 25 may receive the ground signal input by the second input soldering pad 23 and the third input soldering pad 24 and transmit it to the second bonding soldering pad 26. The second bonding pad 26 may be electrically connected to the first conductive layer 5, thereby transmitting the ground signal to the first conductive layer 5. The bias signal of the transmission electrode 7 and the constant potential of the first conductive layer 5 may form an electric field controlling the deflection of the liquid crystal molecules 4 in the liquid crystal layer 3. The radio frequency signal may be oscillated and transmitted between the transmission electrode 7 and the first conductive layer 5. Due to the deflection of the liquid crystal molecules 4, the dielectric constant of the liquid crystal layer 3 may be changed, and the phase shift by the liquid crystal layer 3 may be realized, and the effect of changing the phase of microwave may be achieved.

In some embodiments, continuing to refer to FIG. 3, FIG. 7, FIG. 8, FIG. 18 and FIG. 19, one side of the first substrate 1 may further include a fourth connection line 33 and a fifth connection ling 34. The fourth connection line 33 and the fifth connection line 34 may be located in different layers. One end of the fourth connection line 33 may be electrically connected to the driving chip 11, and the other end of the fourth connection line 33 may be electrically connected to the third input soldering pad 24. One end of the fifth connection line 34 may be electrically connected to the ground terminal 102 of the radio frequency connector 10, and the other end of the fifth connection line 34 may be electrically connected to the second input soldering pad 23.

In one embodiment, the ground terminal 102 of the radio frequency connector 10 may be electrically connected to the second input soldering pad 23 through the fifth connection line 34, and the driving chip 11 may be electrically connected to the third input soldering pad 24 through the fourth connection line 33. The fourth connection line 33 and the fifth connection line 34 may be disposed in different layers. The fourth connection line 33 and the fifth connection line 34 may be made of the same material, and the fourth connection line 33 and the fifth connection line 34 may also be made of different materials, which are not specifically limited here. FIG. 18 shows that the fourth connection line 33 may be directly formed on the side of the first substrate 1 adjacent to the second substrate 2, and the fifth connection line 34 may be located on the side of the fourth connection line 33 away from the first substrate 1. An insulation layer may be disposed between the fourth connection line 33 and the fifth connection line 34. The insulation layer is not pattern-filled in the figure. FIG. 19 shows that the fourth connection line 33 may be formed on the side of the first substrate 1 away from the second substrate 2, the fifth connection line 34 may be located on the side of the fourth connection line 33 away from the first substrate 1, and an insulation layer may be formed between the fourth connection line 33 and the fifth connection line 34.

In one embodiment, the ground signal of the driving chip 11 may be transmitted to the third input soldering pad 24 through the fourth connection line 33, and the ground signal of the radio frequency connector 10 may be transmitted to the second input pad 23 through the fifth connection line 34.

Figure 20:
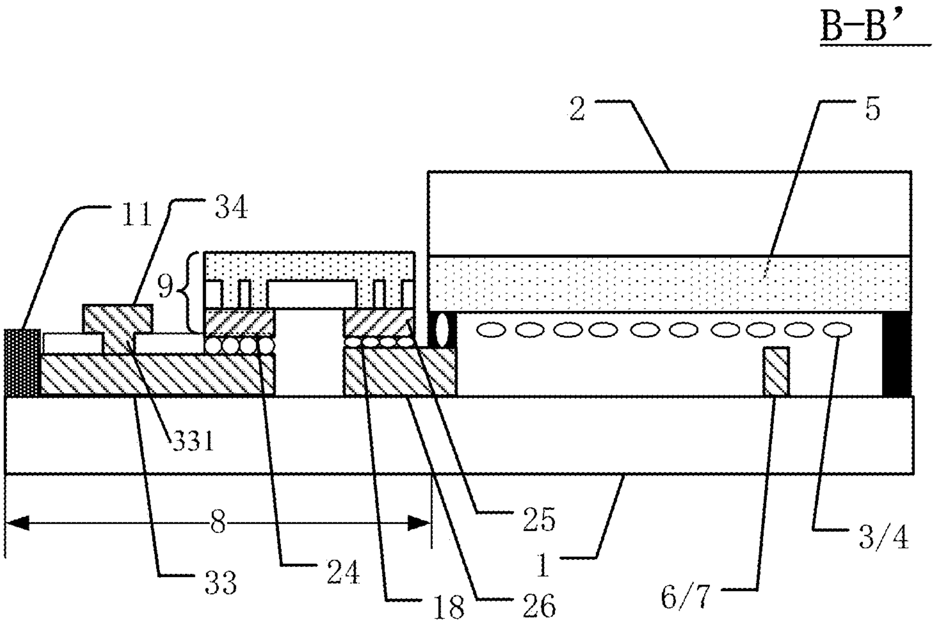
FIG. 20 illustrates another B-B'-sectional view in FIG. 3.
Figure 21:
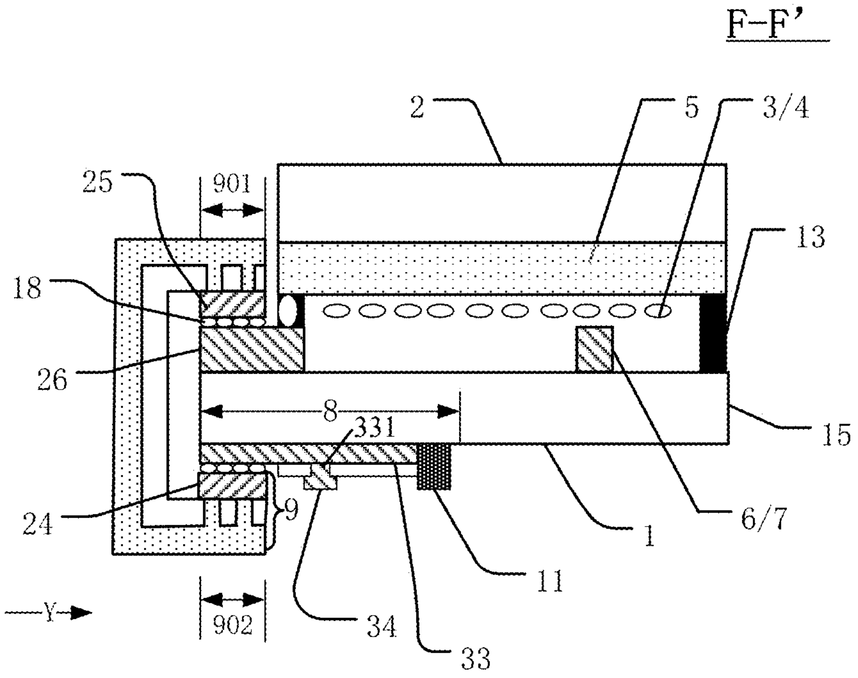
FIG. 21 illustrates another F-F'-sectional view in FIG. 7.

FIG. 20 is another B-B'-sectional view in FIG. 3, and FIG. 21 is another F-F'-sectional view in FIG. 7. As shown in FIGS. 20-21, the fifth connection line 34 may be connected to the fourth connection line 33 through a via hole 331.

Specifically, the fourth connection line 33 and the fifth connection line 34 may be electrically connected through a via hole 331. Because both the fourth connection line 33 and the fifth connection line 34 may transmit the ground signal, the electrical connection of the fourth connection line 33 and the fifth connection line 34 may not affect the transmission of the ground signal.

In some embodiments, referring to FIG. 18 and FIG. 19, a frame sealant 13 may be further included between the first substrate 1 and the second substrate 2. The frame sealant 13 may include a first conductor 50. One end of the first conductor 50 may be electrically connected to the first conductive layer 5, and the other end of the first conductor 50 may be electrically connected to the second bonding soldering pad 26.

Specifically, by disposing the first conductor 50 in the frame sealant 13, the first conductor 50 may be electrically connect the second bonding soldering pad 26 to the first conductive layer 5. In a direction perpendicular to the plane where the first substrate 1 is located, the second bonding soldering pad 26 may overlap with the frame sealant 13, and the first conductor 50 in the frame sealant 13 may be respectively in contact with the second bonding soldering pad 26 and the first conductive layer 5, the transmission of the ground signal from the second bonding soldering pad 26 to the first conductive layer 5 may be realized.

In some embodiments, referring to FIG. 18 and FIG. 19, the first conductor 50 may include conductive gold balls 51.

Specifically, when coating the soldering sealant 13, a certain amount of conductive gold balls 51 may be doped at the position corresponding to the second bonding soldering pad 26. After the frame sealant 13 is cured, the position corresponding to the second bonding soldering pad 26 may be conductive because the conductive gold balls 51 have the conductivity, and the transmission of the ground signal from the second bonding soldering pad 26 to the first conductive layer 5 may be achieved.

In some embodiments, referring to FIG. 4 and FIG. 9, the circuit board 9 may include a substrate 60 and a wiring layer 70 located on one side of the substrate 60. The wiring layer 70 may include a third connection line 40. One end of the third connection line 40 may be electrically connected to the first input soldering pad 22, and the other end of the third connection line 40 may be electrically connected to the first output soldering pad 20.

Specifically, in FIG. 4 and FIG. 9, only the configuration that the wiring layer 70 is located on the side of the substrate 60 adjacent to the first substrate 1 is used for the schematic illustration, and no specific limitation is made here.

As mentioned above, the third connection line 40 may include the first input soldering pad 22 and the first output soldering pad 20, and the first input soldering pad 22 may be electrically connected to the radio frequency connector 10 and the driving chip 11 through the first connection line 31 and the second connection line 32, respectively. Thus, the simultaneous input of radio frequency signals and bias signals may be realized.

In some embodiments, continue to refer to FIG. 18, FIG. 19, and in conjunction with FIG. 3 to FIG. 9, the radio frequency connector 10 may also include a ground terminal 102; and the second end 902 of the circuit board 9 may also include the second input soldering pad 23 and the third input soldering pad 24. The ground terminal 102 may be electrically connected to the second input soldering pad 23, and the ground signal of the driving chip 11 may be input to the third input soldering pad 24. The first end 901 of the circuit board 9 may also include a second output soldering pad 25. The second input soldering pad 23 and the third input soldering pad 24 may all be electrically connected to the second output soldering pad 25, and the second output soldering pad 25 may be electrically connected to the second bonding soldering pad 26 in the first area 8. The second bonding soldering pad 26 may be electrically connected to the first conductive layer 5.

The circuit board 9 may also include a metal ground layer 80 located on the side of the substrate 60 away from the wiring layer 70.

The metal ground layer 80 may be a whole-surface structure, and the metal ground layer 80 may be electrically connected to the second output soldering pad 25 through a via hole 801 passing through the substrate 60.

Specifically, the second end 902 of the circuit board 9 may include a second input soldering pad 23 and a third input soldering pad 24. The ground terminal 102 of the radio frequency connector 10 may be electrically connected to the second input soldering pad 23, and the radio frequency ground signal may be transmitted to the second input soldering pad 23. The ground signal of the driving chip 11 may be input to the third input soldering pad 24, and the bias ground signal may be transmitted to the third input soldering pad 24. The first end 901 of the circuit board 9 may also include a second output soldering pad 25. The second input soldering pad 23 and the third input soldering pad 24 may all be electrically connected to the second output soldering pad 25, and the second output soldering pad 25 may be electrically connected to the second bonding pad 26 in the first area 8. The second bonding pad 26 may be electrically connected to the first conductive layer 5. The second output soldering pad 25 may receive the ground signal input from the second input pad 23 and the third input pad 24 and transmit it to the second bonding soldering pad 26. The second bonding soldering pad 26 may be electrically connected to the first conductive layer 5, thereby transmitting the ground signal to the first conductive layer 5. The bias signal of the transmission electrode 7 and the constant potential of the first conductive layer 5 may forming an electric field for controlling the deflection of the liquid crystal molecules 4 of the liquid crystal layer 3. The radio frequency signal may be oscillated and transmitted between the transmission electrode 7 and the first conductive layer 5. Because the liquid crystal molecules 4 may be deflected, the dielectric constant of the liquid crystal layer 3 may be changed, and the phase shifting of the radio frequency signal in the liquid crystal layer 3 may be realized, and the effect of changing the phase of the microwave may be achieved.

The substrate 60 is not pattern-filled in FIGS. 18-19.

In one embodiment, the circuit board 9 may include the substrate 60, a wiring layer 70 on one side of the substrate 60, and a metal ground layer 80 located on the side of the substrate 60 away from the wiring layer 70. The wiring layer 70 and the metal ground layer 80 may be distributed on both sides of the substrate 60.

In one embodiment, the metal ground layer 80 may be a whole-surface structure, for example, the metal ground layer 80 may be provided on the entire surface of one side of the substrate 60. Accordingly, the area of the metal ground layer 80 may be relatively large, and the signal may be more stable when the ground signal is input.

Specifically, the second input soldering pad 23, the second output soldering pad 25, and the third input soldering pad 24 may all be located on the wiring layer 70, and the metal ground layer 80 may be electrically connected to the second output soldering pad 25 through the via hole 801 passing through the substrate 60. The ground signal of the driving chip 11 may be transmitted to the third input soldering pad 24 of the wiring layer 70 through the fourth connection line 33. The third input soldering pad 24 may be electrically connected to the metal ground layer 80 through the via hole 801, and the metal ground layer 80 may also be connected to the second output soldering pad 25 of the wiring layer 70 through the via hole 801. Thus, the ground signal may pass through the metal ground layer 80 provided on the entire surface, and the ground signal may be more stable. Similarly, the ground signal of the radio frequency connector 10 may be transmitted to the second input soldering pad 23 of the wiring layer 70 through the fifth connection line 34, and the second input soldering pad 23 may be electrically connected to the metal ground layer 80 through a via hole 801 (not shown in the figure). The metal ground layer 80 may be electrically connected to the second output soldering pad 25 of the wiring layer 70 through a via hole 801. Thus, the ground signal may pass through the metal ground layer 80 provided on the entire surface, and the ground signal may be more stable.

Figure 22:
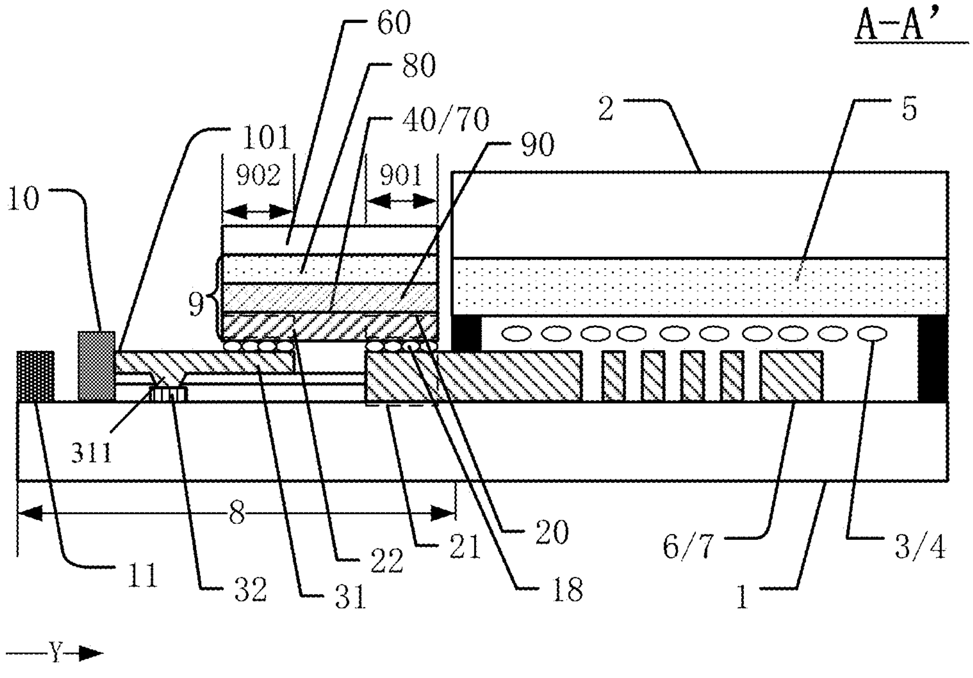
FIG. 22 illustrates another A-A'-sectional view in FIG. 3.
Figure 23:
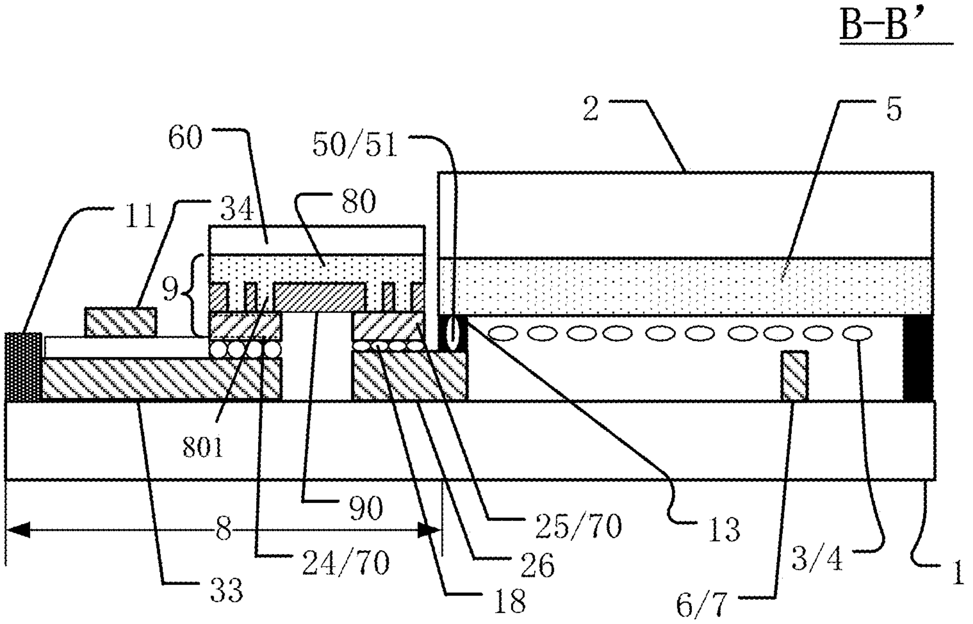
FIG. 23 illustrates another B-B'-sectional view in FIG. 3.
Figure 24:
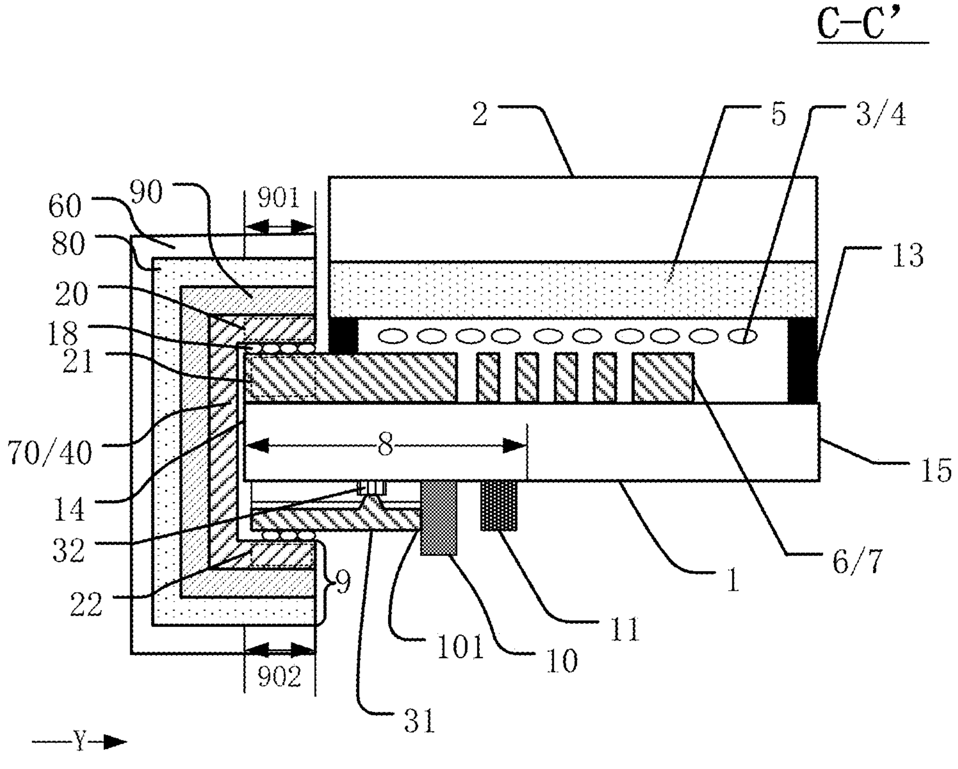
FIG. 24 illustrates a C-C'-sectional view in FIG. 7.
Figure 25:
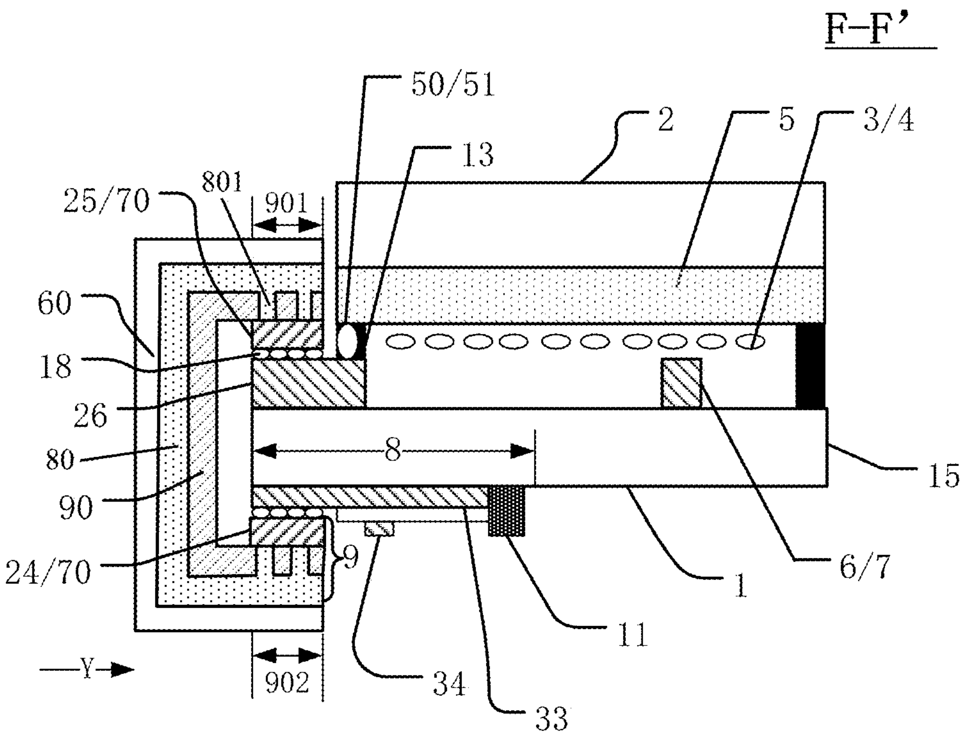
FIG. 25 illustrates another F-F'-sectional view in FIG. 7.

FIG. 22 is another A-A'-sectional view in FIG. 3, FIG. 23 is another B-B'-sectional view in FIG. 3, FIG. 24 is a C-C'-sectional view in FIG. 7, and FIG. 25 is another F-F'-sectional view of in FIG. 7. As shown in FIGS. 22-25, the radio frequency connector 10 may also include a ground terminal 102, the second end 902 of the circuit board 9 may also include a second input soldering pad 23 and a third input soldering pad 24. The ground terminal 102 may be electrically connected to the second input soldering pad 23, and the ground signal of the driving chip 11 may be input to the third input soldering pad 24. The first end 901 of the circuit board 9 may also include the second output soldering pad 25. The second input soldering pad 23 and the third input soldering pad 24 may all be electrically connected to the second output soldering pad 25. The second output soldering pad 25 may be electrically connected to the second bonding soldering pad 26 in the first area 8, and the second bonding soldering pad 26 may be electrically connected to the first conductive layer 5.

The circuit board 9 may also include a metal ground layer 80 located on the side of the substrate 60 adjacent to the wiring layer 70, and a first insulation layer 90 located on the side of the metal ground layer 80 adjacent to the wiring layer 70. The metal ground layer 80 may be a whole-surface structure, and the metal ground layer 80 may be electrically connected to the second output soldering pad 25 through a via hole 801.

Specifically, the circuit board 9 of may include the substrate 60, the metal ground layer 80 located on one side of the substrate 60, the first insulation layer 90 located on the side of the metal ground layer 80 away from the substrate 60, and the wiring layer 70 on the side of the first insulation layer 90 away from the substrate 60. The first input soldering pad 22, the second input soldering pad 23, the third input soldering pad 24, the first output soldering pad 20 and the second output soldering pad 25 may all be located on the wiring layer 70.

Specifically, the second input soldering pad 23, the second output soldering pad 25, and the third input soldering pad 24 may all be located on the wiring layer 70, and the metal ground layer 80 may be electrically connected to the second output soldering pad 25 through the via hole 801 passing through the first insulation layer 90. Referring to FIG. 3, FIG. 7 and FIG. 8, the ground signal of the driving chip 11 may be transmitted to the third input soldering pad 24 of the wiring layer 70 through the fourth connection line 33. The third input soldering pad 24 may be electrically connected to the metal ground layer 80 through the via hole 801 passing through the first insulation layer 90. The metal ground layer 80 may be electrically connected to the second output soldering pad 25 of the wiring layer 70 through the via hole 801 passing through the first insulation layer 90. Thus, the ground signal may pass through the metal ground layer 80 provided on the entire surface, and the ground signal may be more stable. Similarly, the ground signal of the radio frequency connector 10 may be transmitted to the second input soldering pad 23 of the wiring layer 70 through the fifth connection line 34, and the second input soldering pad 23 may be electrically connected the metal ground layer 80 through the via hole 801 passing through the first insulation layer 90 (not shown in the figure). The metal ground layer 80 may be electrically connected with the second output soldering pad 25 of the wiring layer 70 through the via hole 801 passing through the first insulation layer 90. Thus, the ground signal may pass through the metal ground layer 80 provided on the entire surface, and the ground signal may be more stable.

Figure 26:
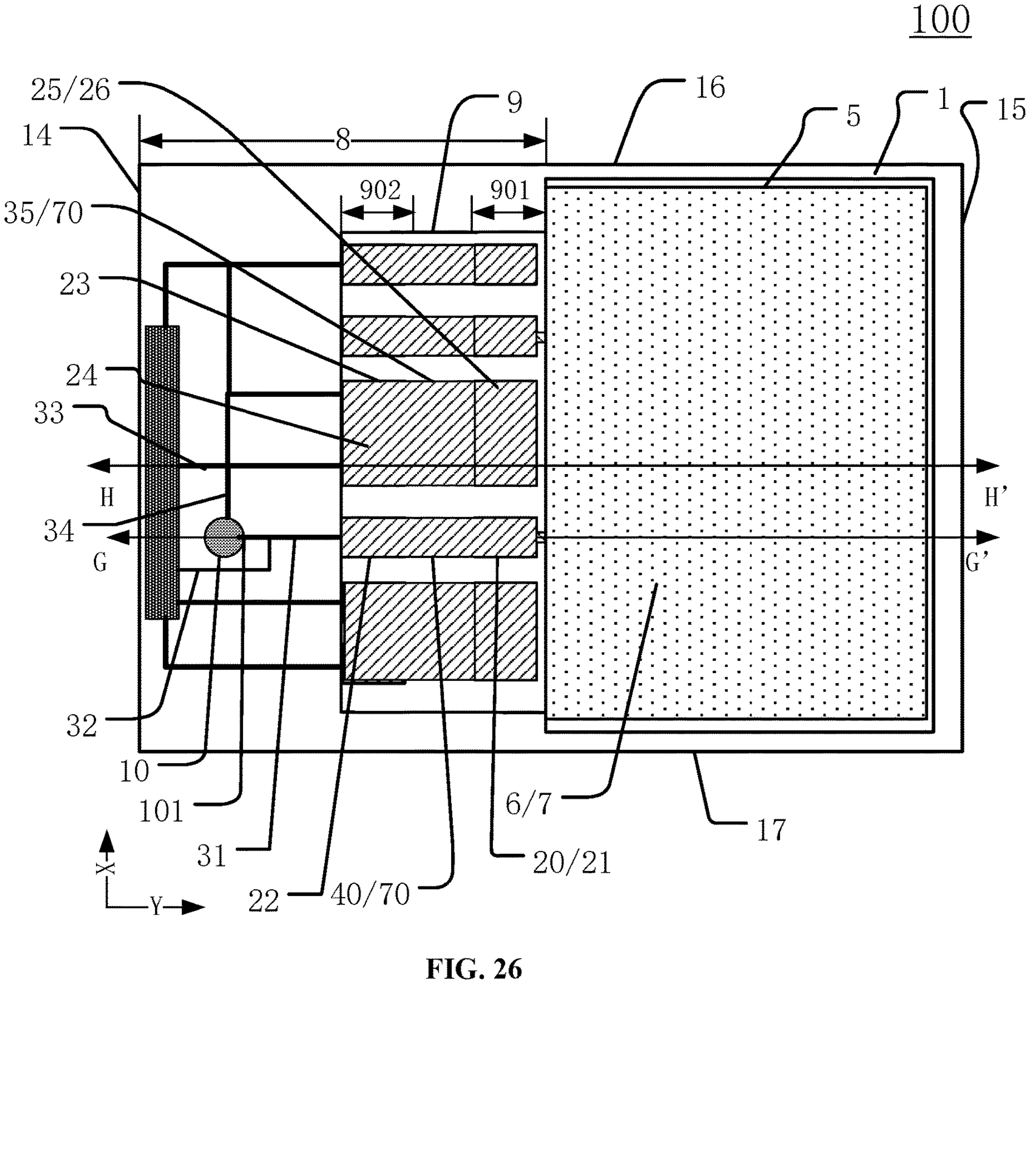
FIG. 26 illustrates a top view of another exemplary liquid crystal phase shifter according to various disclosed embodiments of the present disclosure.
Figure 27:
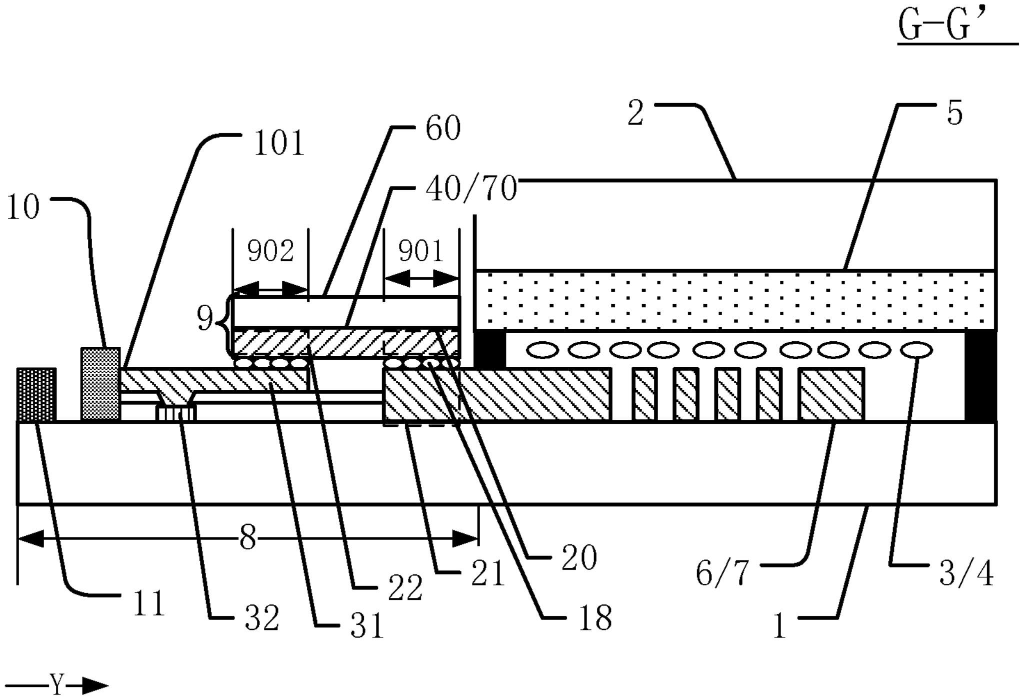
FIG. 27 illustrates a G-G'-sectional view in FIG. 26.
Figure 28:
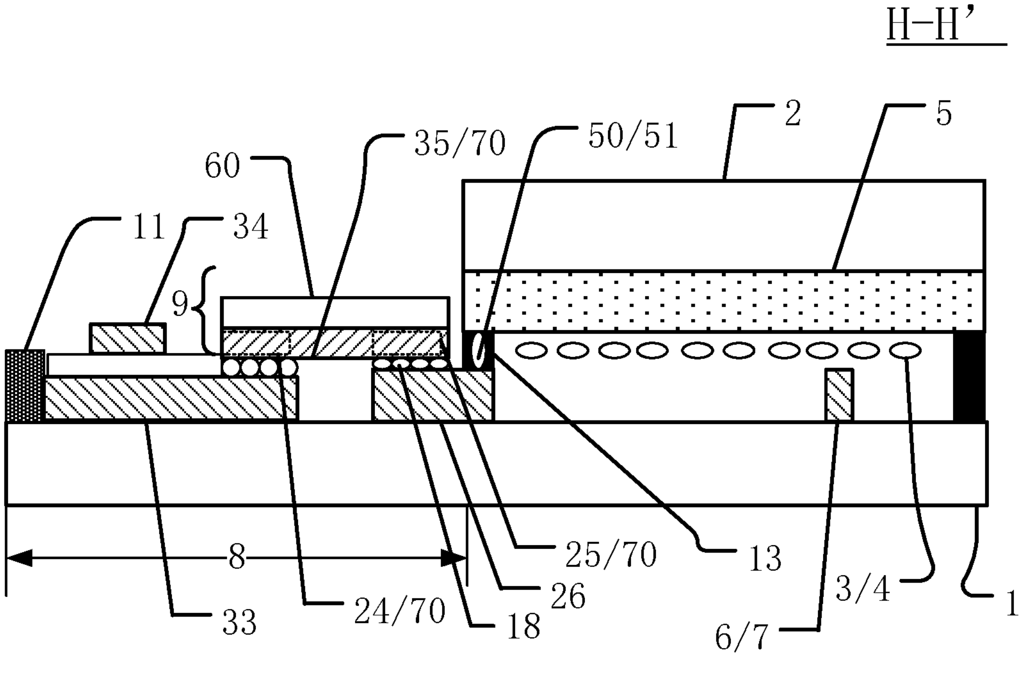
FIG. 28 illustrates a H-H'-sectional view in FIG. 26.
Figure 29:
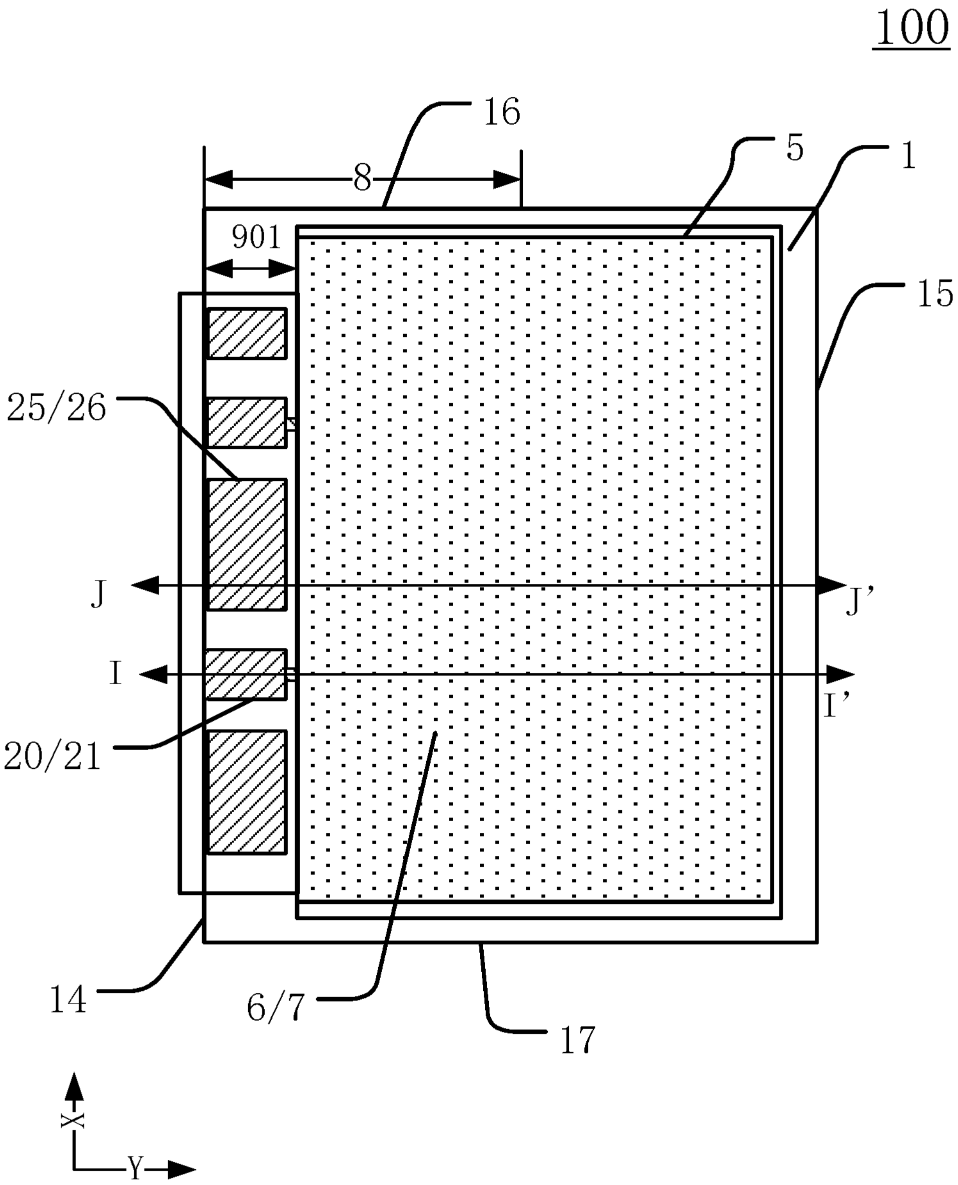
FIG. 29 illustrates a front view of another exemplary liquid crystal phase shifter according to various disclosed embodiments of the present disclosure.
Figure 30:
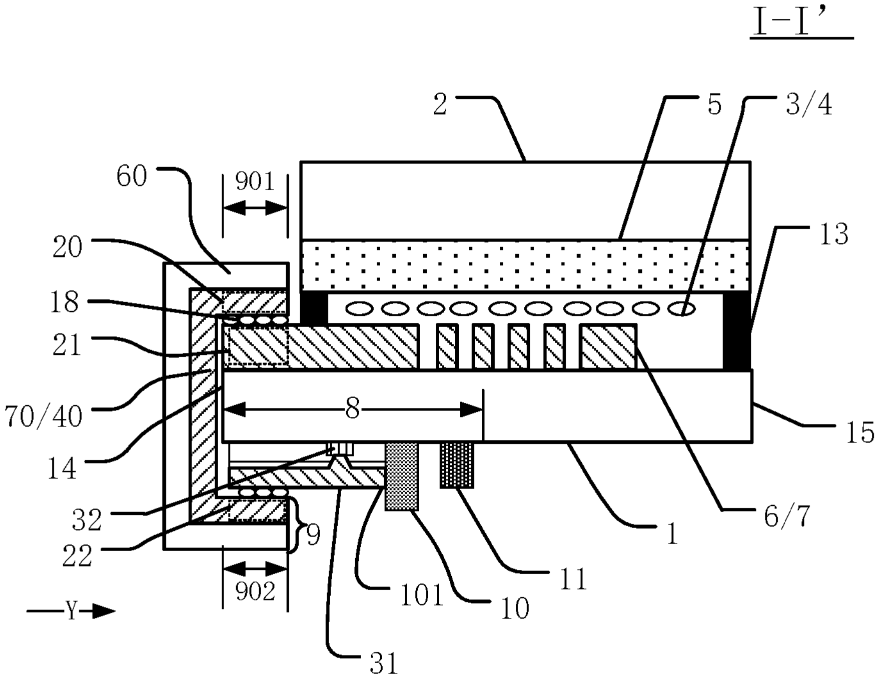
FIG. 30 illustrates an I-I'-sectional view in FIG. 29.
Figure 31:
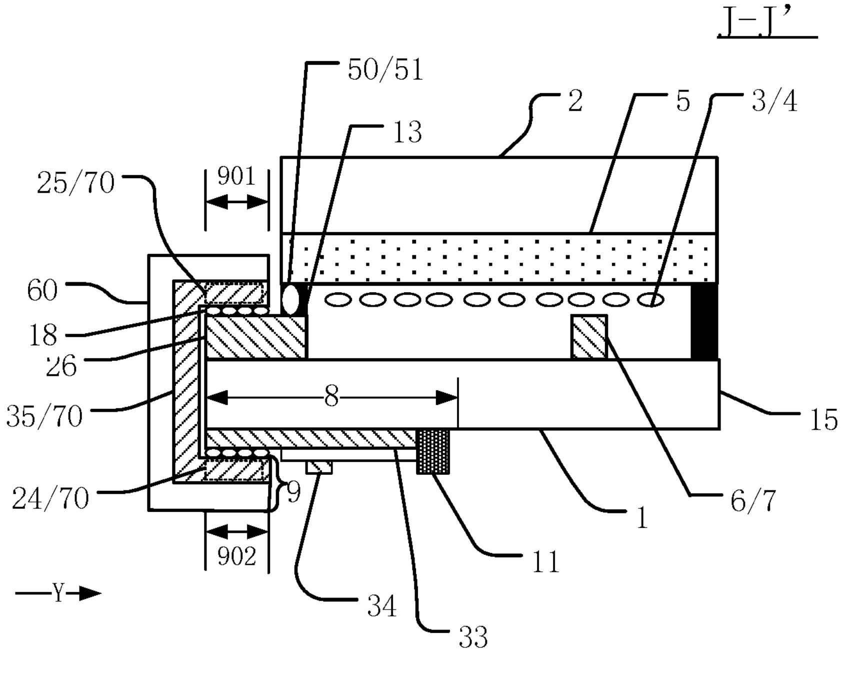
FIG. 31 illustrates a J-J'-sectional view in FIG. 29.

FIG. 26 is a schematic top view of another exemplary liquid crystal phase shifter according to various disclosed embodiments of the present disclosure, FIG. 27 is a G-G'-sectional view in FIG. 26, FIG. 28 is a H-H'-sectional view in FIG. 26, FIG. 29 is a front view of another exemplary liquid crystal phase shifter according to various disclosed embodiments of the present disclosure, FIG. 30 is an I-I'-sectional view in FIG. 29, and FIG. 31 is a J-J'-sectional view in FIG. 29. As shown in FIGS. 26-31, in some embodiments, the radio frequency connector 10 may also include a ground terminal 102. The second end 902 of the circuit board 9 may also include a second input soldering pad 23 and a third input soldering pad 24. The ground terminal 102 may be electrically connected to the second input soldering pad 23. The ground signal of the driving chip 11 may be input to the third input soldering pad 24. The first end 901 of the circuit board 9 may also include the second output soldering pad 25, and the second input soldering pad 23 and the third input soldering pad 24 may all be electrically connected to the second output soldering pad 25. The second output soldering pad 25 may be electrically connected to the second bonding soldering pad 26 in the first area 8, and the second bonding soldering pad 26 may be electrically connected to the first conductive layer 5. The wiring layer 70 may also include a second signal line 35. One end of the second signal line may be electrically connected to the second input soldering pad 23 and the third input soldering pad 24, and the other end of the second signal line 35 may be electrically connected to the second output soldering pad 25.

FIGS. 26-28 use the configuration that the driving chip 11 and the radio frequency connector 10 are located on the side of the first substrate 1 adjacent to the second substrate 2 as an example for the schematic illustration. FIGS. 29-32 use the configuration that the driving chip 11 and the radio frequency connector 10 are located on the side of the first substrate 1 away from the second substrate 2 as an example for schematic illustration.

It can be understood that, in one embodiment, only the substrate 60 and the wiring layer 70 disposed on one side of the substrate 60 may be provided in the circuit board 9, and the metal ground layer 80 may not be provided. The first input soldering pad 22 and the first output soldering pad 20 may be connected by the third connection line 40, and the second input soldering pad 23, the third input soldering pad 24 and the second output soldering pad 25 may be electrically connected by the second signal line 35. The third connection line 40 and the second signal line 35 may all be located on the wiring layer 70, and the third connection line 40 and the second signal line 35 may be insulated. In one embodiment, there may be a gap between the third connection line 40 and the second signal line 35, or an insulation layer may be filled between the third connection line 40 and the second signal line 35, which is not specifically limited here.

A coplanar waveguide is used in this embodiment, for example, the third connection line 40 connecting the first input soldering pad 22 and the first output soldering pad 20 in the circuit board 9, and the second connection line 35 connecting the third input soldering pad 24, the second input soldering pad 23 and the second signal line 35 of the second output soldering pad 25 may all be located on the same wiring layer 70, and the transmission of the ground signal may be realized without setting the metal ground layer 80, which may be conducive to the thinning of the circuit board 9.

Figure 32:
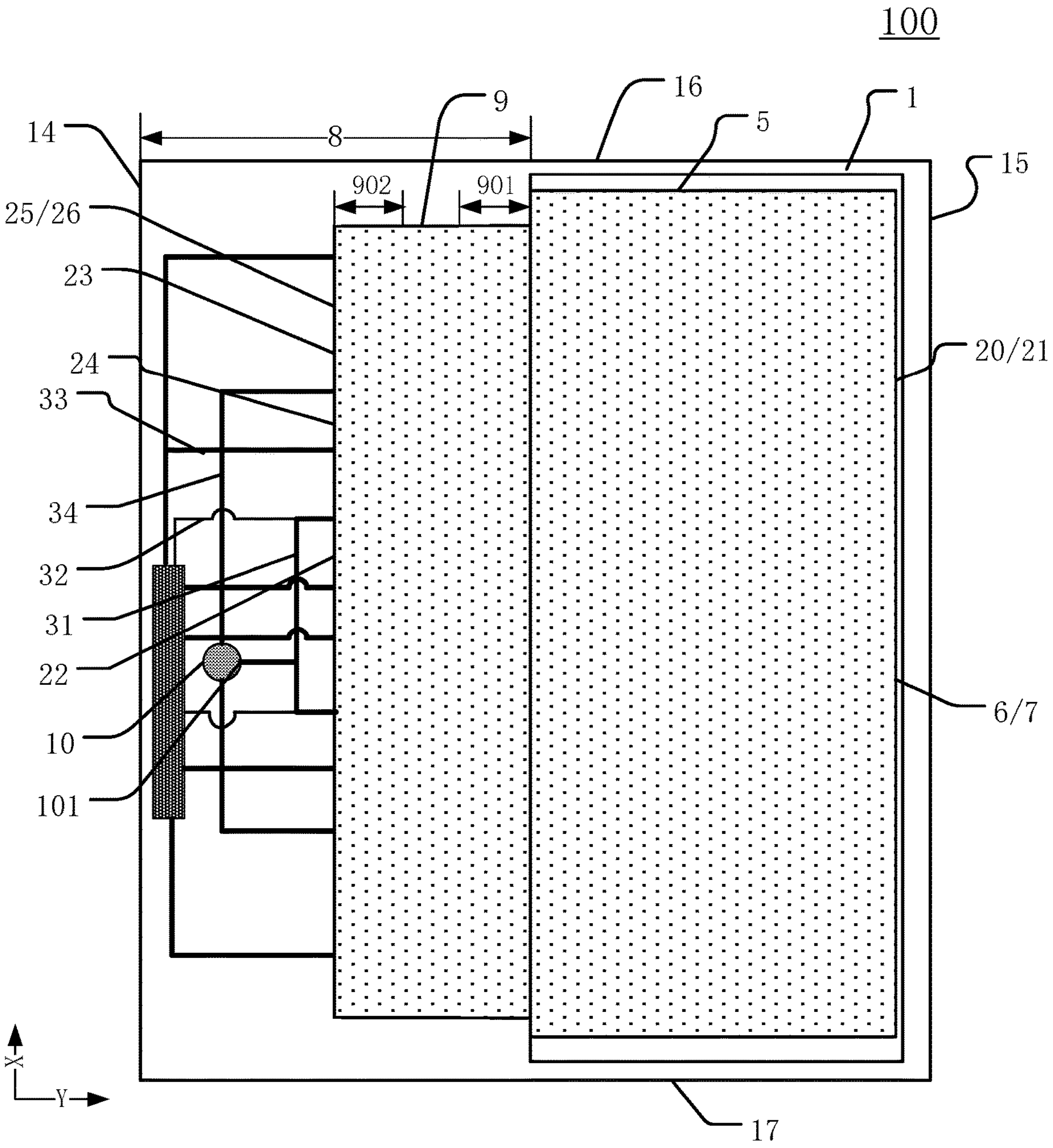
FIG. 32 illustrates a top view of another exemplary liquid crystal phase shifter according to various disclosed embodiments of the present disclosure.
Figure 33:
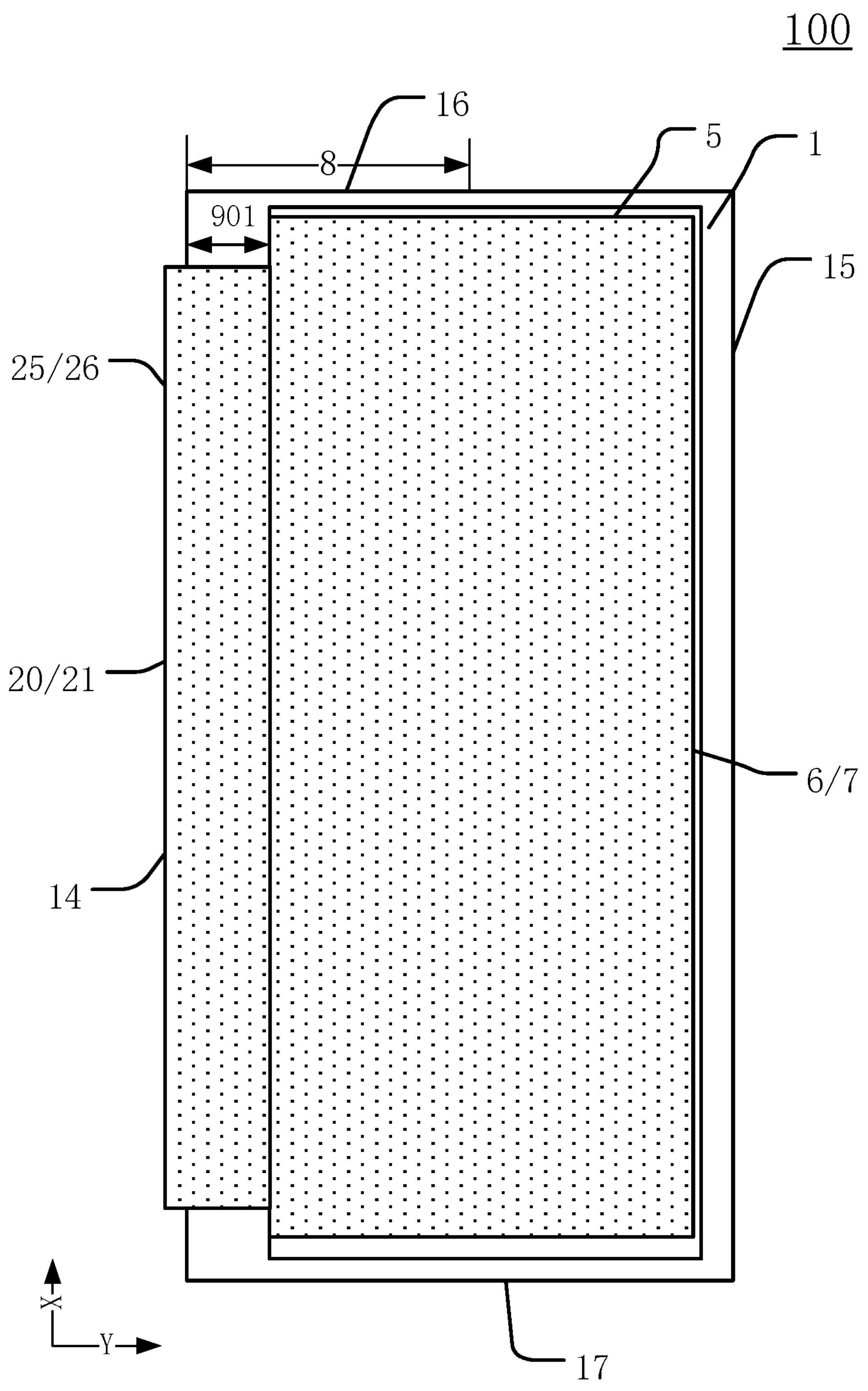
FIG. 33 illustrates a front view of another exemplary liquid crystal phase shifter according to various disclosed embodiments of the present disclosure.
Figure 34:
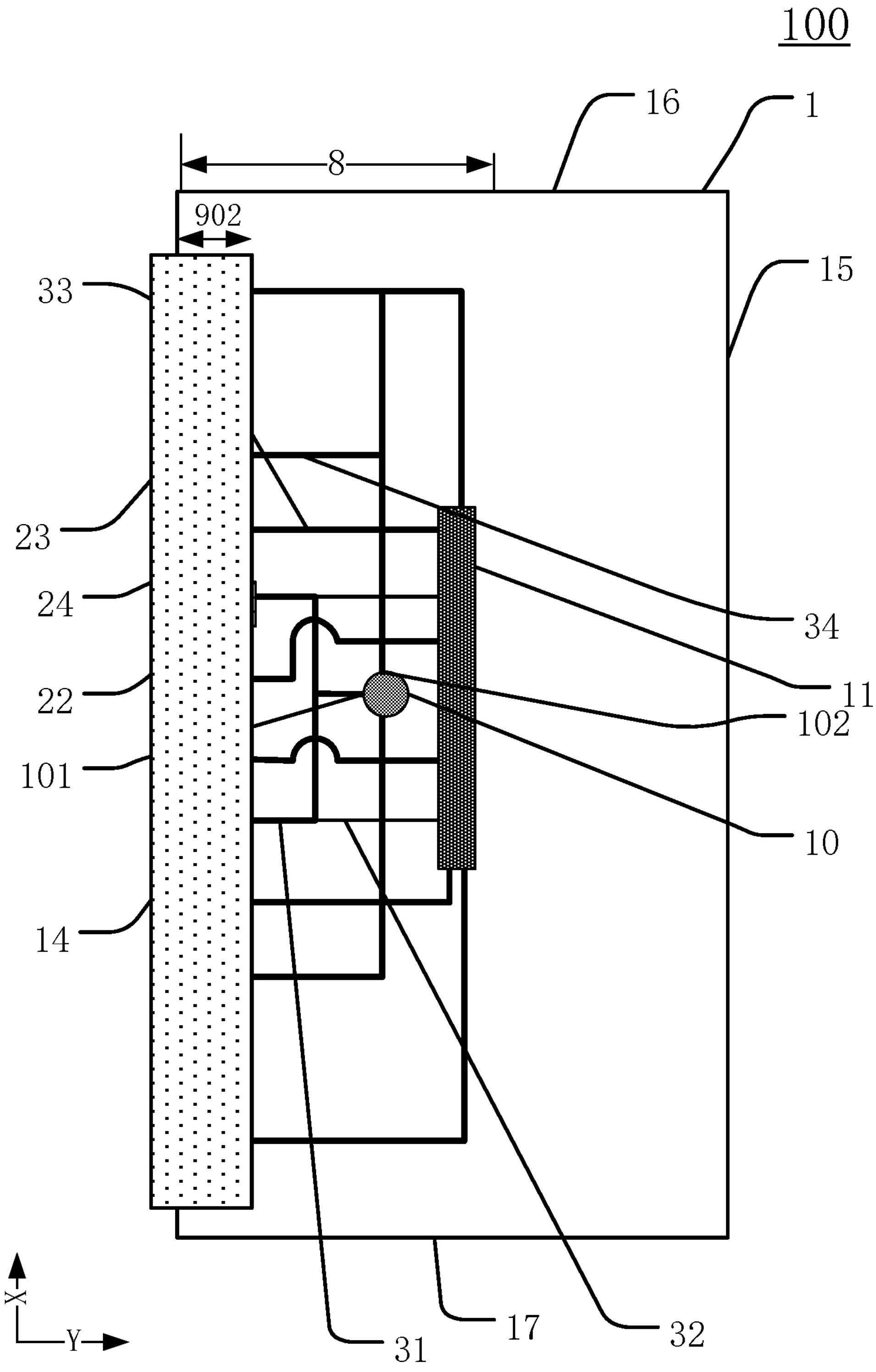
FIG. 34 illustrates a back view of another exemplary liquid crystal phase shifter according to various disclosed embodiments of the present disclosure.

FIG. 32 is a schematic top view of another exemplary liquid crystal phase shifter provided by the present disclosure, FIG. 33 is a front view of another exemplary liquid crystal phase shifter provided by the present disclosure, and FIG. 34 is a back view of another exemplary liquid crystal phase shifter provided by the present disclosure. As shown in FIGS. 32-33, in some embodiments, the number of the first input soldering pads 22 may be greater than one, and multiple first input soldering pads 22 may be electrically connected to the radio frequency input terminal 101 of the same radio frequency connector 10.

FIG. 32 schematically illustrates the configuration that the driving chip 11 and the radio frequency connector 10 are disposed on the side of the first substrate 1 adjacent to the second substrate 2 (not shown in the figure). In such a configuration, the driving chip 11 and the radio frequency connector 10 may be disposed on the front of the liquid crystal phase shifter 100. FIGS. 33-34 schematically illustrate the configuration that the driving chip 11 and the radio frequency connector 10 are disposed on the side of the first substrate 1 away from the second substrate 2 (not shown in the figure). In such a configuration, the driving chip 11 and the radio frequency connector 10 may be disposed on the back side of the liquid crystal phase shifter 100. In FIGS. 32-34, the number of the first input soldering pads 22 may be only two, and the two first input soldering pads 22 may be electrically connected to the radio frequency input terminal 101 of the same radio frequency connector 10, that is, the function of power division may be realized. Two transmission electrodes 7 are illustrated in FIG. 32, and the two transmission electrodes 7 and the first input soldering pads 22 may have a one-to-one correspondence. The number of the first output soldering pad 20 and the first bonding soldering pad 21 may also be two and may have a one-to-one correspondence with the first input soldering pad 22. The radio frequency signal output from one radio frequency connector 10 may be transmitted to the two transmission electrodes 7. The number of the first input soldering pads 22 is not limited in the present disclosure.

In some embodiments, continue to refer to FIG. 4, FIG. 9, FIG. 12, FIG. 15, FIG. 19, FIG. 20, FIG. 21, FIG. 22, FIG. 23, FIG. 24, FIG. 25, FIG. 27, FIG. 28, FIG. 30 and FIG. 31, the circuit board 9 may be bonded to the first area 8 through the anisotropic conductive adhesive film 18.

It should be noted that the bonding of the circuit board 9 to the first area 8 through the anisotropic conductive adhesive film 18 may be applicable to any of the above-mentioned embodiments, and will not be repeated here.

It can be understood that the soldering pads in the circuit board 9 may need to be electrically connected to the bonding pads in the first substrate 1, and the anisotropic conductive adhesive film 18 may have the functions of unidirectional conduction and gluing and fixing. On one hand, the circuit board 9 may be connected to the first substrate 1. Further, because the anisotropic conductive adhesive film 18 may contain conductive particles, the circuit board 9 may be electrically connected to the bonding pads in the first substrate 1.

Figure 35:
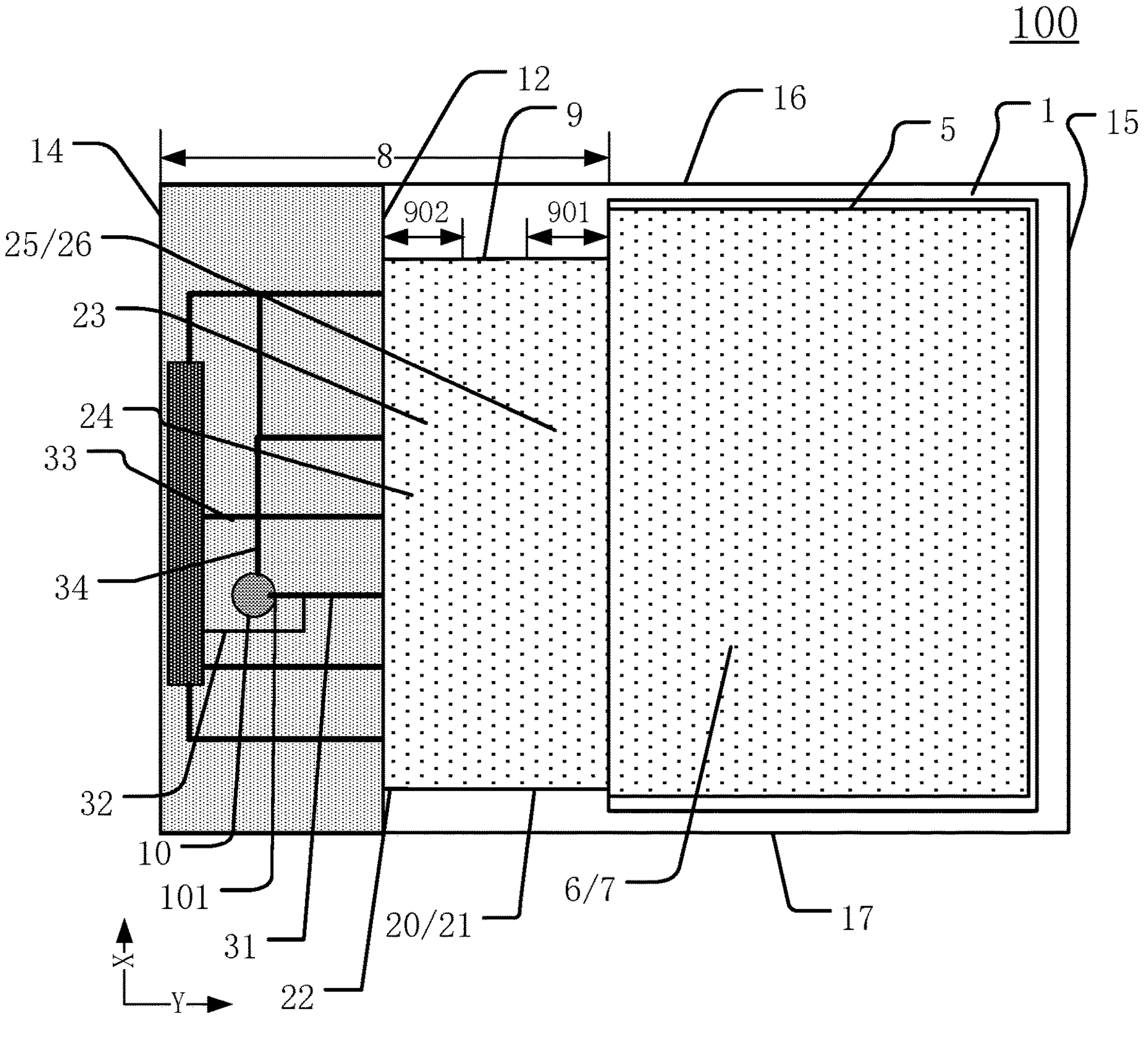
FIG. 35 illustrates a top view of another exemplary liquid crystal phase shifter according to various disclosed embodiments of the present disclosure.
Figure 36:
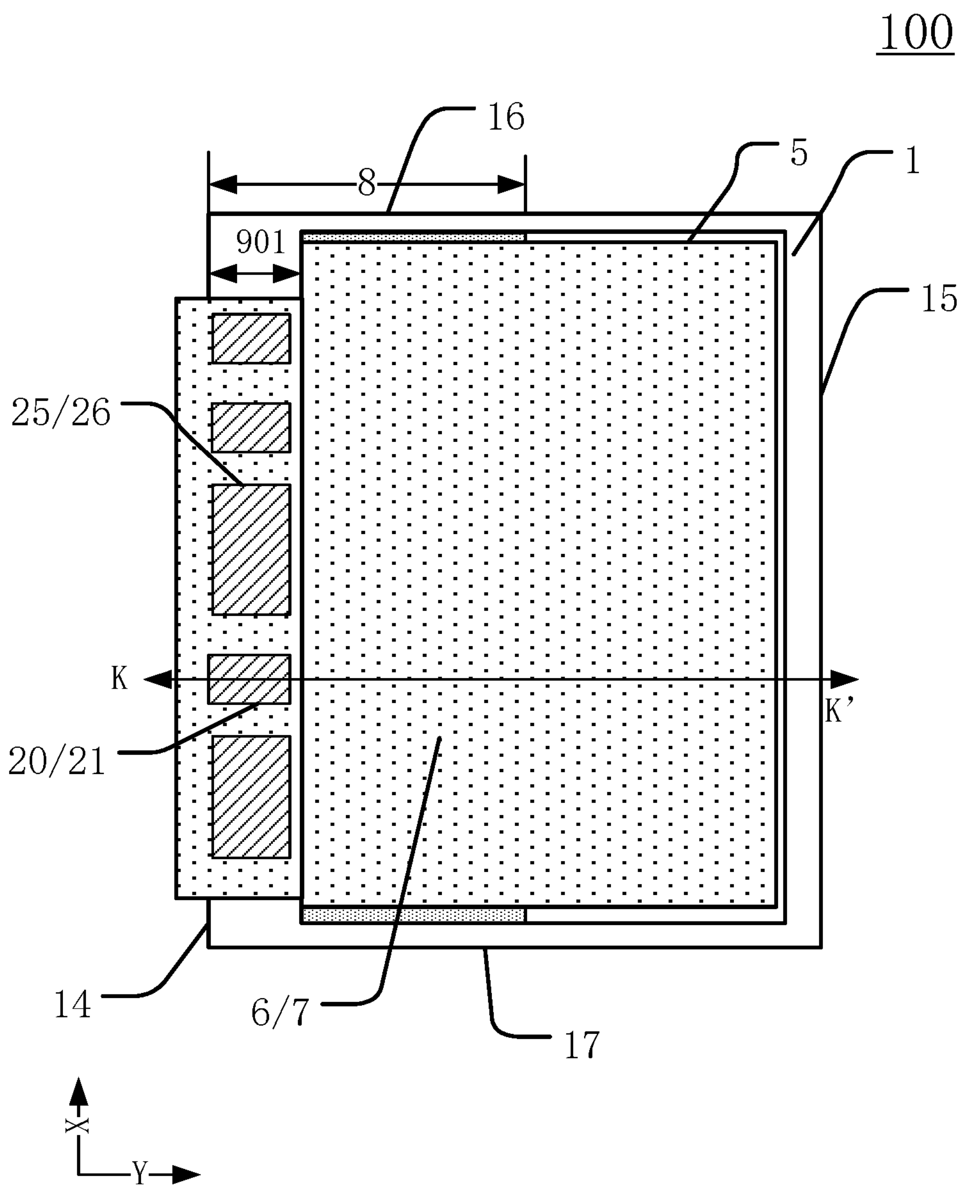
FIG. 36 illustrates a front view of another exemplary liquid crystal phase shifter according to various disclosed embodiments of the present disclosure.
Figure 37:
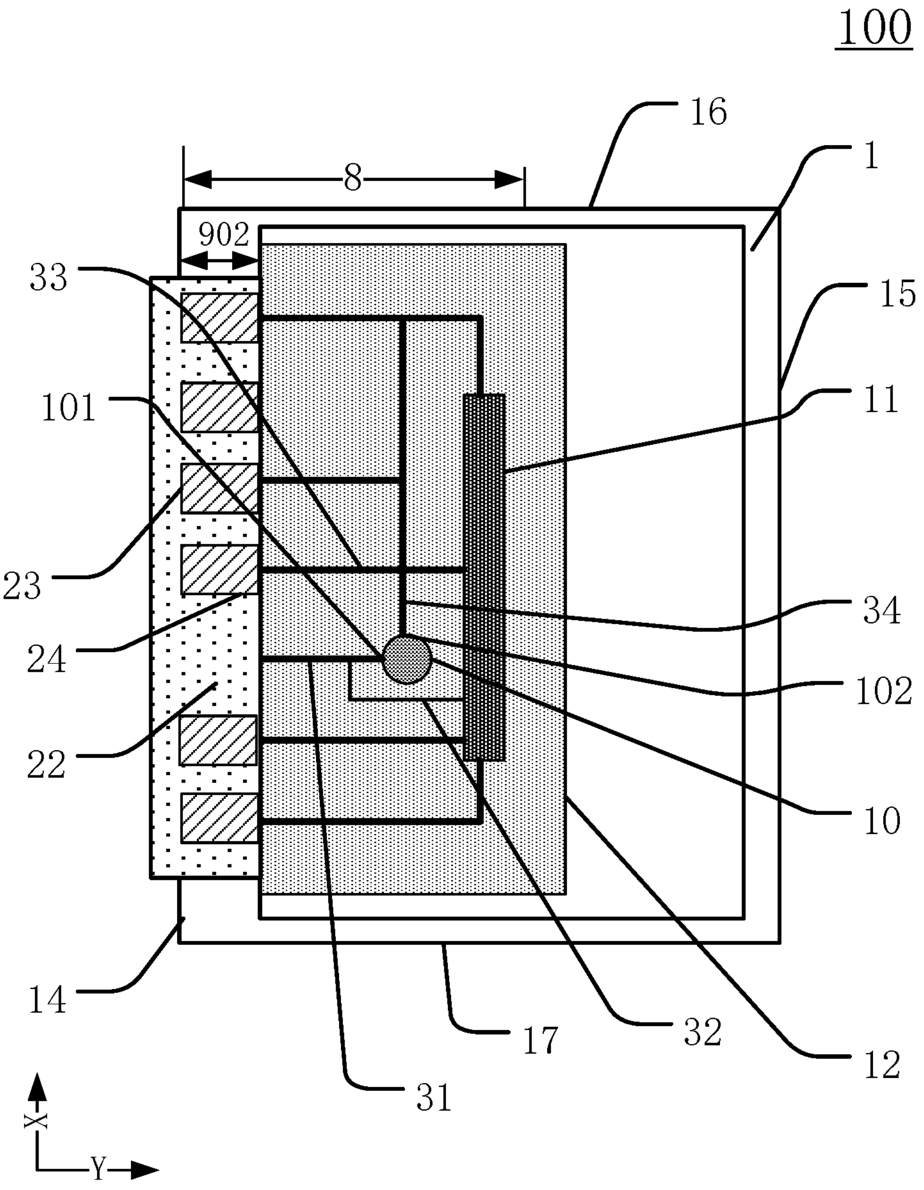
FIG. 37 illustrates a back view of another exemplary liquid crystal phase shifter according to various disclosed embodiments of the present disclosure.
Figure 38:
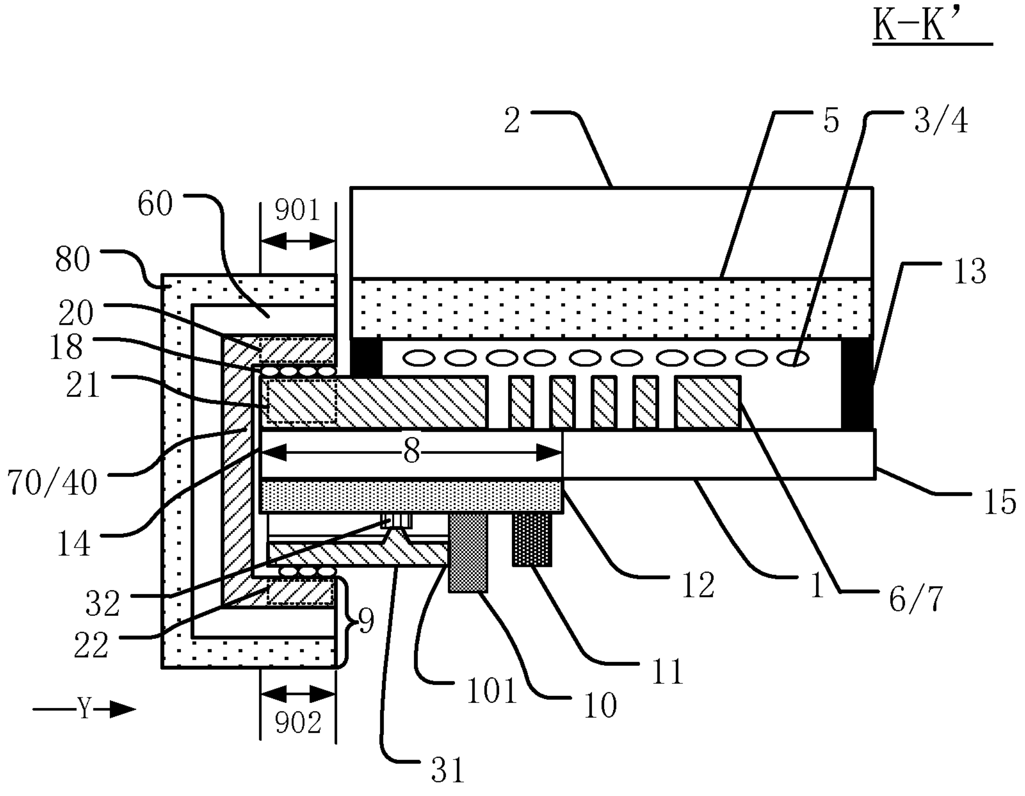
FIG. 38 illustrates a K-K'-sectional view in FIG. 37.

FIG. 35 is a schematic top view of another exemplary liquid crystal phase shifter provided by the present disclosure, FIG. 36 is a front view of another exemplary liquid crystal phase shifter provided by the present disclosure, FIG. 37 is a back view of another exemplary liquid crystal phase shifter provided by the present disclosure, and FIG. 38 is a K-K'-sectional view in FIG. 36. As shown in FIGS. 35-37, in some embodiments, the liquid crystal phase shifter 100 may also include a driving control board 12, and a radio frequency connector 10. The driving chip 11 may be disposed on the driving control board 12.

FIG. 35 schematically illustrates the configuration that the driving chip 11 and the radio frequency connector 10 are disposed on the side of the first substrate 1 adjacent to the second substrate 2. In this configuration, the driving chip 11 and the radio frequency connector 10 may be arranged on the front side of the liquid crystal phase shifter 100. FIGS. 36-38 schematically illustrate the configuration that the driving chip 11 and the radio frequency connector 10 may be disposed on the side of the first substrate 1 away from the second substrate 2 (not shown in the figure). In such a configuration, the driving chip 11 and the radio frequency connector 10 may be arranged on the back side of the liquid crystal phase shifter 100.

In FIG. 35, the driving control board 12 may be attached on the first substrate 1, and the radio frequency connector 10 and the driving chip 11 may be disposed on the driving control board 12. The first connection line 31, the second connection line 32, the fourth connection line 33 and the fifth connection wire 34 may also be disposed on the driving control board 12. It can be seen from FIG. 36 to FIG. 38 that the driving control board 12 may be arranged on the side of the first substrate 1 away from the second substrate 2 in the corresponding first area 8. The radio frequency connector 10 and the driving chip 11 may be arranged on the side of the driving control board 12 away from the side of the first substrate 1. The first connection line 31, the second connection line 32, the fourth connection line 33 and the fifth connection line 34 may also be disposed on the side of the driving control board 12 away from the first substrate 1.

In one embodiment, the liquid crystal phase shifter 100 may include a driving control board 12, and the radio frequency connector 10 and the driving chip 11 may be disposed on the driving control board 12. For the disposition flexibility of the radio frequency connector 10 and the driving chip 11, as well as the first connection line 31, the second connection line 32, the fourth connection line 33 and the fifth connection line 34, they may not need to be directly formed on the glass of the first substrate 1, and may be formed on the driving control board 12, and then may be boned with the flexible circuit board 9 by the anisotropic conductive adhesive.

Figure 39:
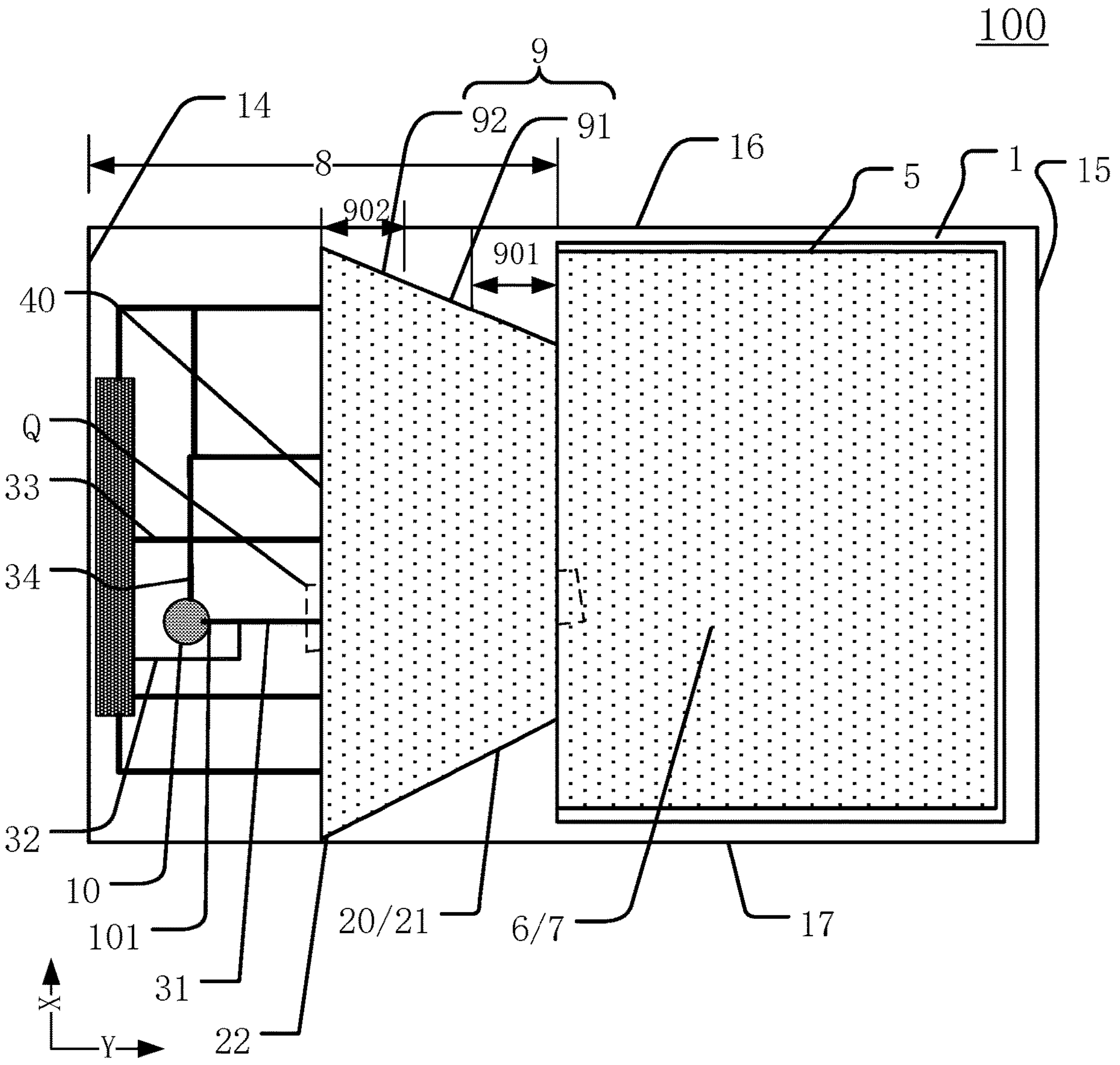
FIG. 39 illustrates a top view of another exemplary liquid crystal phase shifter according to various disclosed embodiments of the present disclosure.
Figure 40:
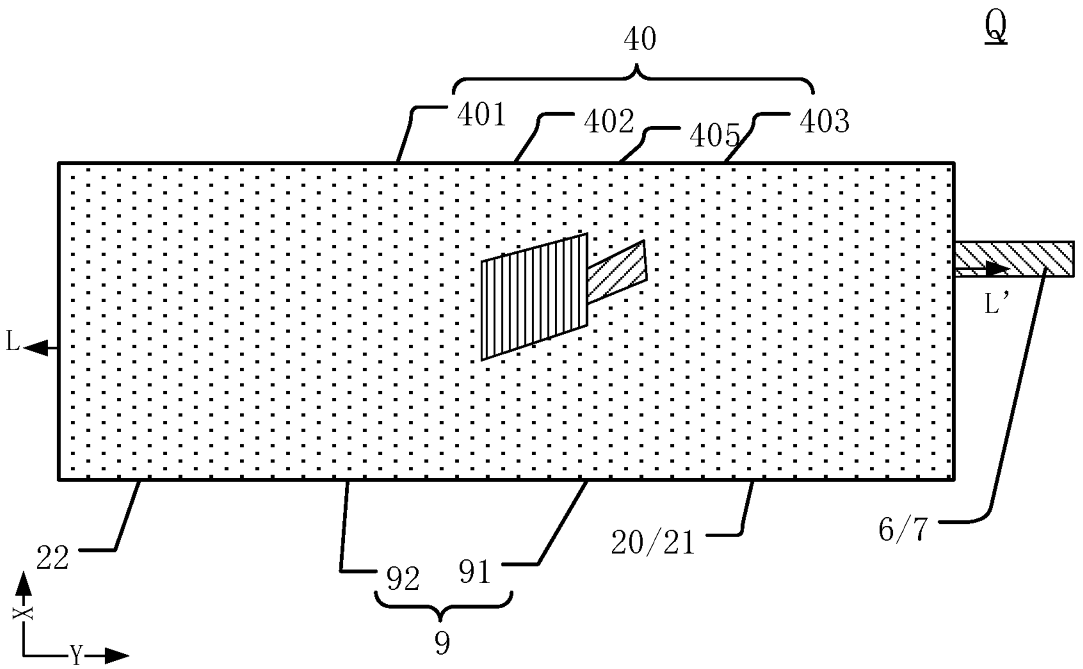
FIG. 40 illustrates a partially zoomed-in view of a Q-Region in FIG. 39.
Figure 41:
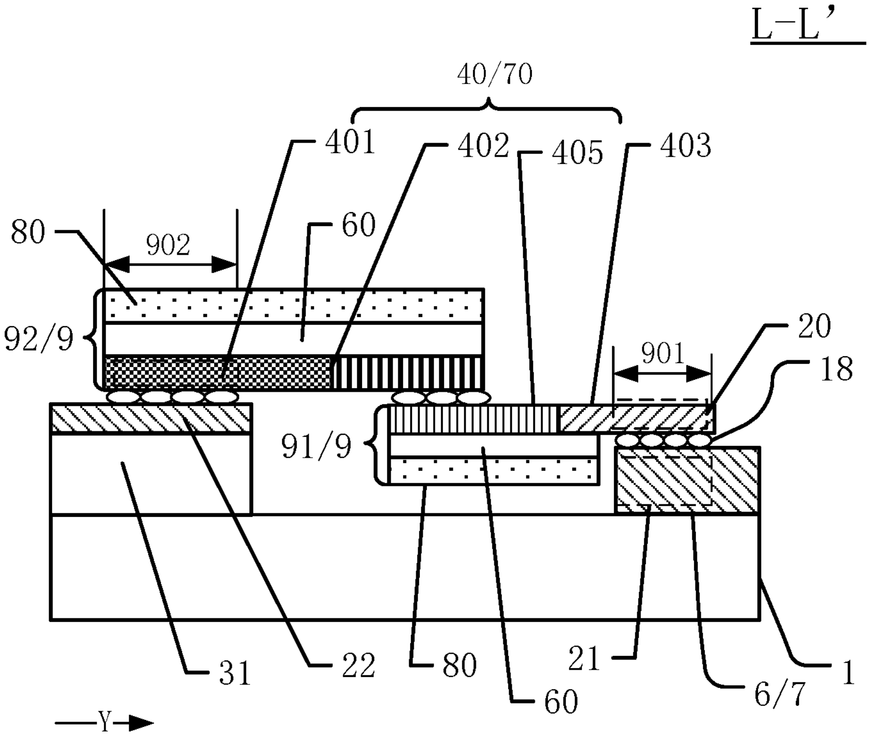
FIG. 41 illustrates an L-L'-sectional view in FIG. 40.
Figure 42:
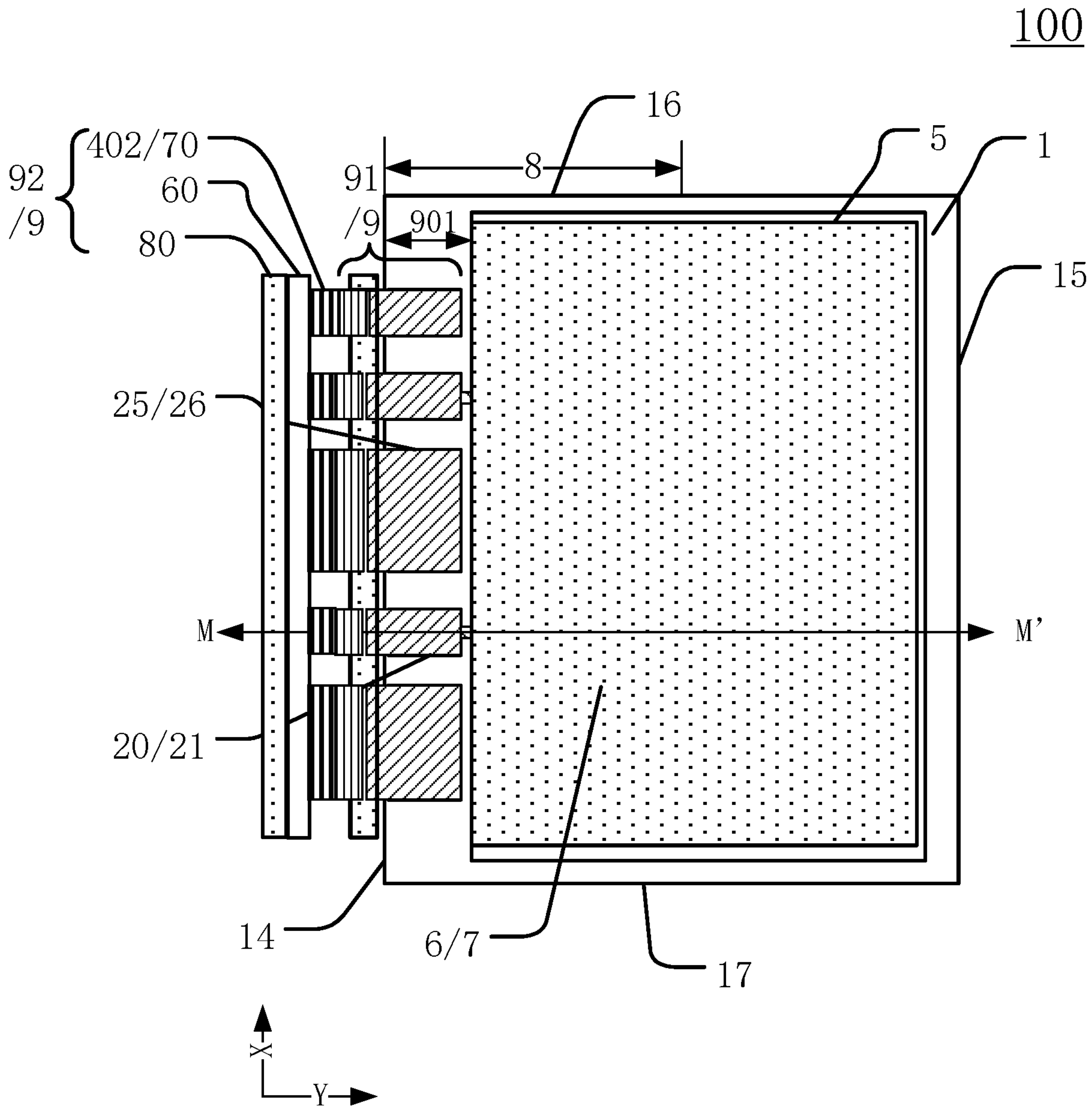
FIG. 42 illustrates a front view of another exemplary liquid crystal phase shifter according to various disclosed embodiments of the present disclosure.
Figure 43:
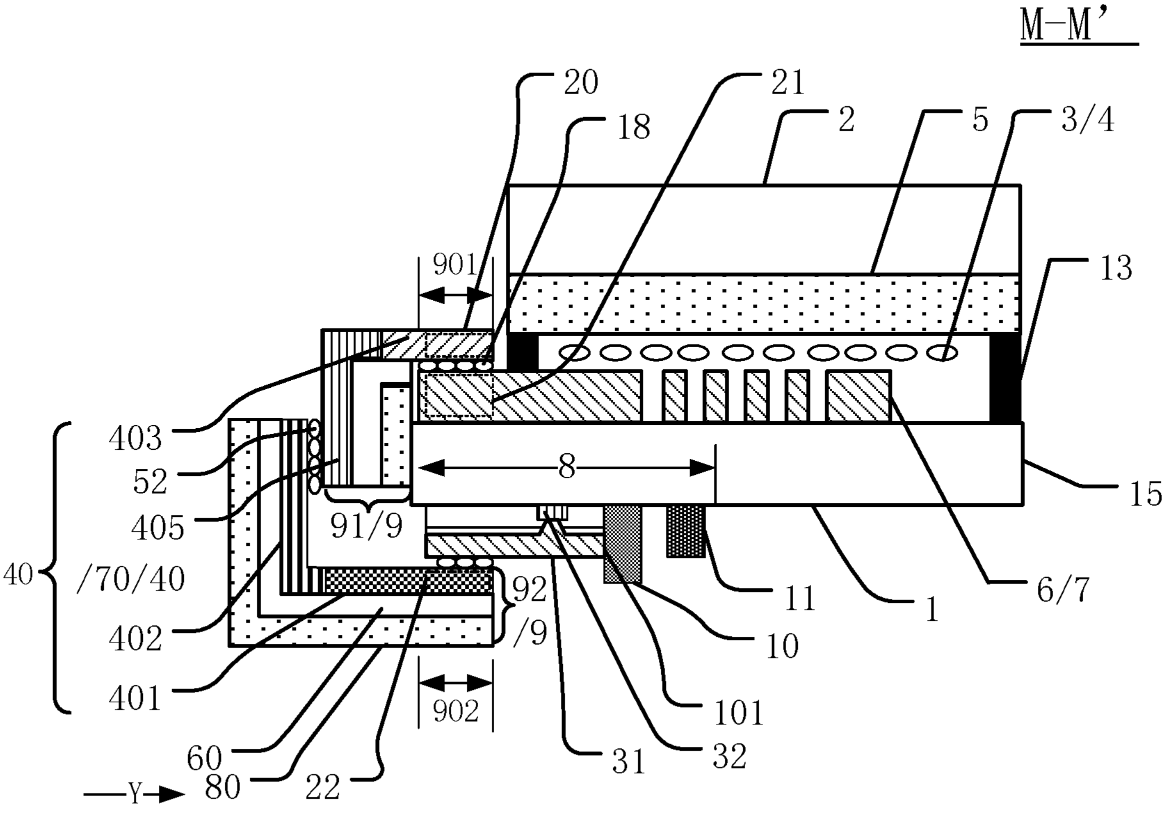
FIG. 43 illustrates an M-M'-sectional view in FIG. 42.

FIG. 39 is a schematic top view of another exemplary liquid crystal phase shifter provided by the present disclosure, FIG. 40 is a partially enlarged view of the Q region in FIG. 39, FIG. 41 is an L-L'-sectional view of in FIG. 40, FIG. 42 is a front view of another exemplary liquid crystal phase shifter provided by the present disclosure, and FIG. 43 is an M-M'-sectional view in FIG. 42. As shown in FIGS. 39-42 and in combination with FIG. 8, in some embodiments, the circuit board 9 may include a first circuit board 91 and a second circuit board 92. The first circuit board 91 may be bonded to the first area 8, and the second circuit board 92 may be electrically connected to the second conductor 52 through the first circuit board 91.

It can be understood that, for other structures of the liquid crystal phase shifter 100 except the circuit board 9, reference can be made to any of the above-mentioned embodiments, and no specific limitation is made here.

In FIG. 39 and FIG. 40, the configuration that the driving chip 11 and the radio frequency connector 10 may be located on the side of the first substrate 1 adjacent to the second substrate 2 is used as an example for schematic illustration. In this configuration, the driving chip 11 and the radio frequency connector 10 may be arranged on the front side of the liquid crystal phase shifter 100. In FIGS. 41-43, the configuration that the driving chip 11 and the radio frequency connector 10 are disposed on the side of the first substrate 1 away from the second substrate 2 is used as an example. In this configuration, the driving chip 11 and the radio frequency connector 10 may be disposed the back of the liquid crystal phase shifter 100.

In one embodiment, the transmission of radio frequency signals and bias signals may be realized by electrically connecting the first circuit board 91 and the second circuit board 92. Specifically, the first circuit board 91 may be bonded in the first area 8, and the second circuit board 92 may be electrically connected to the radio frequency connector 10 and the driving chip 11.

In some embodiments, referring to FIGS. 39-43, the circuit board 9 may include a third connection line 40. The third connection line 40 may include a first line subsegment 401, a second line subsegment 402, a third line subsegment 403, a third connection line 40, and a fourth line subsegment 405. The first line subsegment 401 may include a first input soldering pad 22. The third sub-segment 403 may include a first output soldering pad 20. The first line subsegment 401 and the second line subsegment 402 may be disposed on the second circuit board 92. The fourth line subsegment 405 and the third line subsegment 403 may be located on the first circuit board 91. The second line subsegment 402 and the fourth line subsegment 405 may be electrically connected through the second conductor 52. The impedance of the output terminal of the first line subsegment 401 may be Z1, the sum of the impedances of the second line subsegment 402 and the fourth line subsegment 405 may be Z2, the impedance of the input terminal of the third sub-section 403 may be Z3, both the second line subsegment 402 and the fourth line subsegment 405 may be ¼ wavelength transmission lines, and $$Z2 = \frac{Z1^2}{Z3}.$$

The layer structure of the circuit board 9 in this embodiment may be referred to any of the above-mentioned embodiments, and will not be repeated here. In one embodiment, the first circuit board 91 may be electrically connected to the first bonding soldering pad 21 in the first region 8. Specifically, the first circuit board 91 may include a wiring layer 70, and the wiring layer 70 may include a third line subsegment 403 of the third connection line 40. The third line subsegment 403 may be electrically connected to the first bonding soldering pad 21 through an anisotropic conductive adhesive film 18. The first circuit board 91 may also include a substrate 60 and a metal ground layer 80. The wiring layer 70 and the metal ground layer 80 may be disposed on both sides of the substrate 60. The second circuit board 92 may include the first line subsegment 401 and a second line subsegment 402. The first line subsegment 401 and the second line subsegment 402 may be disposed on the wiring layer 70 of the second circuit board 92. The wiring layer 70 and the metal ground layer 80 of the second circuit board 92 may also be disposed on both sides of the substrate 60. The second line subsegment 402 of the second circuit board 92 may be electrically connected to the fourth line subsegment 405 of the first circuit board 91 through the second conductor 52 (the anisotropic conductive adhesive film 18), and the signal transmission may be realized.

The layer structure of the circuit board 9 here is only for one embodiment, and reference may also be made to any embodiment in FIG. 18 to FIG. 31.

In one embodiment, the layer structure of the first circuit board 91 and the second circuit board 92 may be: the substrate 60, the metal ground layer 80 on one side of the substrate 60, and the wiring layer 70 on the side of the metal ground layer 80 away from the substrate 60, and a first insulation layer 90 between the metal ground layer 80 and the wiring layer 70. The first circuit board 91 may be electrically connected to the first bonding soldering pad 21 in the first area 8. The wiring layer 70 of the first circuit board 91 may include a third line subsegment 403 and a fourth line subsegment 405. The third line subsegment 403 may be electrically connected to the first bonding soldering pad 21 through the anisotropic conductive adhesive film 18. The wiring layer 70 of the second circuit board 92 may include the first line subsegment 401 and the second line subsegment 402. The second line subsegment 402 of the second circuit board 92 may be electrically connected to the fourth line subsegment 405 of the first circuit board 91 through the second conductor 52 (the anisotropic conductive adhesive film 18) to realize the signal transmission. In one embodiment, the impedance of the second line subsegment 402 and the fourth line subsegment 405 may be adjusted by changing the line width of the second line subsegment 402 and the fourth line subsegment 405. In another embodiment, the impedance of the second line subsegment 402 and the fourth line subsegment 405 may be adjusted by setting the load device in the wiring layer 70. The load device may be connected with the second line subsegment 402 and the fourth line subsegment 405 in series, which is not illustrated in the drawings. Both the second line subsegment 402 and the fourth line subsegment 405 may be transmission lines of ¼ wavelength, and the sum of the impedances of the second line subsegment 402 and the fourth line subsegment 405 may be Z2. By adjusting the $$Z2 = \frac{Z1^2}{Z3},$$

impedance Z1 of the output terminal of the first line subsegment 401 may match the impedance Z3 of the input terminal of the third line subsegment 403 to avoid the return loss.

It should be noted that, in the present disclosure, a fourth line subsegment 405 may be set on the first circuit board 91, and the fourth line subsegment 405 may be one segment of the third connection line 40. By adjusting the impedance of the second line subsegment 402 and the fourth line subsegment 405, the impedance of the output terminal of the first line subsegment 401 may match the impedance of the input terminal of the second line subsegment 402. In one embodiment, once the impedances of the second line subsegment 402 and the fourth line subsegment 405 are designed, when the impedances of the output terminal of the first line subsegment 401 and the input terminal of the second line subsegment 402 do not match due to process errors, then a fine-tuning may be performed by adjusting the density of conductive particles in the second conductor 52 to compensate for fluctuations in the impedance of the second line subsegment 402 and the fourth line subsegment 405 due to process errors, and the impedance of the output terminal of the first line subsegment 401 and the impendence of the input terminal of the second line subsegment 402 may match.

Figure 44:
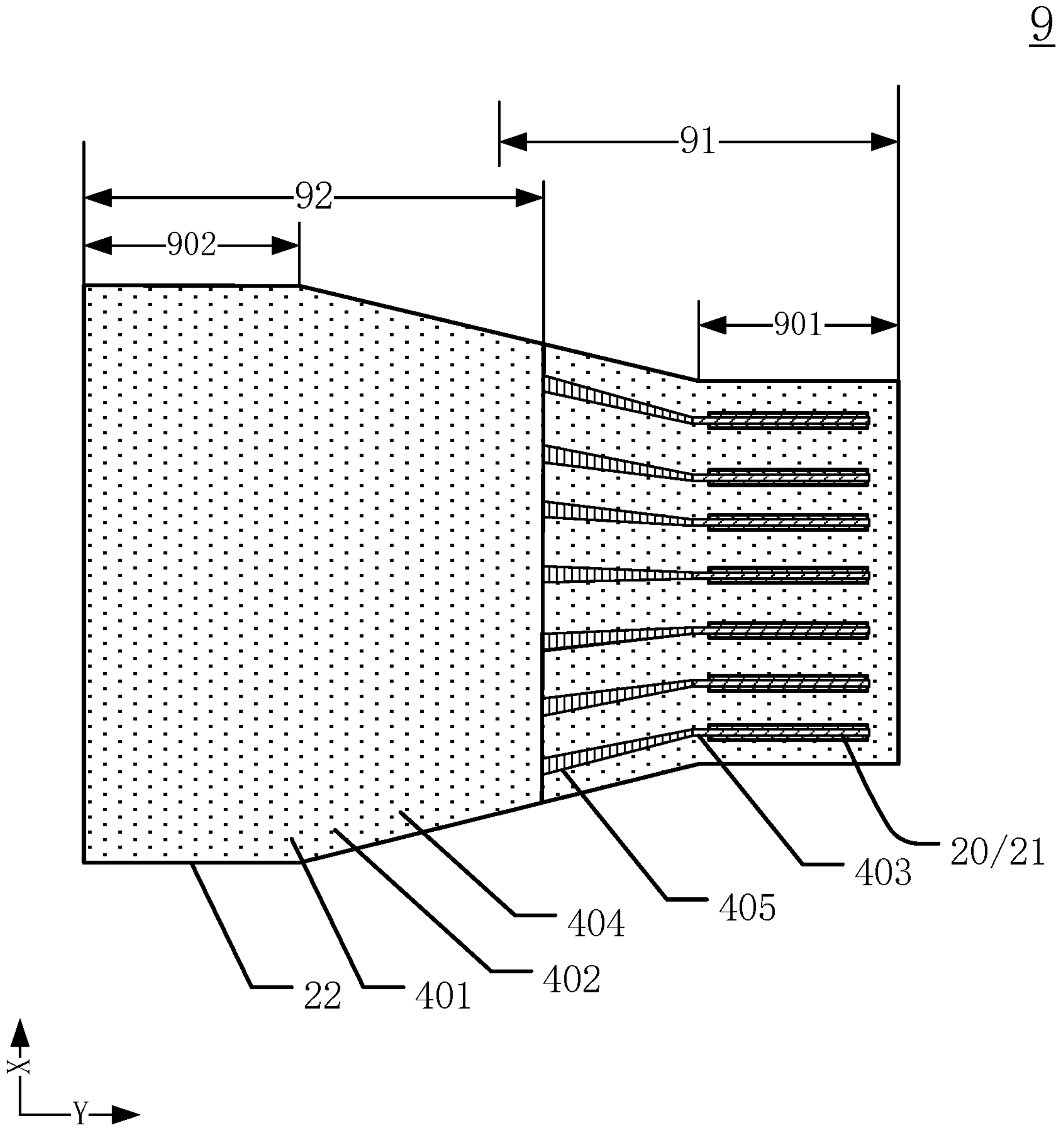
FIG. 44 illustrates a top view of an exemplary circuit board according to various disclosed embodiments of the present disclosure.
Figure 45:
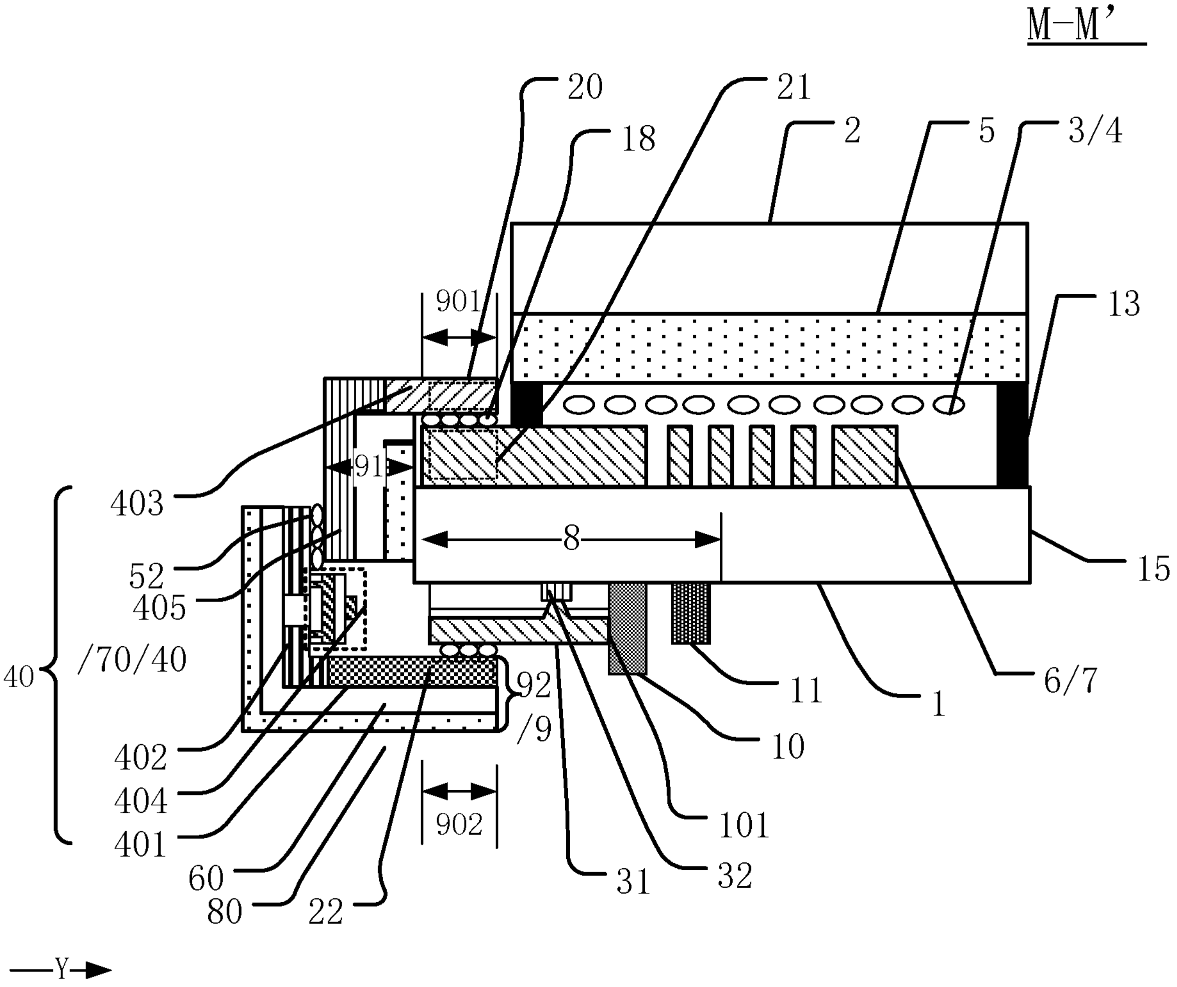
FIG. 45 illustrates another M-M'-sectional view in FIG. 42.
Figure 46:
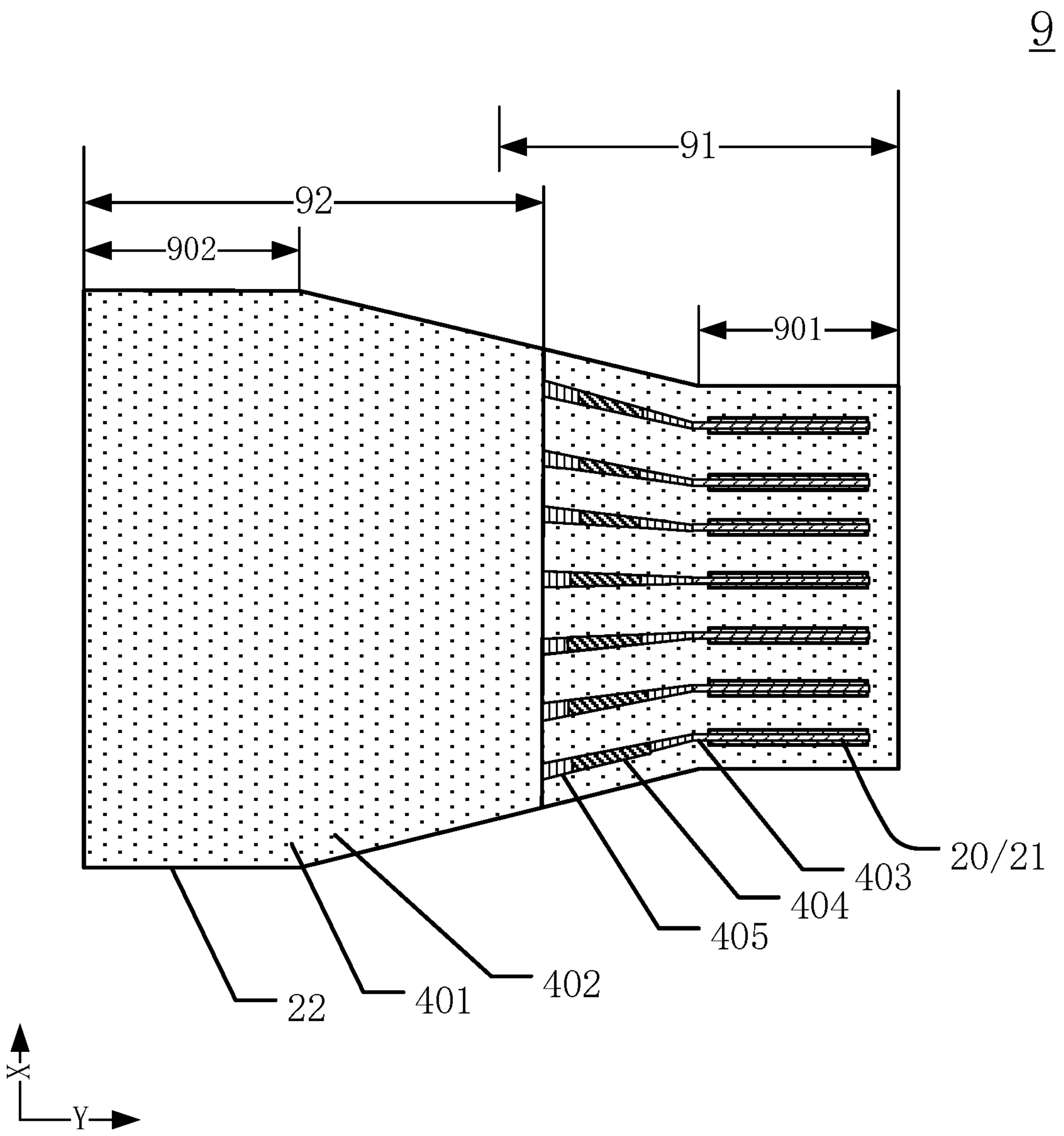
FIG. 46 illustrates a top view of another exemplary circuit board according to various disclosed embodiments of the present disclosure.
Figure 47:
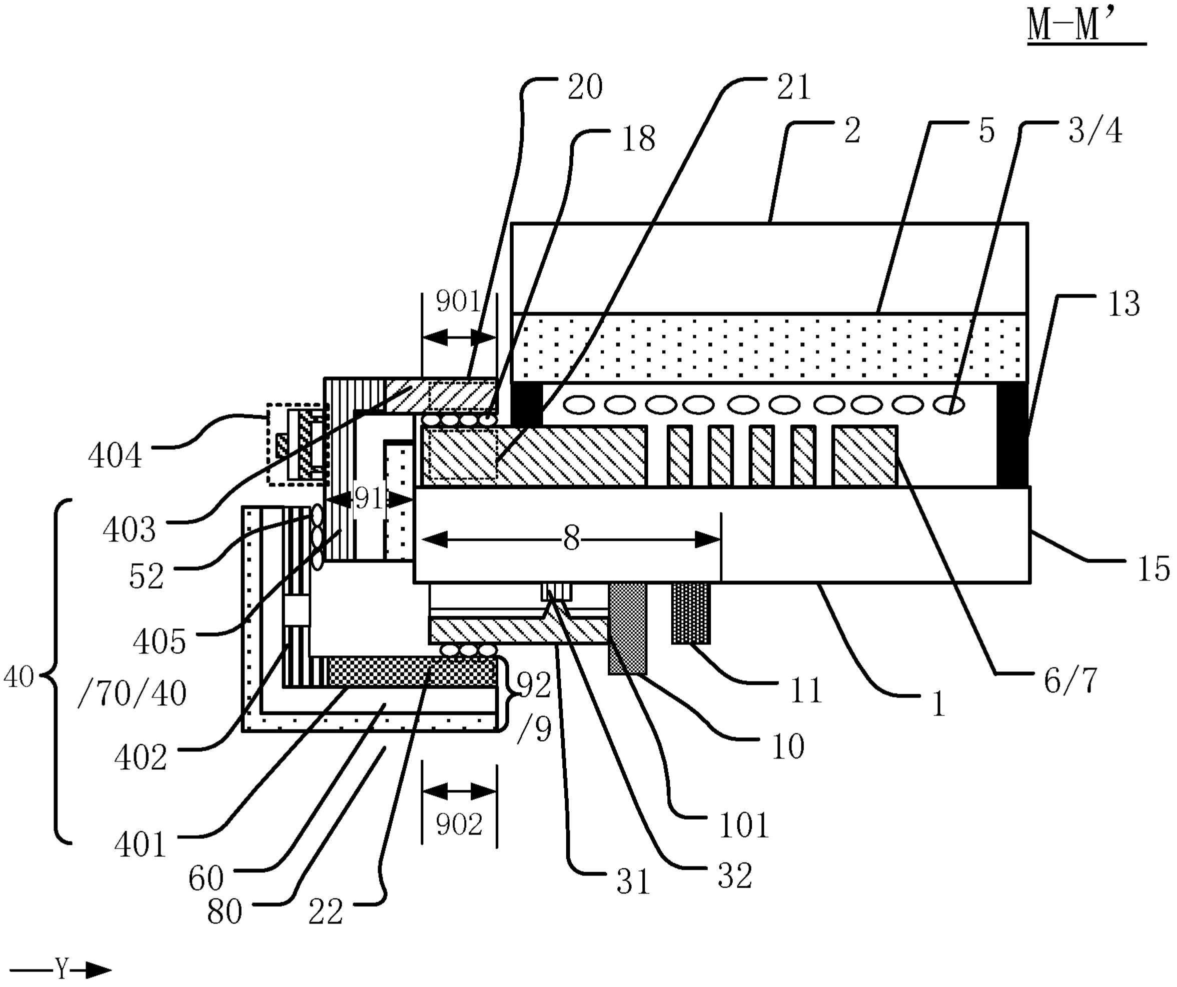
FIG. 47 illustrates another M-M'-sectional view in FIG. 42.
Figure 48:
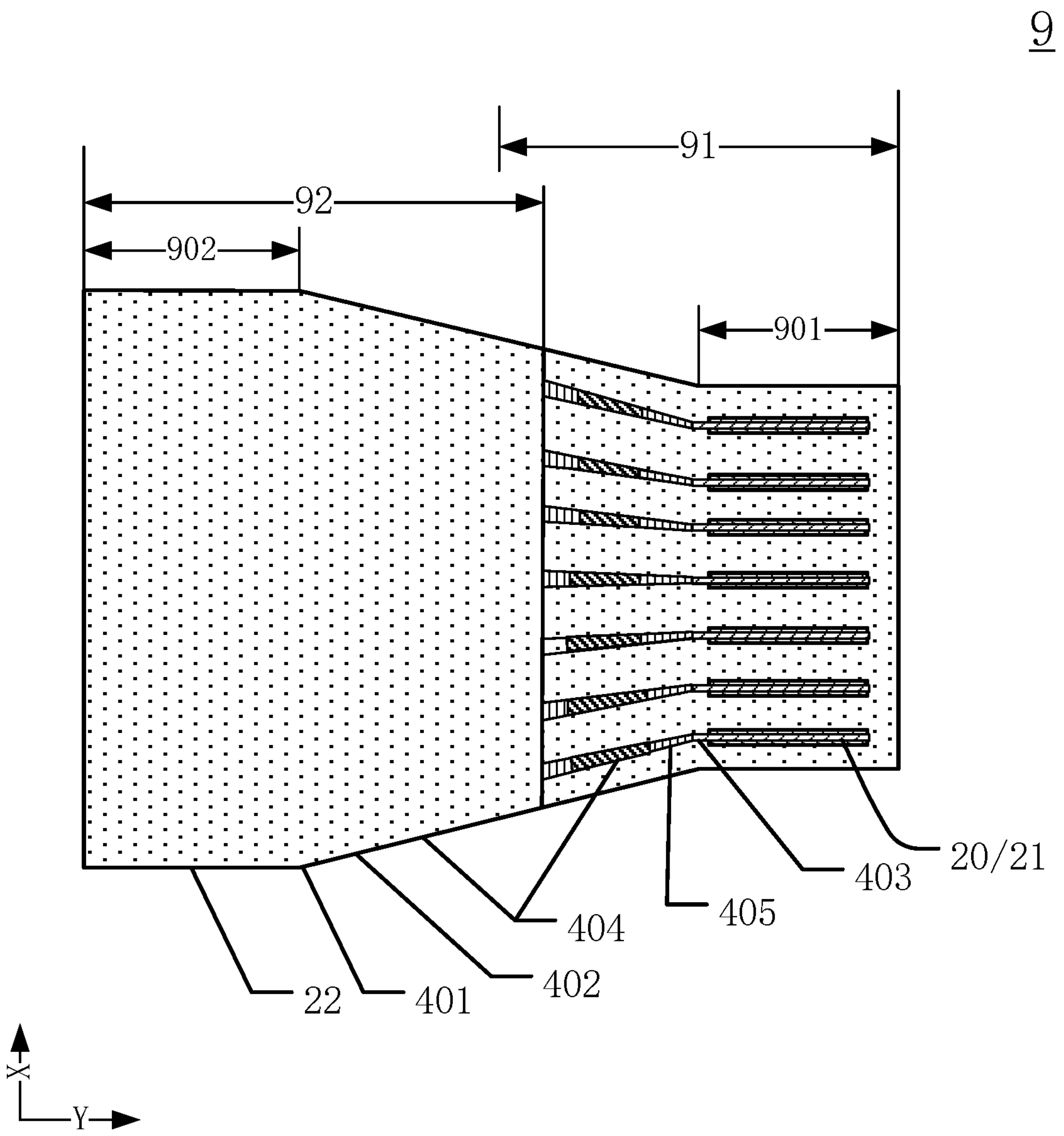
FIG. 48 illustrates a top view of another exemplary circuit board according to various disclosed embodiments of the present disclosure.
Figure 49:
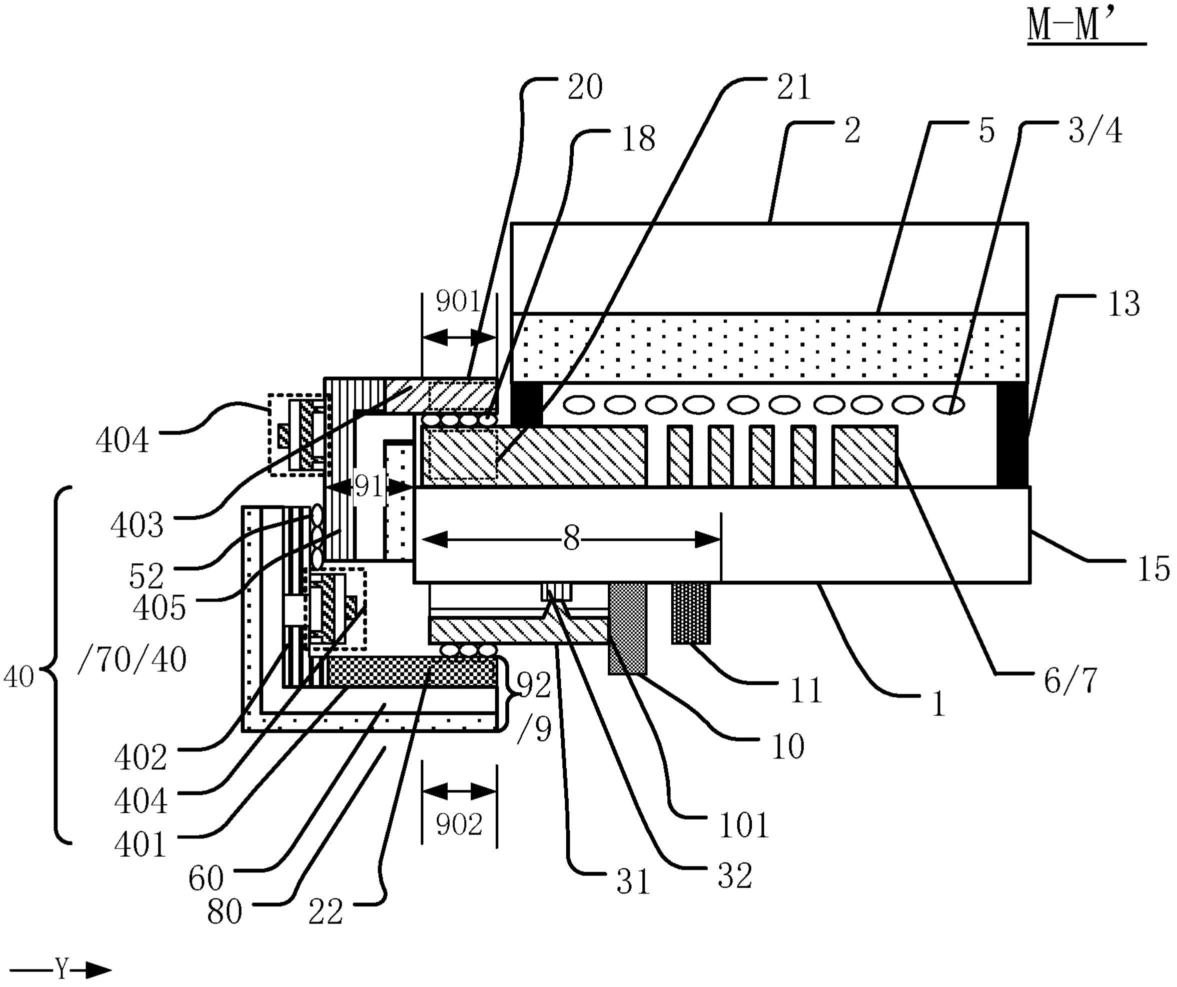
FIG. 49 illustrates another M-M'-sectional view in FIG. 42.

FIG. 44 is a schematic top view of an exemplary circuit board provided by the present disclosure, FIG. 45 is another M-M'-sectional view in FIG. 44, FIG. 46 is a schematic top view of another exemplary circuit board provided by the present disclosure, FIG. 47 is another M-M-sectional view of in FIG. 42, FIG. 48 is a schematic top view of another exemplary circuit board provided by the present disclosure; and FIG. 49 is another M-M'-sectional view in FIG. 42. As shown in FIGS. 44-49, along the first direction X, the width of the first line subsegment 401, the width of the second line subsegment 402, the width of the fourth line subsegment 405 and the width of the third line subsegment 403 may be decreased, and the second line subsegment 402 and/or the fourth line subsegment 405 may be connected in series with the load structure 404.

Specifically, the widths of the first line subsegment 401, the second line subsegment 402, the fourth line subsegment 405 and the third line subsegment 403 may be reduced, which may be that the widths of the first line subsegment 401, the second line subsegment 402, and the fourth line subsegment 405 and the third line subsegment 403 may be gradually reduced. The first line subsegment 401 and the second line subsegment 402 may be located on the second circuit board 92. The fourth line subsegment 405 and the third line subsegment 403 may be located on the first circuit board 91. The load structure 404 may be connected in series with the second line subsegment 402, or the load structure 404 may be connected in series with the fourth line subsegment 405, or the load structure 404 may connected in series with both the second line subsegment 402 and the fourth line subsegment 405. FIG. 44 and FIG. 45 illustrate the configuration that the load structure 404 is connected with the second line subsegment 402 in series. FIG. 46 and FIG. 47 illustrate the configuration that the load structure 404 is connected with the fourth line subsegment 405 in series. FIG. 48 and FIG. 49 illustrate the configuration that the second line subsegment 402 and the fourth line subsegment 405 are both connected with the load structure 404 in series. The load structure 404 may include resistors and/or capacitors. In FIG. 44 to FIG. 49, the configuration that the load structure 404 includes the resistor and the capacitor is used for illustration. In some embodiment, the load structure 404 may include only a resistor, or only a capacitor, which are not illustrated in the drawings.

In one embodiment, the second line subsegment 402 and/or the fourth line subsegment 405 may be connected in series with the load structure 404, and the sum of the impedances of the second line subsegment 402 and the fourth line subsegment 405 may be adjusted to be Z2, $$Z2 = \frac{Z1^2}{Z3},$$

such that the impedance Z1 of the output terminal of the first line subsegment 401 may match the impedance Z3 of the input terminal of the third line subsegment 403 to avoid the return loss. Further, when the impedance of the fourth line subsegment 405 of the first circuit board 91 is improper, the impedance of the second line subsegment 402 in the second circuit board 92 may be adjusted such that the sum of the impedance of the second line subsegment 402 and the impedance of the fourth line subsegment 405 may be Z2, which may increase the accuracy of the impedance matching. Similarly, when the impedance matching of the second line subsegment 402 in the second circuit board 91 is not appropriate, the impedance of the fourth line subsegment 405 in the first circuit board 91 may be adjusted such that the sum of the impedances of the second line subsegment 402 and the fourth line subsegment 405 may be Z2.

Figure 50:
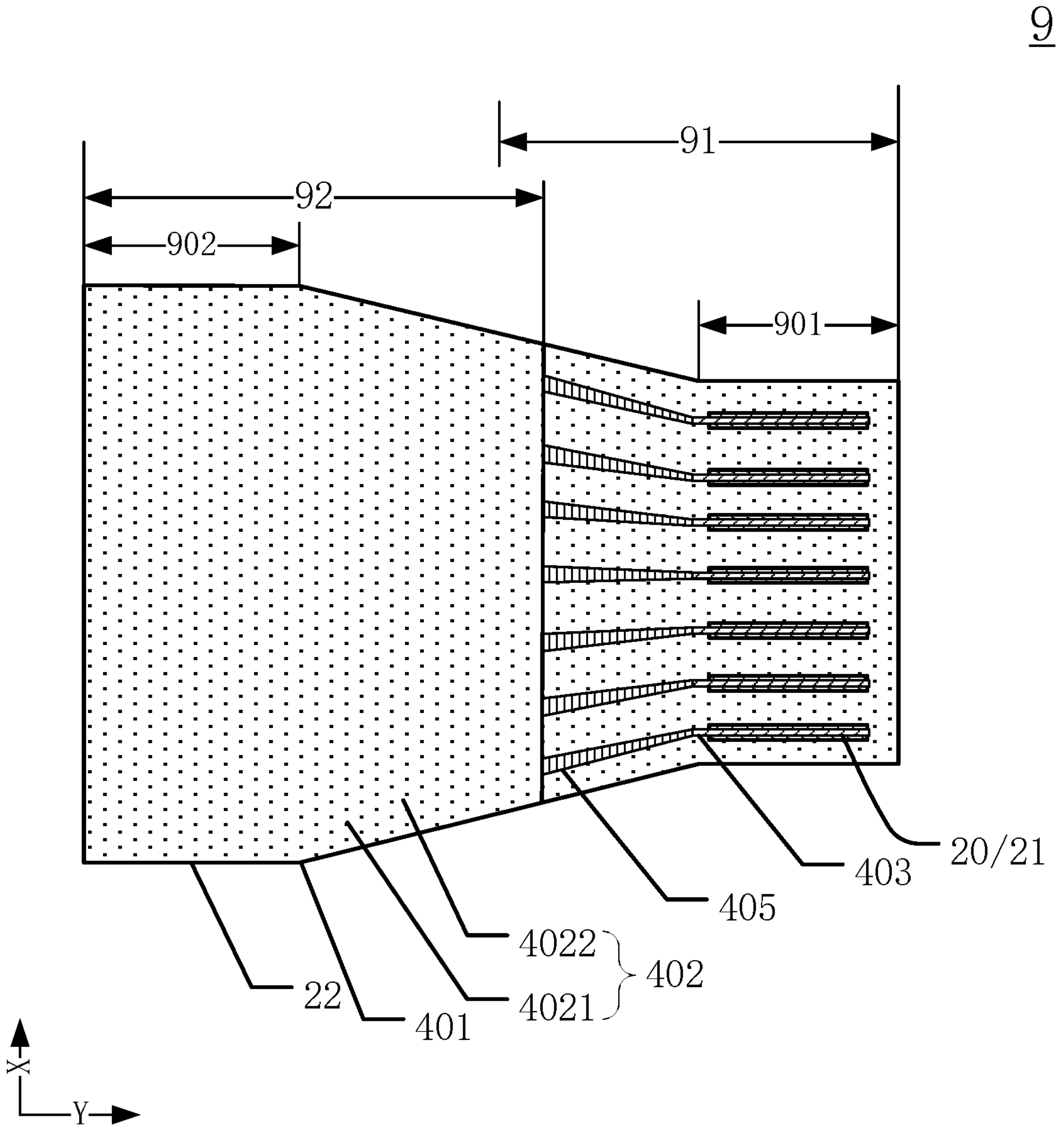
FIG. 50 illustrates a top view of another exemplary circuit board according to various disclosed embodiments of the present disclosure.
Figure 51:
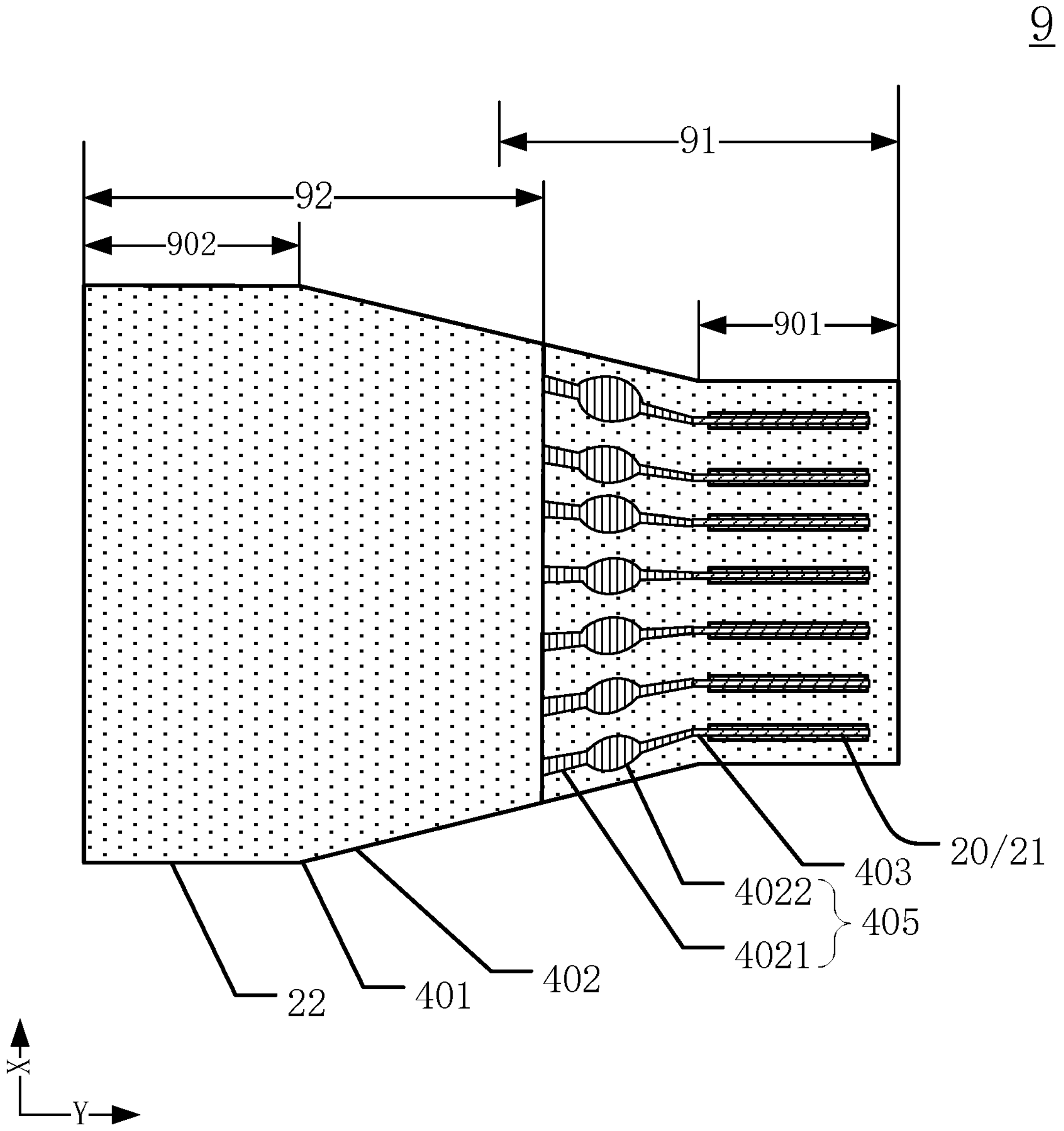
FIG. 51 illustrates a top view of another exemplary circuit board according to various disclosed embodiments of the present disclosure.
Figure 52:
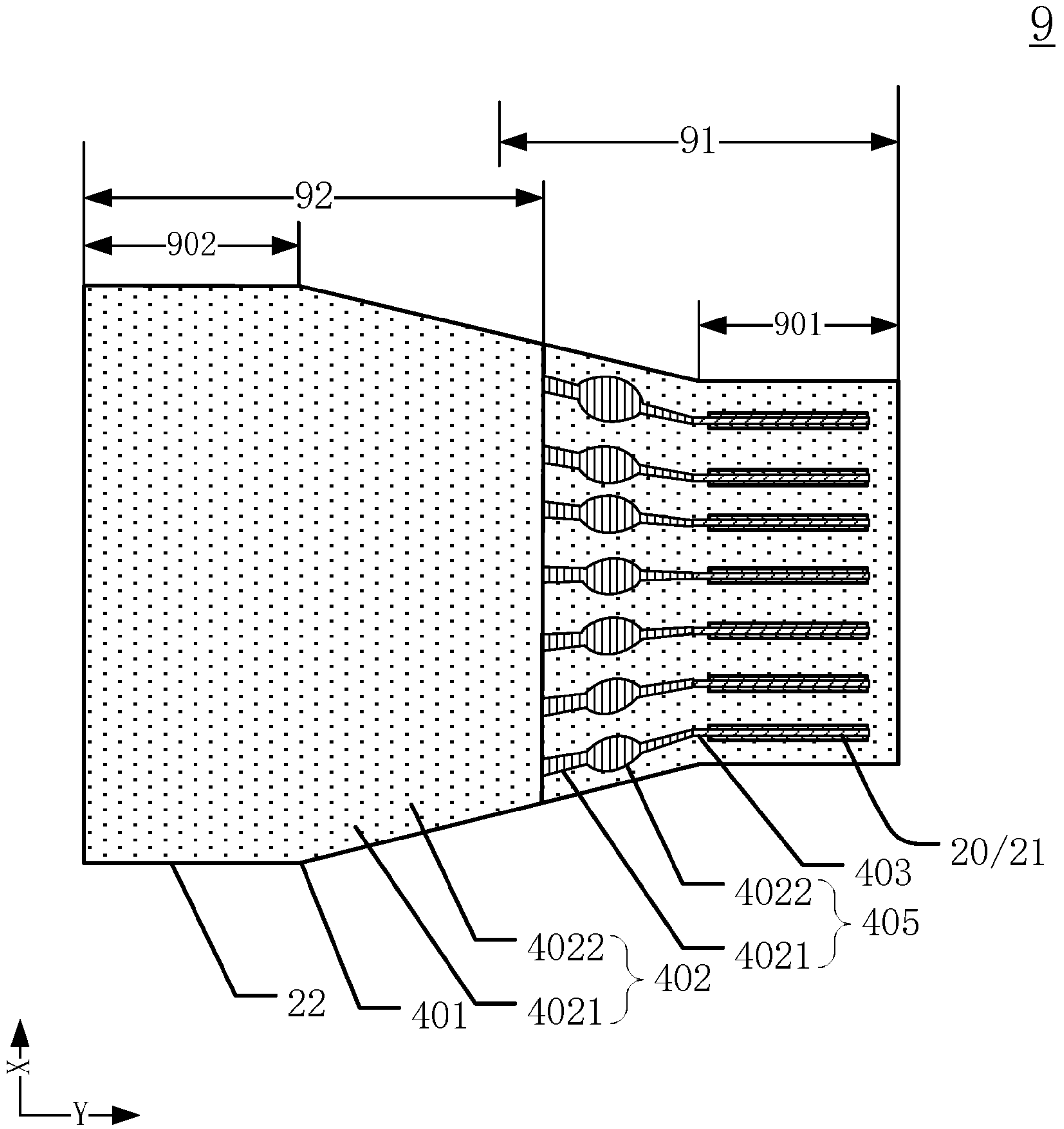
FIG. 52 illustrates a top view of another exemplary circuit board according to various disclosed embodiments of the present disclosure.

FIG. 50 is a schematic top view of another exemplary circuit board provided by the present disclosure, and FIG. 51 is a top view of another exemplary circuit board provided by the present disclosure, FIG. 52 is a schematic top view of another exemplary circuit board provided by the present disclosure. As shown in FIGS. 50-52, in some embodiments, along the first direction X, the width of the first line subsegment 401, the width of the second line subsegment 402, and the width of the fourth line subsegment 405 and the width of the third sub-segment 403 may be decreased, the second line subsegment 402 and/or the fourth line subsegment 405 may at least include a buffer segment 4021 and a transition segment 4022, and along the first direction X, the width of the transition segment 4022 may be greater than the width of the buffer segment 4021.

Specifically, the widths of the first line subsegment 401, the second line subsegment 402, the fourth line subsegment 405 and the third line subsegment 403 may be reduced, which may be that the widths of the first line subsegment 401, the second line subsegment 402, and the fourth line subsegment 405 and the third line subsegment 403 may be gradually reduced. The first sub-segment 401 and the second sub-segment 402 may be located on the second circuit board 92. The fourth line subsegment 405 and the third line subsegment 403 may be located on the first circuit board 91. By setting the second sub-section 402 to include at least a buffer section 4021 and a transition segment 4022, along the first direction X, the width of the transition segment 4022 may be greater than the width of the buffer section 4021. Or, by setting the fourth line subsegment 405 to include at least a buffer section 4021 and a transition section 4022, along the first direction X, the width of the transition segment 4022 may be greater than the width of the buffer segment 4021. Or, by setting the second line subsegment 402 and the fourth line subsegment 405 to include at least the buffer section 4021 and the transition section 4022, along the first direction X, the width of the transition segment 4022 may be greater than the width of the buffer segment 4021. FIG. 50 shows that the second sub-section 402 may include the buffer segment 4021 and the transition segment 4022. FIG. 51 shows that the fourth line subsegment 405 may include the buffer segment 4021 and the transition segment 4022. FIG. 52 shows that both the second line subsegment 402 and the fourth line subsegment 405 may include a buffer segment 4021 and a transition segment 4022. Along the first direction X, the width of the transition segment 4022 may be greater than the width of the buffer section 4021.

In one embodiment, by partially widening the second line subsegment 402 and/or the fourth line subsegment 405, the sum of the impedances of the second line subsegment 402 and the fourth line subsegment 405 may be adjusted to be Z2, $$Z2 = \frac{Z1^2}{Z3},$$

such that the impedance Z1 of the output terminal of the first line subsegment 401 may match the impedance Z3 of the input terminal of the third line subsegment 403 to avoid the return loss. In addition, when the impedance matching of the fourth line subsegment 405 in the first circuit board 91 is improper, the impedance of the second line subsegment 402 in the second circuit board 92 may be adjusted such that the sum of the impedances of the second line subsegment 402 and the fourth line subsegment 405 may be Z2, which may increase the accuracy of impedance matching. Similarly, when the impedance matching of the second line subsegment 402 in the second circuit board 91 is not appropriate, the impedance of the fourth line subsegment 405 in the first circuit board 91 may be adjusted such that the sum of the impedances of the second line subsegment 402 and the fourth line subsegment 405 may be Z2.

Figure 53:
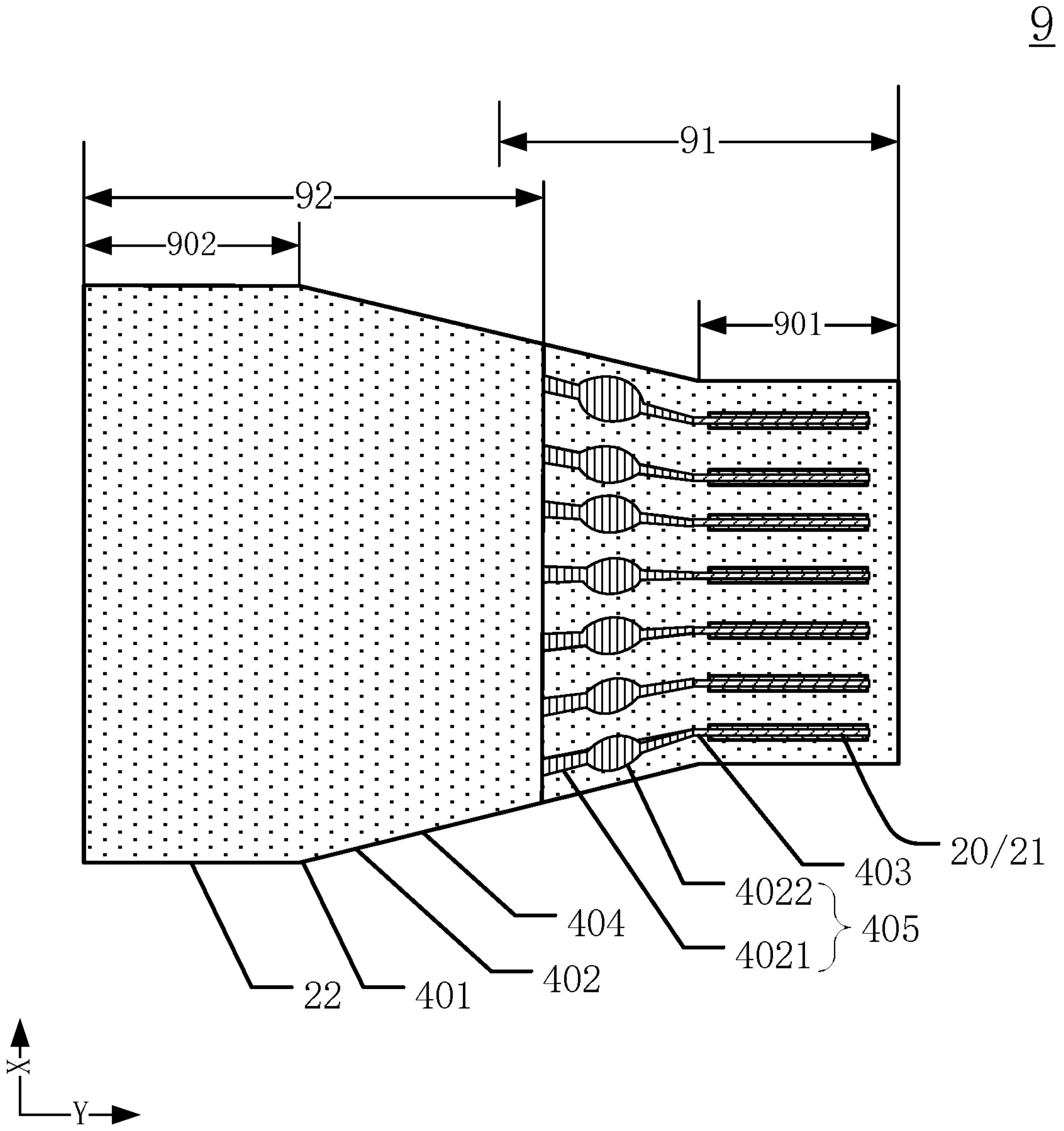
FIG. 53 illustrates a top view of another exemplary circuit board according to various disclosed embodiments of the present disclosure.
Figure 54:
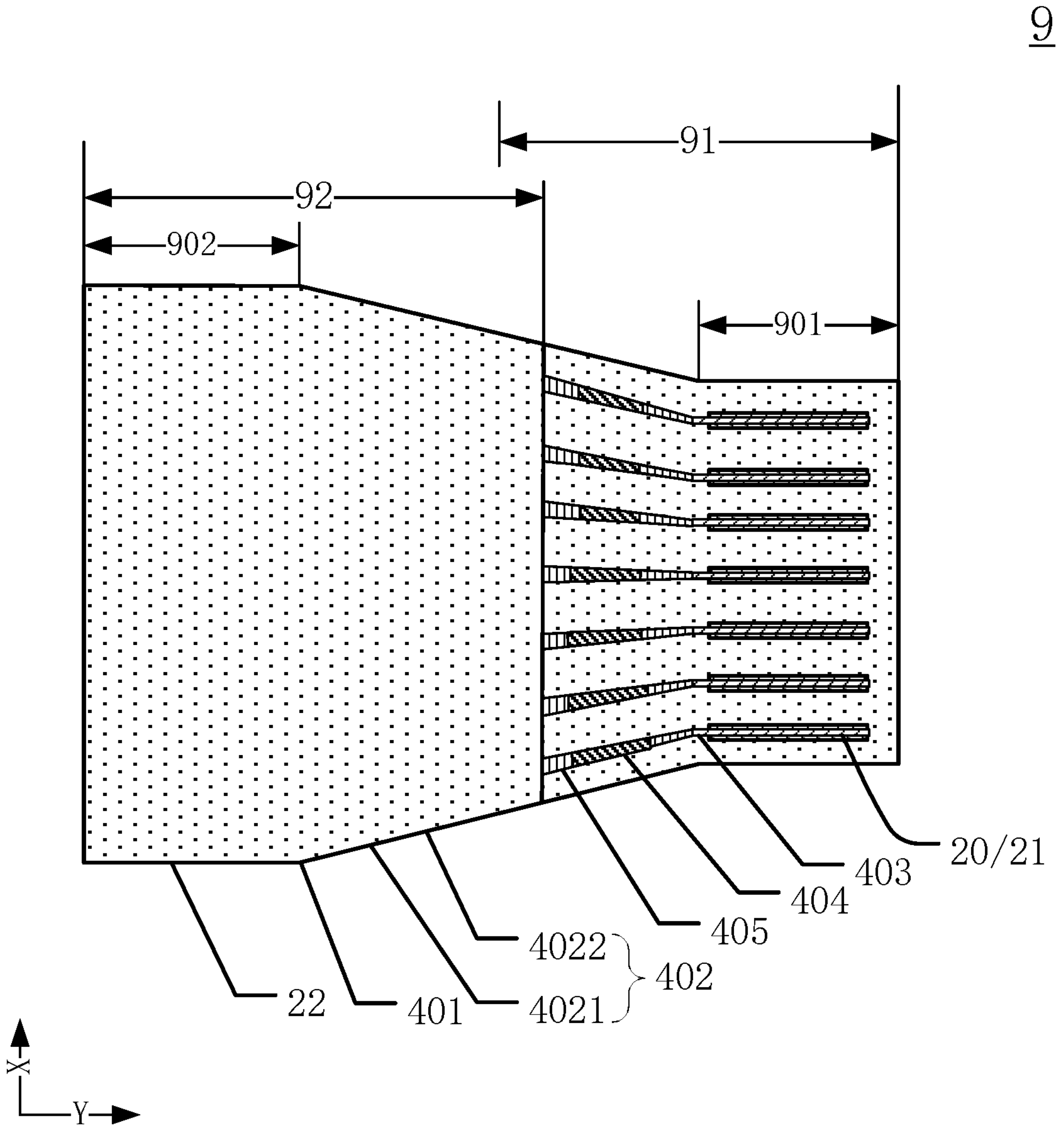
FIG. 54 illustrates a top view of another exemplary circuit board according to various disclosed embodiments of the present disclosure.

FIG. 53 is a schematic top view of another exemplary circuit board provided by the present disclosure, and FIG. 54 is a schematic top view of another exemplary circuit board provided by the present disclosure. As shown in FIGS. 53-54, in some embodiments, along the first direction X, the width of the first line subsegment 401, the width of the second line subsegment 402, the width of the fourth line subsegment 405 and the width of the third line subsegment 403 may decrease. The second line subsegment 402 may be connected with a load structure 404 in series. The fourth line subsegment 405 may include at least a buffer segment 4021 and a transition segment 4022. Along the first direction X, the width of the transition segment 4022 may be greater than the width of the buffer segment 4021. In some embodiments, the second line subsegment 402 may include at least a buffer segment 4021 and a transition segment 4022. Along the first direction X, the width of the transition segment 4022 may be greater than the width of the buffer segment 4021, and the fourth line subsegment 405 may be connected with the load structure 404 in series.

Specifically, the widths of the first line subsegment 401, the second line subsegment 402, the fourth line subsegment 405 and the third line subsegment 403 may be reduced, which may be that the width of the first line subsegment 401, the second line subsegment 402, the fourth line subsegment 405 and the third line subsegment 403 may be gradually reduced. The first line subsegment 401 and the second line subsegment 402 may be located on the second circuit board 92. The fourth line subsegment 405 and the third line subsegment 403 may be located on the first circuit board 91. FIG. 53 shows that the second sub-segment 402 may be connected with a load structure 404 in series, and the fourth line subsegment 405 may include at least a buffer segment 4021 and a transition segment 4022. Along the first direction X, the width of the transition segment 4022 may be greater than the width of the buffer segment 4021. FIG. 54 shows that the second line subsegment 402 may include at least a buffer segment 4021 and a transition segment 4022. Along the first direction X, the width of the transition segment 4022 may be greater than the width of the buffer segment 4021. The fourth line subsegment 405 may be connected with a load structure 404 in series. The load structure 404 may adopt the same load structure 404 as shown in FIG. 44 to FIG. 49, which will not be repeated here.

In one embodiment, the line width of the second line subsegment 402 may be adjusted and the fourth line subsegment 405 may be connected with the load structure 404 in series, or the second line subsegment 402 may connected with the load structure 404 in series and the line width of the fourth line subsegment 405 is adjusted, thereby adjusting the sum of the impedances of the second line subsegment 402 and the fourth line subsegment 405 to be Z2, $$Z2 = \frac{Z1^2}{Z3},$$

such that the impedance Z1 of the output terminal of the first line subsegment 401 may match the impedance Z3 of the input terminal of the third line subsegment 403 to avoid the return loss. In addition, when the impedance matching of the fourth line subsegment 405 in the first circuit board 91 is improper, the impedance of the second line subsegment 402 in the second circuit board 92 may be adjusted such that the sum of the impedances of the second line subsegment 402 and the fourth sub-line section 405 may be Z2, which may increase the accuracy of the impedance matching. Similarly, when the impedance matching of the second line subsegment 402 in the second circuit board 91 is not appropriate, the impedance of the fourth line subsegment 405 in the first circuit board 91 may be adjusted such that the sum of the impedances of the second line subsegment 402 and the fourth line subsegment 405 may be Z2.

Figure 55:
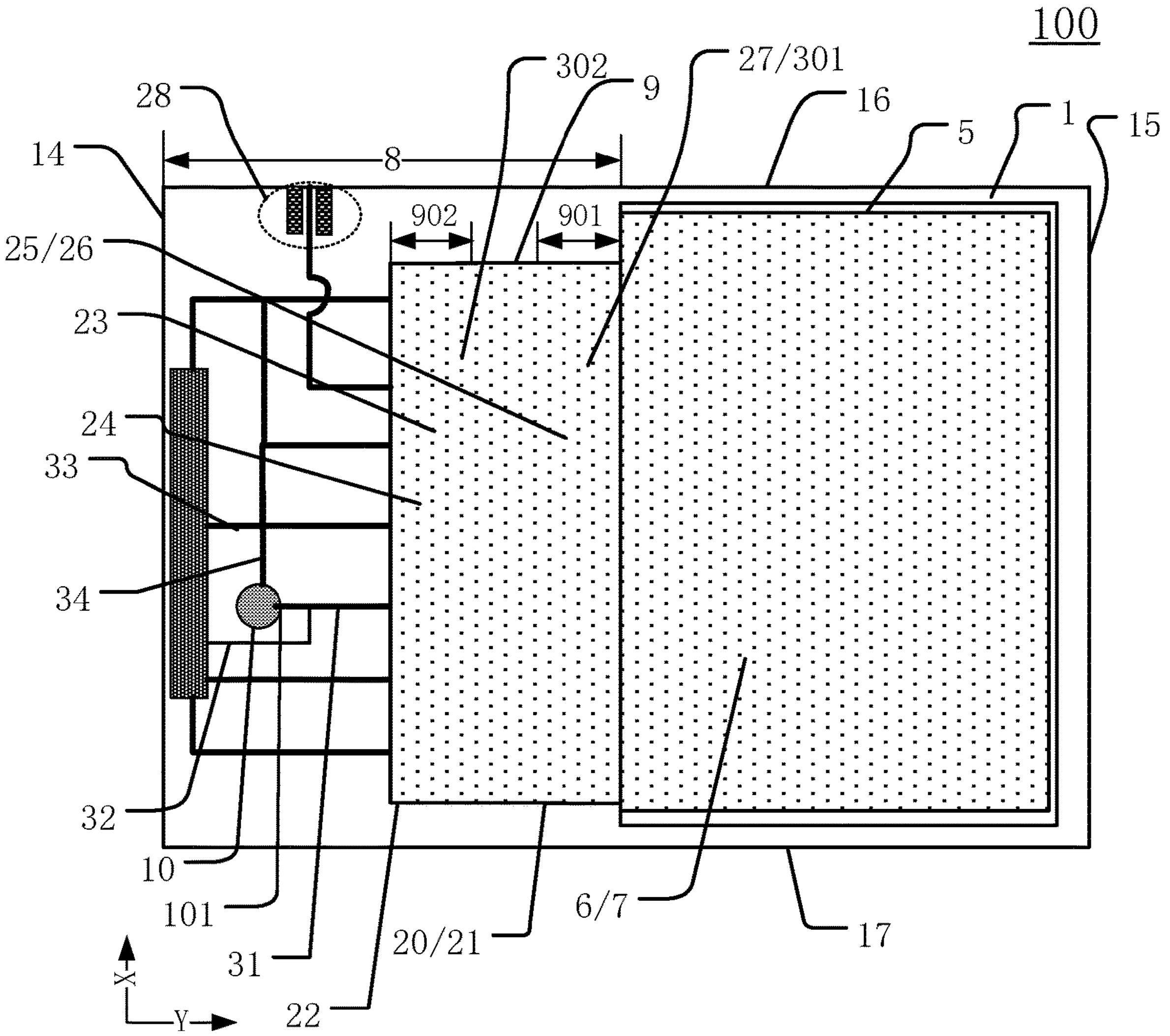
FIG. 55 illustrates a top view of another exemplary liquid crystal phase shifter according to various disclosed embodiments of the present disclosure.
Figure 56:
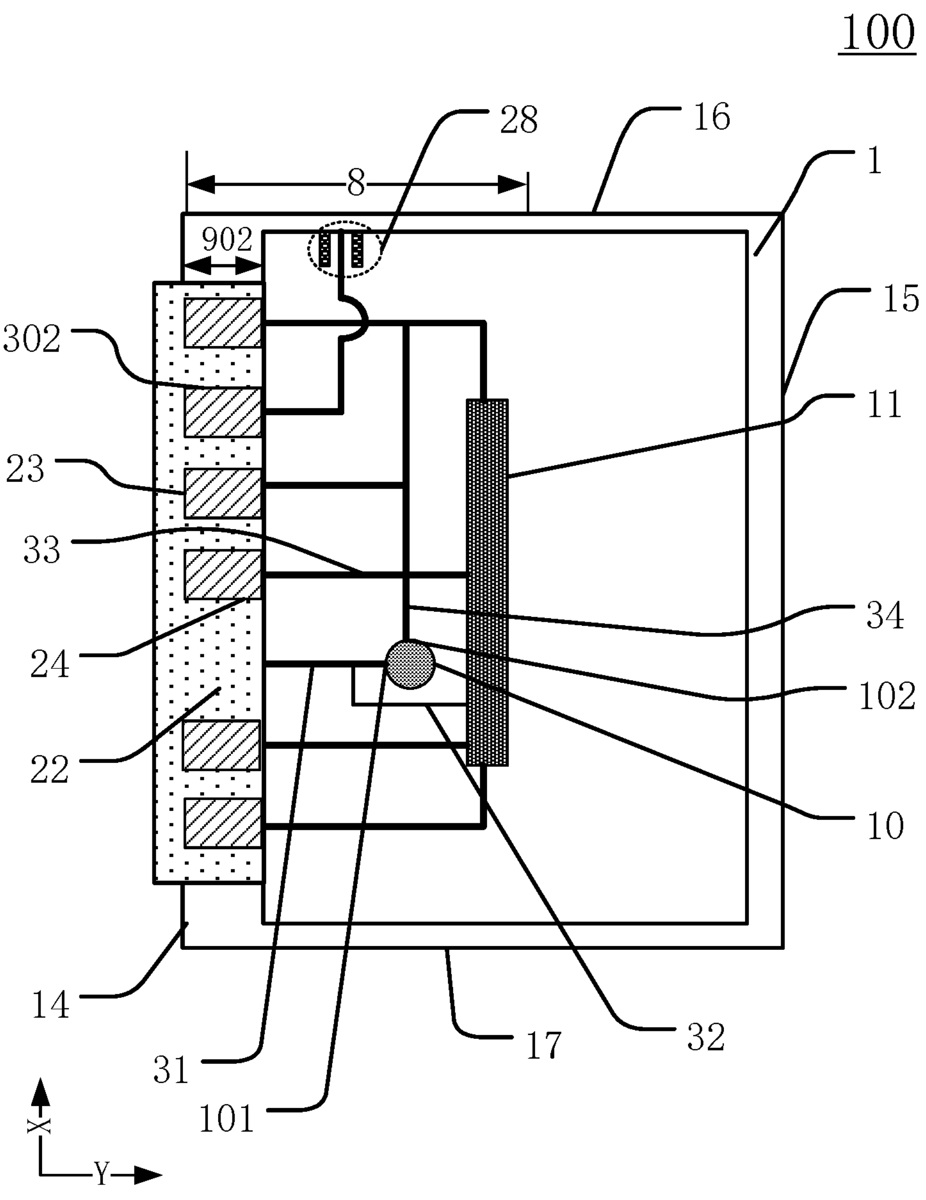
FIG. 56 illustrates a back view of another exemplary liquid crystal phase shifter according to various disclosed embodiments of the present disclosure.

FIG. 55 is a schematic top view of another exemplary liquid crystal phase shifter provided by the present disclosure, and FIG. 56 is a back view of another exemplary liquid crystal phase shifter provided by the present disclosure. As shown in FIGS. 55-56, the first area 8 may also include a third bonding soldering pad 27. One end of the transmission electrode 7 may be electrically connected to the first bonding soldering pad 21, and the other end of the transmission electrode 7 may be electrically connected to the third bonding soldering pad 27. The first substrate 1 may further includes a radio frequency output port 28, and the third bonding soldering pad 27 may be electrically connected to the radio frequency output port 28 through the circuit board 9.

Specifically, one end of the transmission electrode 7 may be electrically connected to the first bonding soldering pad 21, and the other end may be electrically connected to the third bonding soldering pad 27. The radio frequency signal may be input from one side of the first bonding soldering pad 21, and oscillated and transmitted between the transmission electrode 7 and the first conductive layer 5, and at the same time, because the dielectric constant of the liquid crystal layer 3 may be changed, the radio frequency signal may be output from one side of the third bonding soldering pad 27, and its phase may be shifted. The third bonding soldering pad 27 may be electrically connected to the radio frequency output port 28 through the circuit board 9. Specifically, referring to FIG. 55 and FIG. 56 and in conjunction with FIG. 9, the circuit board may include the fourth output soldering pad 301 electrically connected to the fourth input soldering pad 302 through the signal line (not shown in the figure) of the wiring layer 70, and the fourth input soldering pad 302 may be electrically connected to the radio frequency output port 28 through the first substrate 1 (or the signal line on the driving control board 12).

Figure 57:
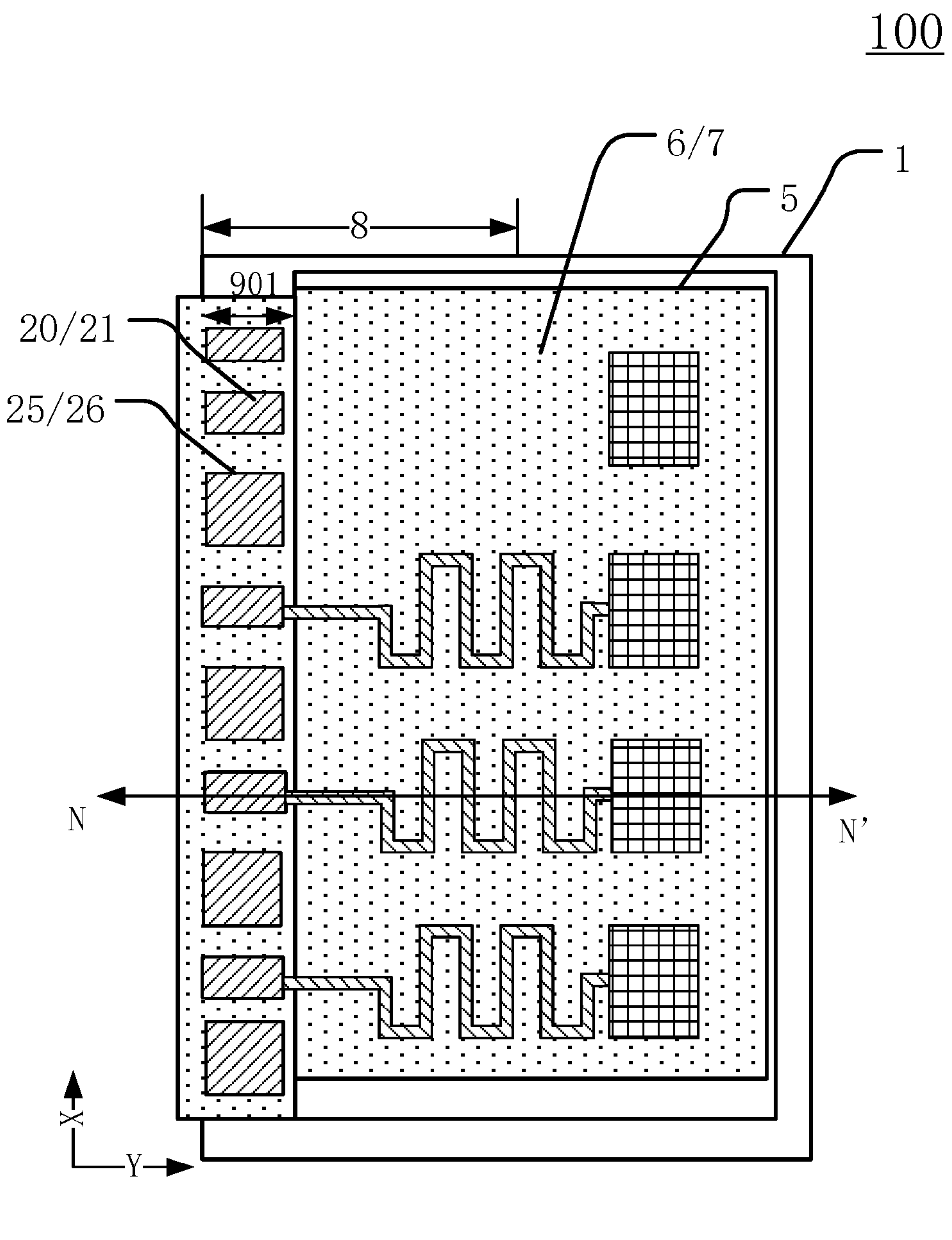
FIG. 57 illustrates a top view of an exemplary liquid crystal antenna according to various disclosed embodiments of the present disclosure.
Figure 58:
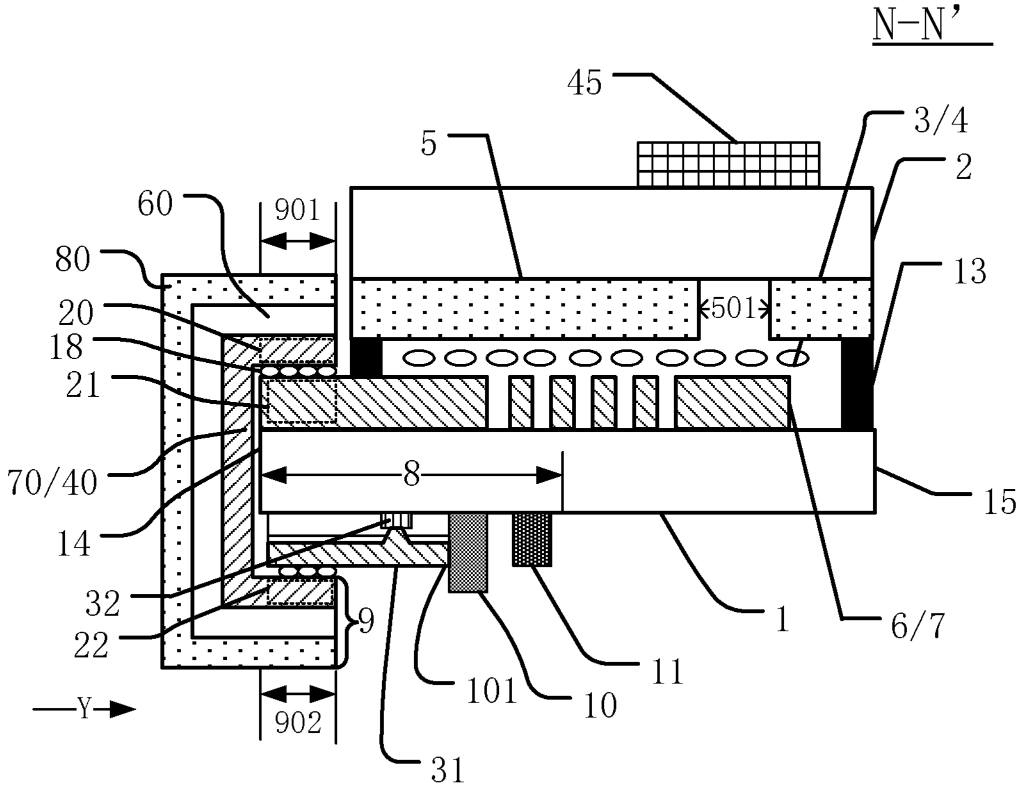
FIG. 58 illustrates an N-N'-sectional view in FIG. 57.

The present disclosure also provides a liquid crystal antenna. FIG. 57 is a schematic top view of an exemplary liquid crystal antenna provided by the present disclosure, and FIG. 58 is an N-N'-sectional in FIG. 57. As shown in FIGS. 57-58, the liquid crystal antenna in may include an above-mentioned liquid crystal phase shifter 100 (excluding the radio frequency output port 28 in the above embodiment), and may also include a radiator 45 disposed on the side of the second substrate 2 away from the first substrate 1. The first conductive layer 5 may include a coupling port 501. The orthographic projection of the radiator 45 on the plane where the first substrate 1 is located, the orthographic projection of the coupling port 501 on the plane where the first substrate 1 is located, and the orthographic projection of the transmission electrode 7 on the plane where the first substrate 1 is located at least partially overlap.

The liquid crystal antenna may include the liquid crystal phase shifter 100 in any one of the above embodiments in FIG. 3 to FIG. 41, which will not be repeated here. Only the configuration that the driving chip 11 and the radio frequency connector 10 is disposed on the side of the first substrate 1 away from the second substrate 2 as an example for the schematic illustration. In some embodiments, the driving chip 11 and the radio frequency connector 10 may also be located on the side of the first substrate 1 adjacent to the second substrate 2 (not shown in the figure).

Specifically, in addition to the structure of the liquid crystal phase shifter 100, the liquid crystal antenna may also include a radiator 45 located on the side of the second substrate 2 away from the first substrate 1. The first conductive layer 5 may include a coupling port 501. The orthographic projection of the radiator 45 on the plane where the substrate 1 is located, the orthographic projection of the coupling port 501 on the plane where the first substrate 1 is located, and the orthographic projection of the transmission electrode 7 on the plane where the first substrate 1 is located may at least partially overlap, and the radiator 45 may be used to radiate the microwave signal of the liquid crystal antenna.

It can be understood that the first substrate 1 may include a first area 8, and a circuit board 9 may be bonded in the first area 8. The first area 8 may also include a radio frequency connector 10 and a driving chip 11. The radio frequency connector 10 may transmit a radio frequency signal to the transmission electrode 7 through the circuit board 9. The radio frequency connector 10 may also provide a constant potential to the first conductive layer 5 through the circuit board 9. The driving chip 11 may transmit a bias signal to the transmission electrode 7 through the circuit board 9, and at the same time, the driving chip 11 may transmit a constant potential to the first conductive layer 5 through the circuit board 9. The bias signal of the transmission electrode 7 and the constant potential of the first conductive layer 5 may form an electric field that controls the deflection of the liquid crystal molecules 4 of the liquid crystal layer 3. At the same time, the radio frequency signal may oscillate and be transmitted between the transmission electrode 7 and the first conductive layer 5. Because the liquid crystal molecules 4 is deflected, the dielectric constant of the liquid crystal layer 3 may be changed, and the phase shift of the radio frequency signal in the liquid crystal layer 3 may be realized. The transmission electrode 7 may intersect with the radiator 45, and may radiate the phase-shifted microwave signal through the radiator 45.

The liquid crystal antenna of the present disclosure may also reduce the frame area of the liquid crystal antenna, and at the same time reduce the wiring difficulty of the signal lines in the liquid crystal cell. Further, it may also improve the splicing practicability of the liquid crystal antenna. The liquid crystal antenna of the present disclosure has the same technical effect as the liquid crystal phase shifter in any of the above embodiments, and details are not repeated here.

It may be known from the above embodiments that the liquid crystal phase shifter and the liquid crystal antenna provided by the present disclosure may at least achieve the following beneficial effects.

The liquid crystal phase shifter of the present disclosure may include a first edge and a second edge opposite to each other along the second direction, and a third edge and a fourth edge opposite to each other along the first direction. The circuit board may be bonded in the first area. The radio frequency connector in the first area and the driving chip may transmit signals through the circuit board. Thus, the radio frequency connector and the driving chip may be arranged on a same side of the liquid crystal phase shifter. Compared with technology that arranges the radio frequency connector and the driving chip on both sides of the liquid crystal phase shifter, the present disclosure may reduce the area of the frame in the liquid crystal phase shifter.

In the related art, the radio frequency connector and the driving chip are arranged on both sides of the liquid crystal phase shifter. Thus, the wiring difficulty of the signal wiring connecting the driving chip and the microstrip line is increased. However, in the present disclosure, since the driving chip and the radio frequency connector may be both electrically connected to the transmission electrode through the circuit board. Thus, there may be no need to arrange wiring in the liquid crystal cell, which may reduce the difficulty of wiring in the liquid crystal cell.

Because the driving chip and the radio frequency connector may only be disposed in the first area, the second edge, the third edge and the fourth edge may all be spliced. In the first direction, the third edge of one liquid crystal phase shifter and the fourth edge of the other liquid crystal phase shifter may be spliced. Thus, the linear splicing may be achieved in the first direction. In the second direction, the second edge of one liquid crystal phase shifter and the first edge of the other liquid crystal phase shifter may be spliced. Thus, the linear splicing may be achieved in the second direction. Or, in the second direction, the second edge of one liquid crystal phase shifter and the second edge of the other liquid crystal phase shifter may be spliced. Thus, the linear splicing may be achieved in the second direction. Accordingly, the splicing practicality of the liquid crystal phase shifter may be improved.

Although some specific embodiments of the present disclosure have been described in detail through examples, those skilled in the art should understand that the above examples are for illustration only and not intended to limit the scope of the present disclosure. Those skilled in the art will appreciate that modifications can be made to the above embodiments without departing from the scope and spirit of the disclosure. The scope of the present disclosure is defined by the appended claims.

What is claimed is:

1. A liquid crystal phase shifter, comprising:
- a first substrate and a second substrate that are oppositely disposed;
- a liquid crystal layer disposed between the first substrate and the second substrate;
- a radio frequency connector; and
- a driving chip,
- wherein:
  - a side of the second substrate adjacent to the first substrate includes a first conductive layer connected to a constant potential;
  - a side of the first substrate adjacent to the second substrate includes a second conductive layer including a transmission electrode;
  - the first substrate includes a first area bonded with a circuit board; and
  - the radio frequency connector and the driving chip are both disposed in the first area and transmit signals through the circuit board.

2. The liquid crystal phase shifter according to claim 1, wherein the first substrate further comprises:

a first edge, wherein the circuit board is bent to a side of the first substrate away from the second substrate along the first edge, and the radio frequency connector and the driving chip are located on the side of the first substrate away from the second substrate.

3. The liquid crystal phase shifter according to claim 1, wherein:

the radio frequency connector and the driving chip are located on the side of the first substrate adjacent to the second substrate.

4. The liquid crystal phase shifter according to claim 1, wherein the circuit board comprises:

a first end; and a second end, wherein:

the first end of the circuit board is bonded to the first region area and includes a first output soldering pad electrically connected to a first bonding soldering pad in the first area;

the first bonding soldering pad is electrically connected to one end of the transmission electrode;

the second end of the circuit board includes a first input soldering pad;

the radio frequency connector includes a radio frequency input terminal; and the first input soldering pad is electrically connected to the radio frequency input terminal of the radio frequency connector and the driving chip, respectively.

5. The liquid crystal phase shifter according to claim 4, wherein the first substrate comprises:

a first connection line and a second connection line disposed in different layers, wherein one end of the first connection line is connected to the radio frequency input terminal of the radio frequency connector, another end of the first connection line is electrically connected to the first input soldering pad, one end of the second connection line is electrically connected to the driving chip, another end of the second connection line is electrically connected to the first connection line; an insulation layer is disposed between the first connection line and the second connection line; and the second connection line is connected to the first connection line through a via hole.

6. The liquid crystal phase shifter according to claim 4, wherein the circuit board comprises:

a third connection line including a first line subsegment, a second line subsegment and a third line subsegment, wherein:

the first line subsegment includes the first input soldering pad;

the third line subsegment includes the first output soldering pad;

an impedance of an output end of the first sub-segment is Z1;

an impedance of the second line subsegment is Z2;

an impedance of an input end of the third line subsegment is Z3;

the third line subsegment is a ¼ wavelength transmission line; and $$Z2 = \frac{Z1^2}{Z3};$$

and the first line subsegment is made of one of copper, silver, gold, a combination of copper and silver, and a combination of copper and gold; and the third line subsegment includes a laminated structure of indium tin oxide, silicon nitride and copper; and in a first direction, a width of the first line subsegment is greater than a width of the second line subsegment, and the width of the second line subsegment is greater than a width of the third line subsegment;

the first direction intersects an extension direction of the first line subsegment;

the second line subsegment is connected with a load structure in series; and the load structure includes a resistor and/or a capacitor; or in a first direction, a width of the first line subsegment is greater than a width of the second line subsegment, and the width of the second line subsegment is greater than a width of the third line subsegment;

the first direction intersects an extension direction of the first line subsegment; the second line subsegment at least includes a buffer segment and a transition segment; and in the first direction, a width of the transition segment is greater than a width of the buffer segment.

7. The liquid crystal phase shifter according to claim 1, wherein:

the radio frequency connector provides a radio frequency signal;

the driving chip provides a bias signal; and a frequency of the radio frequency signal is greater than a frequency of the bias signal.

8. The liquid crystal phase shifter according to claim 4, the radio frequency connector further comprises:

a ground terminal, wherein:

the second end of the circuit board further includes a second input soldering pad and a third input soldering pad;

the ground terminal is electrically connected to the second input soldering pad;

a ground signal of the driving chip is input to the third input soldering pad;

the first end of the circuit board also includes a second output soldering pad;

the second input soldering pad and the third input soldering pad are both electrically connected to the second output soldering pad;

the second output soldering pad is electrically connected to a second bonding soldering pad in the first area; and the second bonding soldering pad is electrically connected to the first conductive layer.

9. The liquid crystal phase shifter according to claim 8, wherein the first substrate further comprises:

a fourth connection line and a fifth connection line disposed in different layers, wherein one end of the fourth connection line is electrically connected to the driving chip, another end of the fourth connection line is electrically connected to the third input soldering pad, one end of the fifth connection line is electrically connected to the ground terminal of the radio frequency connector, another end of the fifth connection line is electrically connected to the second input soldering pad, and the fifth connection line is connected to the fourth connection line through a via hole; an insulation layer is disposed between the fourth connection line and the fifth connection line.

10. The liquid crystal phase shifter according to claim 8, wherein:

a frame sealant is disposed between the first substrate and the second substrate;

a first conductor is configured inside the frame sealant;

one end of the first conductor is electrically connected to the first conductive layer;

another end of the first conductor is electrically connected to the second bonding soldering pad; and the first conductor includes conductive gold balls.

11. The liquid crystal phase shifter according to claim 4, wherein the circuit board comprises:

a substrate and a wiring layer disposed on one side of the substrate, wherein the wiring layer includes a third connection line, one end of the third connection line is electrically connected to the first input soldering pad, and another end of the third connection line is electrically connected to the first output soldering pad.

12. The liquid crystal phase shifter according to claim 11, wherein:

the radio frequency connector further includes a ground terminal;

the second end of the circuit board further includes a second input soldering pad and a third input soldering pad;

the ground terminal is electrically connected to the second input soldering pad;

a ground signal of the driving chip is input to the third input soldering pad;

the first end of the circuit board also includes a second output soldering pad;

the second input soldering pad and the third input soldering pad are both electrically connected to the second output soldering pad;

the second output soldering pad is electrically connected to a second bonding soldering pad in the first area;

the second bonding soldering pad is electrically connected to the first conductive layer;

the circuit board also includes a metal ground layer located on a side of the substrate away from the wiring layer; and the metal ground layer includes a whole-surface structure and is electrically connected to the second output soldering pad through a via hole passing through the substrate; or the radio frequency connector further includes a ground terminal;

the second end of the circuit board further includes a second input soldering pad and a third input soldering pad;

the ground terminal is electrically connected to the second input soldering pad;

a ground signal of the driving chip is input to the third input soldering pad;

the first end of the circuit board also includes a second output soldering pad;

the second input soldering pad and the third input soldering pad are both electrically connected to the second output soldering pad;

the second output soldering pad is electrically connected to a second bonding soldering pad in the first area;

the second bonding soldering pad is electrically connected to the first conductive layer;

the circuit board also includes a ground metal layer located on a side of the substrate adjacent to the wiring layer; and the metal ground layer includes a whole-surface structure and is electrically connected to the second output soldering pad through a via hole passing through the substrate; or the radio frequency connector further includes a ground terminal;

the second end of the circuit board further includes a second input soldering pad and a third input soldering pad;

the ground terminal is electrically connected to the second input soldering pad;

a ground signal of the driving chip is input to the third input soldering pad;

the first end of the circuit board also includes a second output soldering pad;

the second input soldering pad and the third input soldering pad are both electrically connected to the second output soldering pad;

the second output soldering pad is electrically connected to a second bonding soldering pad in the first area;

the second bonding soldering pad is electrically connected to the first conductive layer;

the wiring layer also includes a second signal line;

one end of the second signal line is electrically connected to the second input soldering pad and the third input soldering pad; and another end of the second signal line is electrically connected to the second output soldering pad.

13. The liquid crystal phase shifter according to claim 4, wherein:

a number of the first output soldering pads is greater than one; and multiple first soldering pads are electrically connected to a radio frequency input terminal of the radio frequency connector.

14. The liquid crystal phase shifter according to claim 1, wherein:

the circuit board is bonded to the first area by an anisotropic conductive adhesive film.

15. The liquid crystal phase shifter according to claim 1, further comprising:

a driving control board, wherein the radio frequency connector and the driving chip are disposed on the driving control board.

16. The liquid crystal phase shifter according to claim 1, the circuit board comprises:

a first circuit board; and a second circuit board, wherein the first circuit board is bonded to the first area, and the second circuit board is electrically connected to the first circuit board through a second conductor.

17. The liquid crystal phase shifter according to claim 16, wherein the circuit board comprises:

a third connection line including a first line subsegment, a second line subsegment, a third line subsegment and a fourth line subsegment, wherein:

the first line subsegment includes a first input soldering pad, the third line subsegment includes a first output soldering pad, the first line subsegment and the second line subsegment are located on the second circuit board, the fourth line subsegment and the third line subsegment are located on the first circuit board, and the second line subsegment and the fourth line subsegment are electrically connected through the second conductor; and an impedance of an output end of the first line subsegment is Z1, a sum of impedances of the second line subsegment and the fourth line subsegment is Z2, an impedance of an input end of the third line subsegment is Z3, both the second line subsegment and the fourth line subsegment are ¼ wavelength transmission lines, and $$Z2 = \frac{Z1^2}{Z3}.$$

18. The liquid crystal phase shifter according to claim 17, wherein:

in a first direction, a width of the first line subsegment, a width of the second line subsegment, a width of the fourth line subsegment and a width of the third line subsegment decrease; and the second line subsegment and/or the fourth line subsegment are connected with a load structure in series; or in a first direction, a width of the first line subsegment, a width of the second line subsegment, a width of the fourth line subsegment and a width of the third line subsegment decrease;

the second line subsegment and/or the fourth line subsegment at least include a buffer segment and a transition segment; and in the first direction, a width of the transition segment is greater than a width of the buffer segment; or in a first direction, a width of the first line subsegment, a width of the second line subsegment, a width of the fourth line subsegment and a width of the third line subsegment decrease;

the second line subsegment is connected with a load structure in series; and the fourth line subsegment at least includes a buffer segment and a transition segment, and in the first direction, a width of the transition segment is greater than a width of the buffer segment; or the second line subsegment at least includes a buffer segment and a transition segment, and in the first direction, a width of the transition segment is greater than a width of the buffer segment, and the fourth line subsegment is connected with a load structure in series.

19. The liquid crystal phase shifter according to claim 4, wherein the first area further includes a third bonding soldering pad, wherein one end of the transmission electrode is electrically connected to the first bonding soldering pad, and another end of the transmission electrode is electrically connected to the third bonding soldering pad; and a side of the first substrate away from the second substrate further includes a radio frequency output port, and the third bonding soldering pad is electrically connected to the radio frequency output port through the circuit board.

20. A liquid crystal antenna, comprising:

a liquid crystal phase shifter, including a first substrate and a second substrate oppositely disposed, a liquid crystal layer disposed between the first substrate and the second substrate, a radio frequency connector, and a driving chip, wherein a side of the second substrate adjacent to the first substrate includes a first conductive layer connected to a constant potential, a side of the first substrate adjacent to the second substrate includes a second conductive layer including a transmission electrode, the first substrate includes a first area bonded with a circuit board, the radio frequency connector and the driving chip are both disposed in the first area, and the radio frequency connector and the driving chip transmit signals through the circuit board; and a radiator disposed on a side of the second substrate away from the first substrate, wherein the first conductive layer includes a coupling port, and an orthographic projection of the radiator on a plane where the first substrate is located, an orthographic projection of the coupling port on the plane where the first substrate is located, and an orthographic projection of the transmission electrode on the plane where the first substrate is located at least partially overlap.

* * * * *